Jan. 5, 1943.  J. C. PLASTARAS  2,307,069
TYPOGRAPHICAL COMPOSING, CASTING, AND DISTRIBUTING MACHINE
Filed Feb. 4, 1941  31 Sheets-Sheet 1
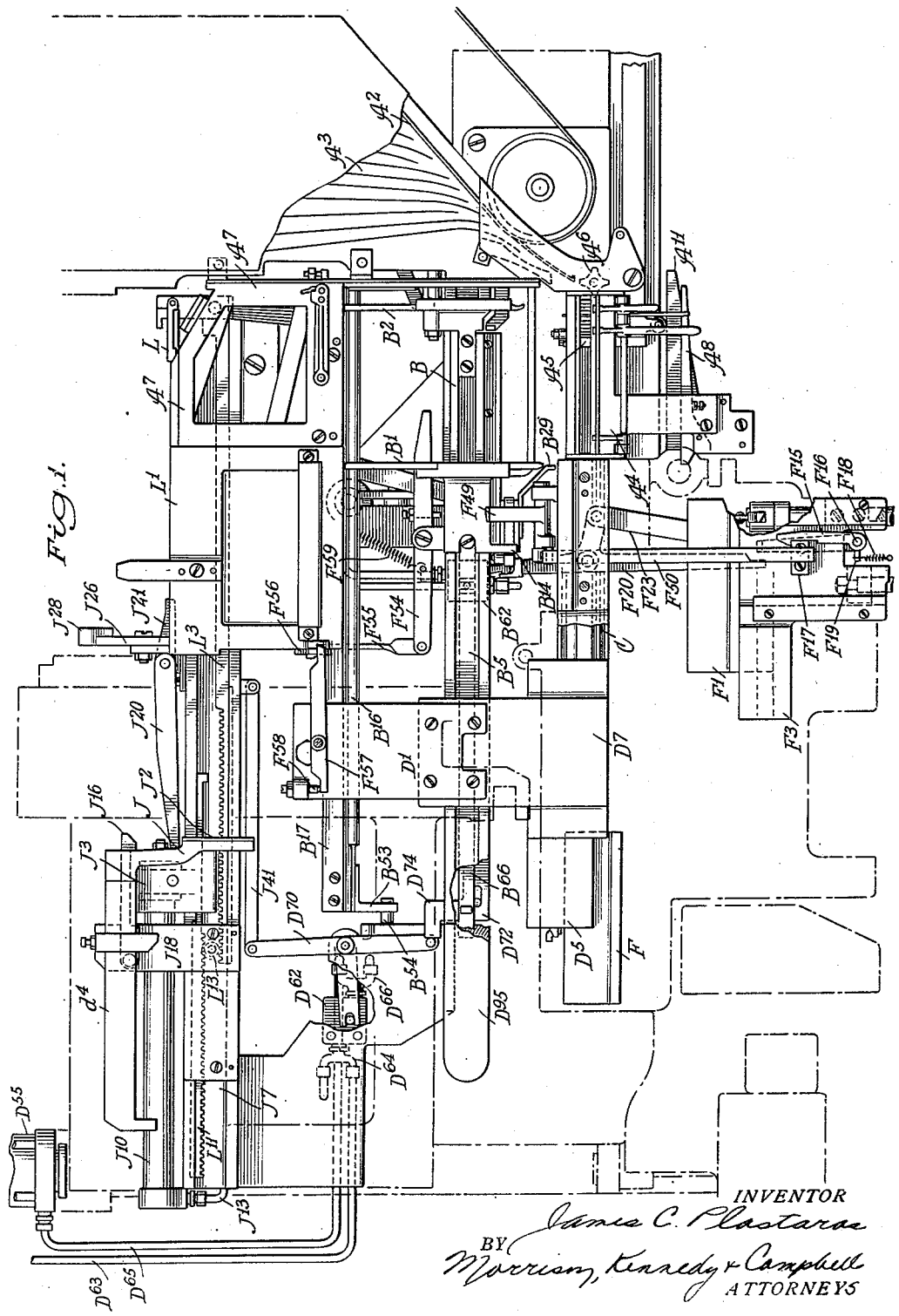
INVENTOR
James C. Plastaras
BY
Morrison, Kennedy & Campbell
ATTORNEYS

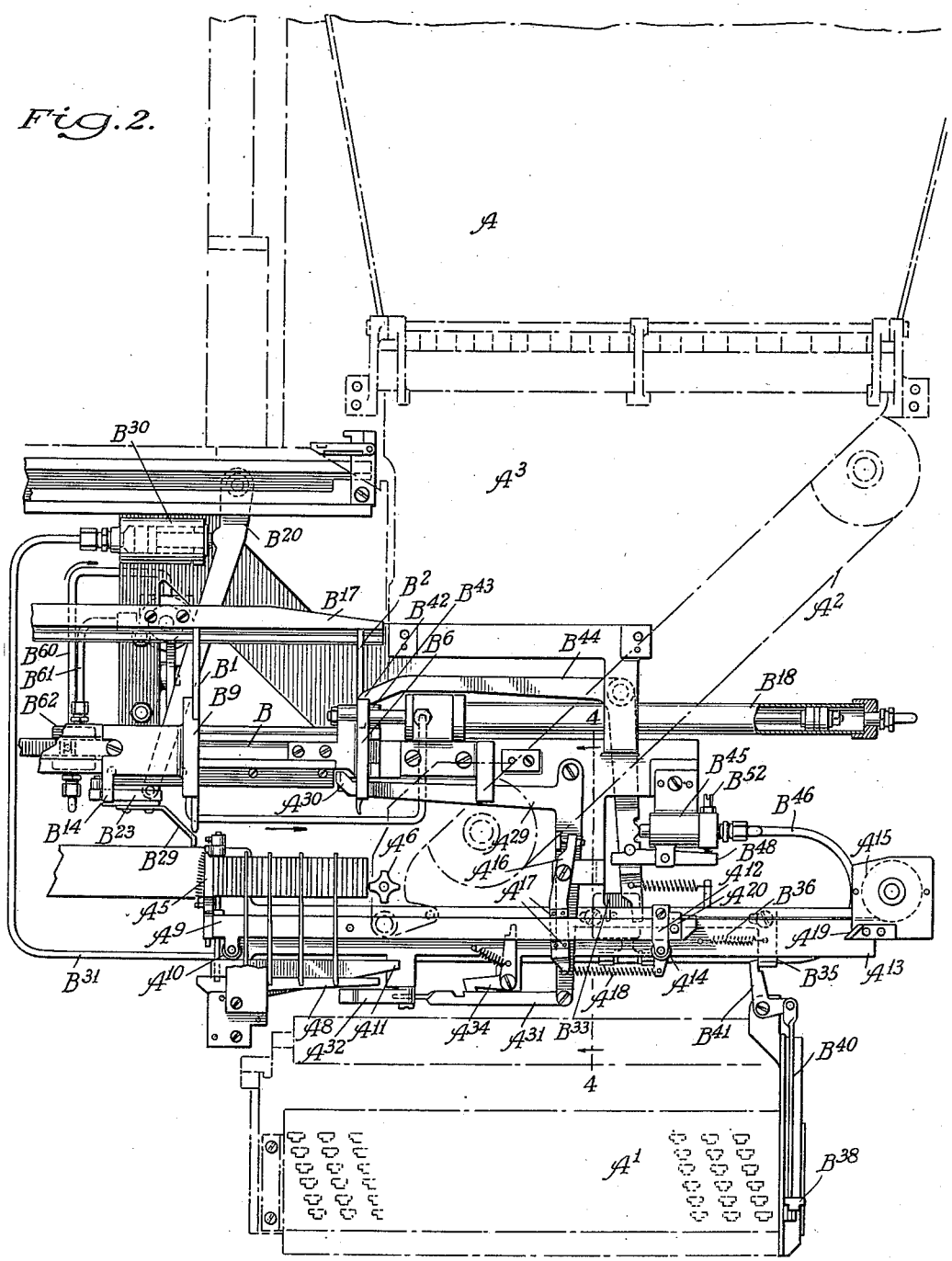

Jan. 5, 1943.   J. C. PLASTARAS   2,307,069
TYPOGRAPHICAL COMPOSING, CASTING, AND DISTRIBUTING MACHINE
Filed Feb. 4, 1941   31 Sheets-Sheet 3
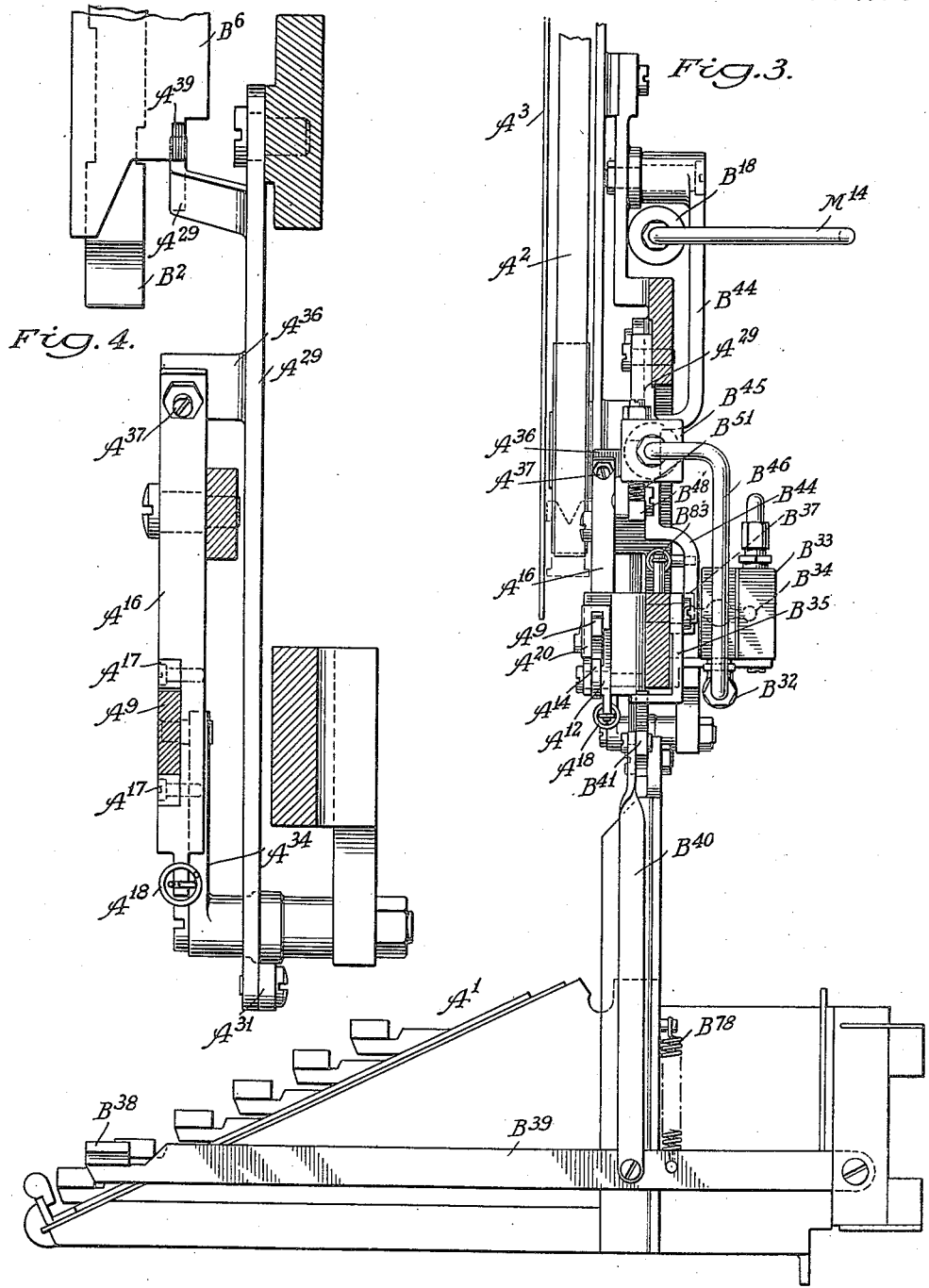

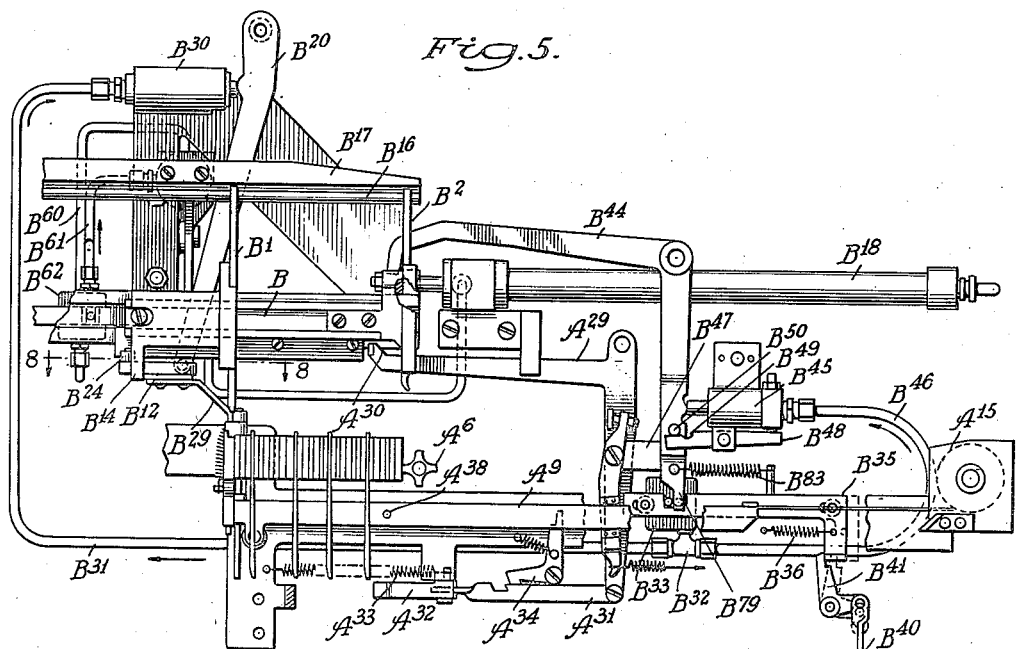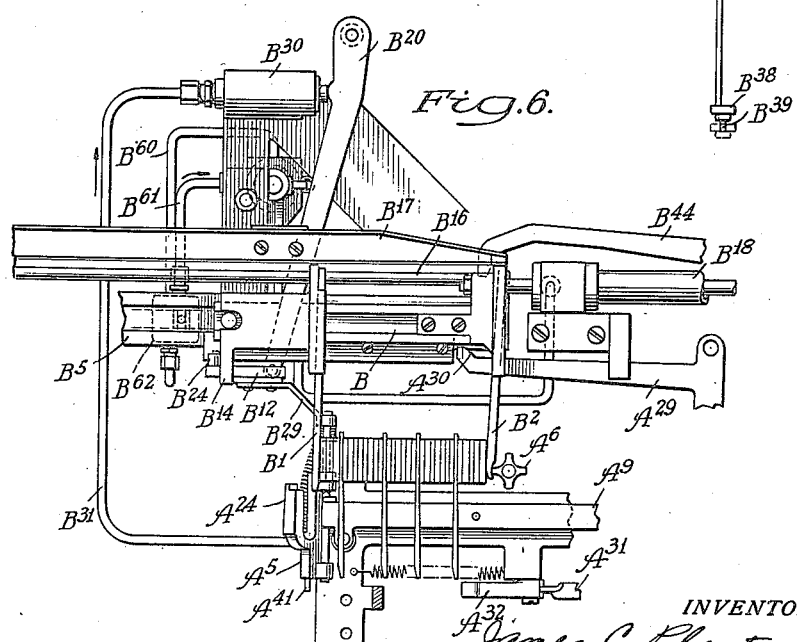

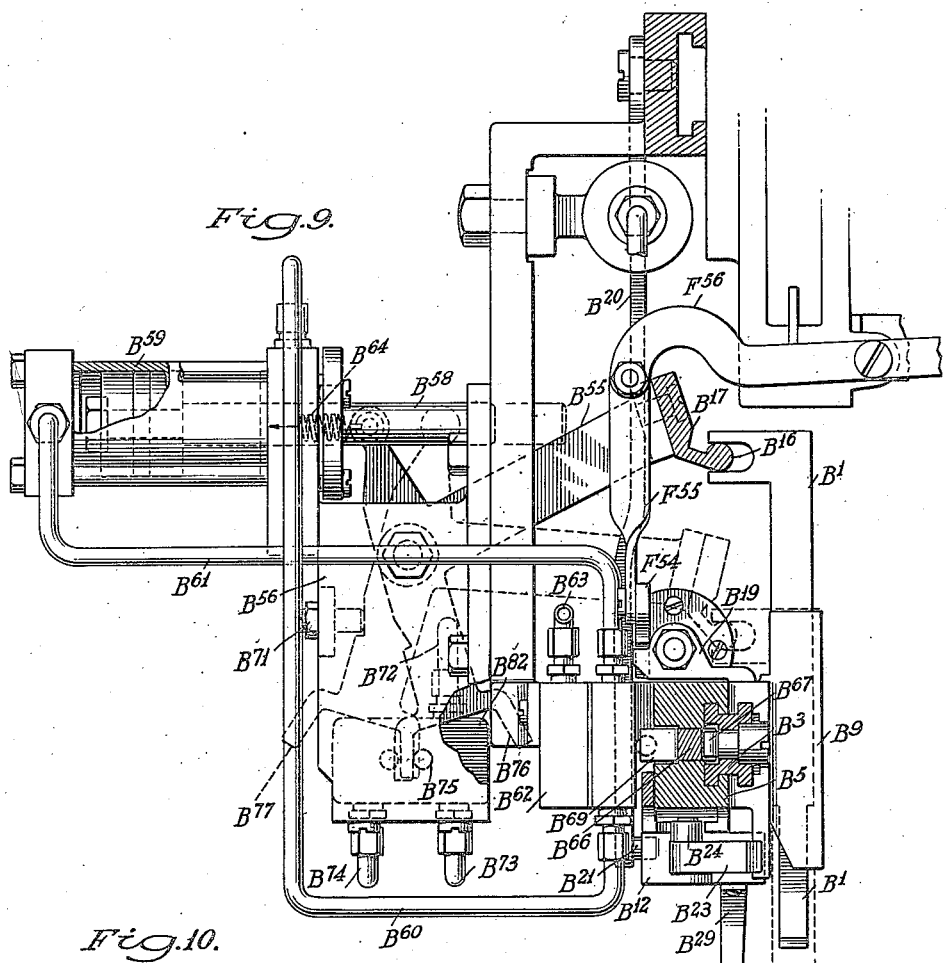
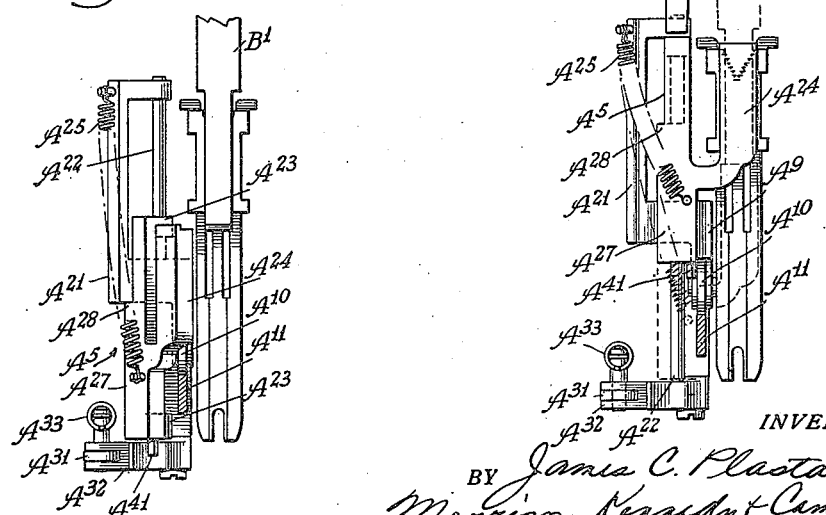

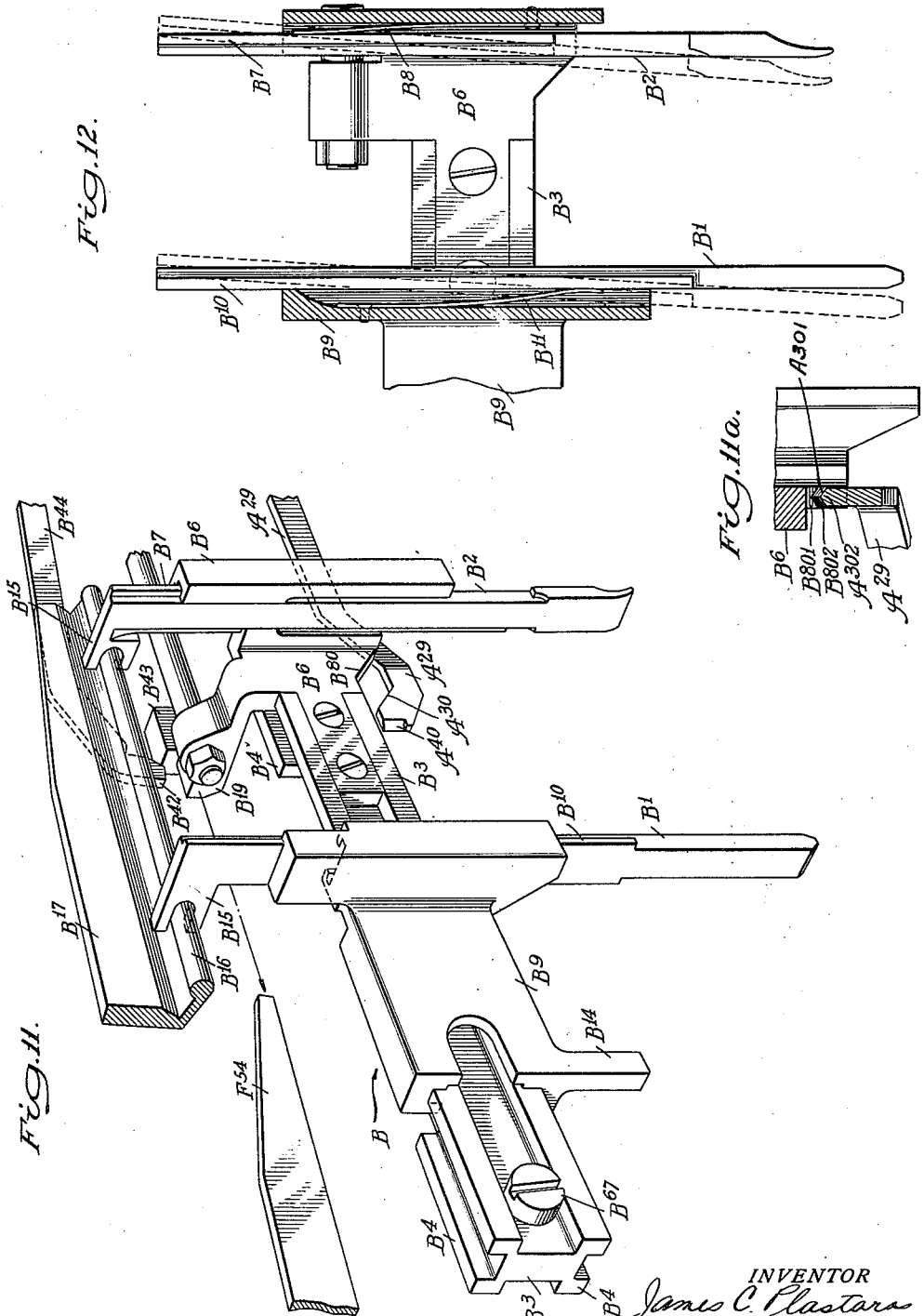

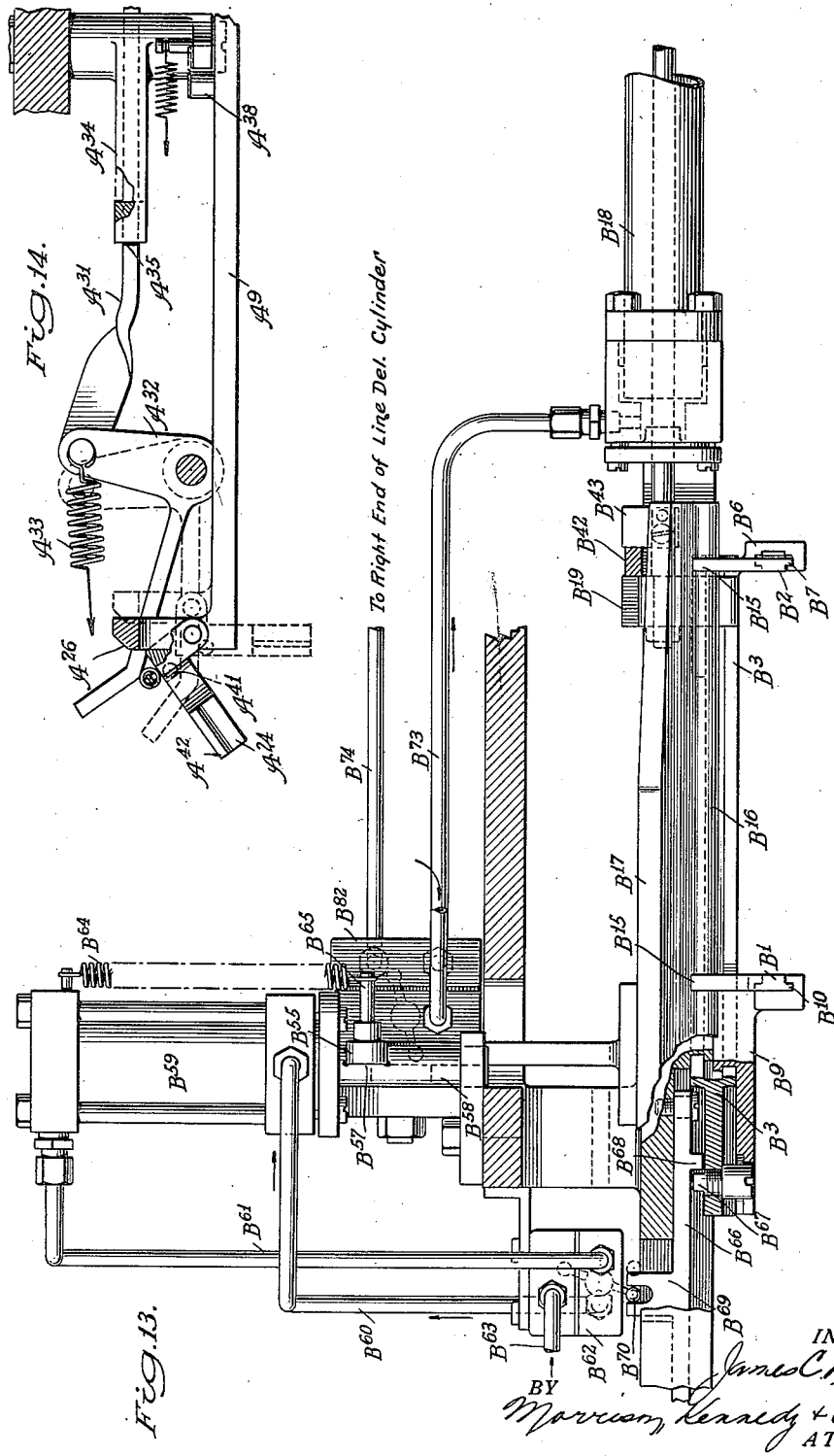

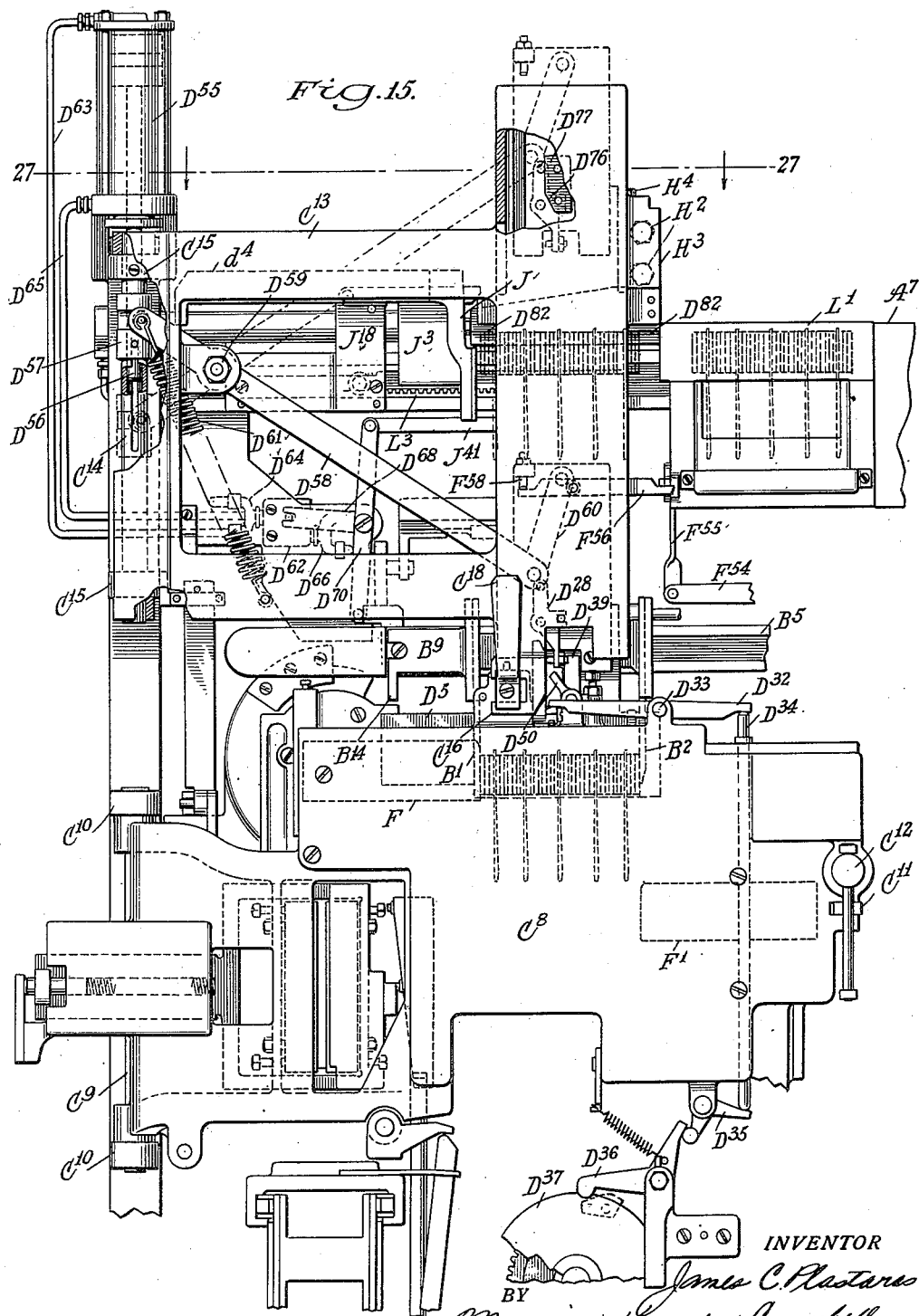

Jan. 5, 1943.  J. C. PLASTARAS  2,307,069
TYPOGRAPHICAL COMPOSING, CASTING, AND DISTRIBUTING MACHINE
Filed Feb. 4, 1941  31 Sheets-Sheet 10
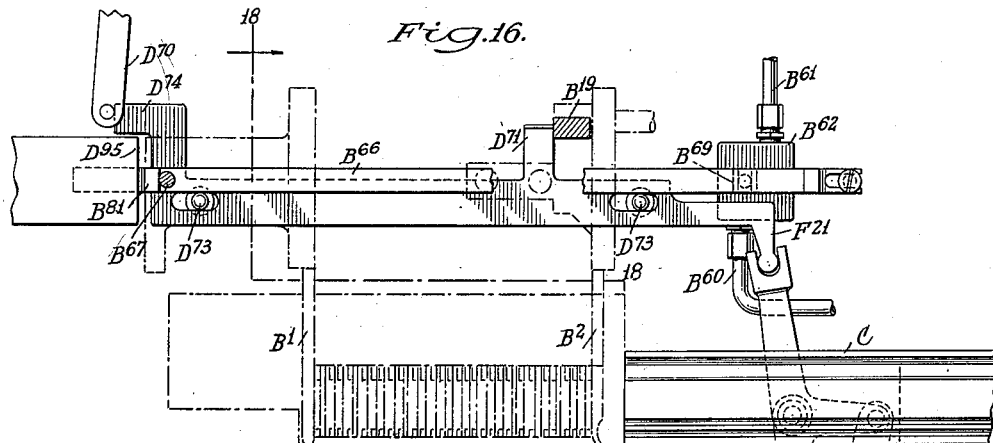
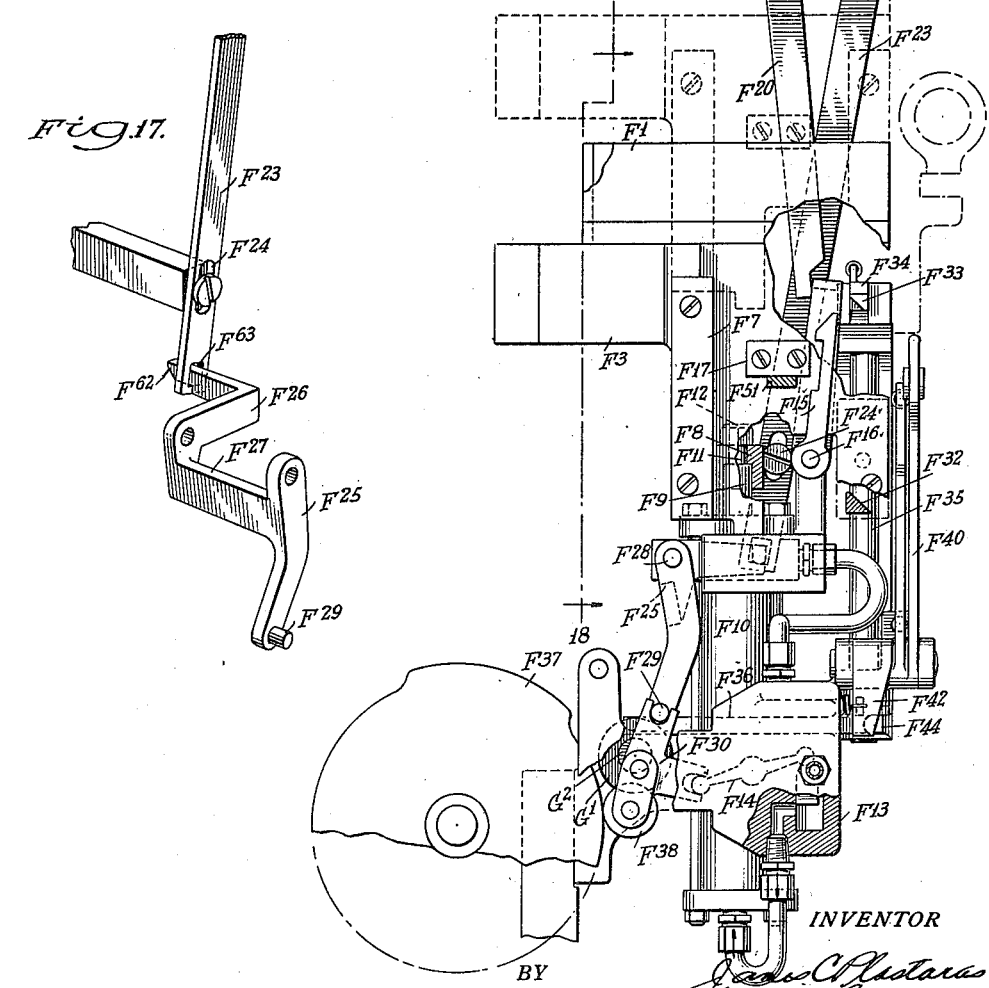

Jan. 5, 1943.  J. C. PLASTARAS  2,307,069
TYPOGRAPHICAL COMPOSING, CASTING, AND DISTRIBUTING MACHINE
Filed Feb. 4, 1941   31 Sheets-Sheet 11

INVENTOR
James C. Plastaras
BY Morrison, Kennedy & Campbell
ATTORNEYS

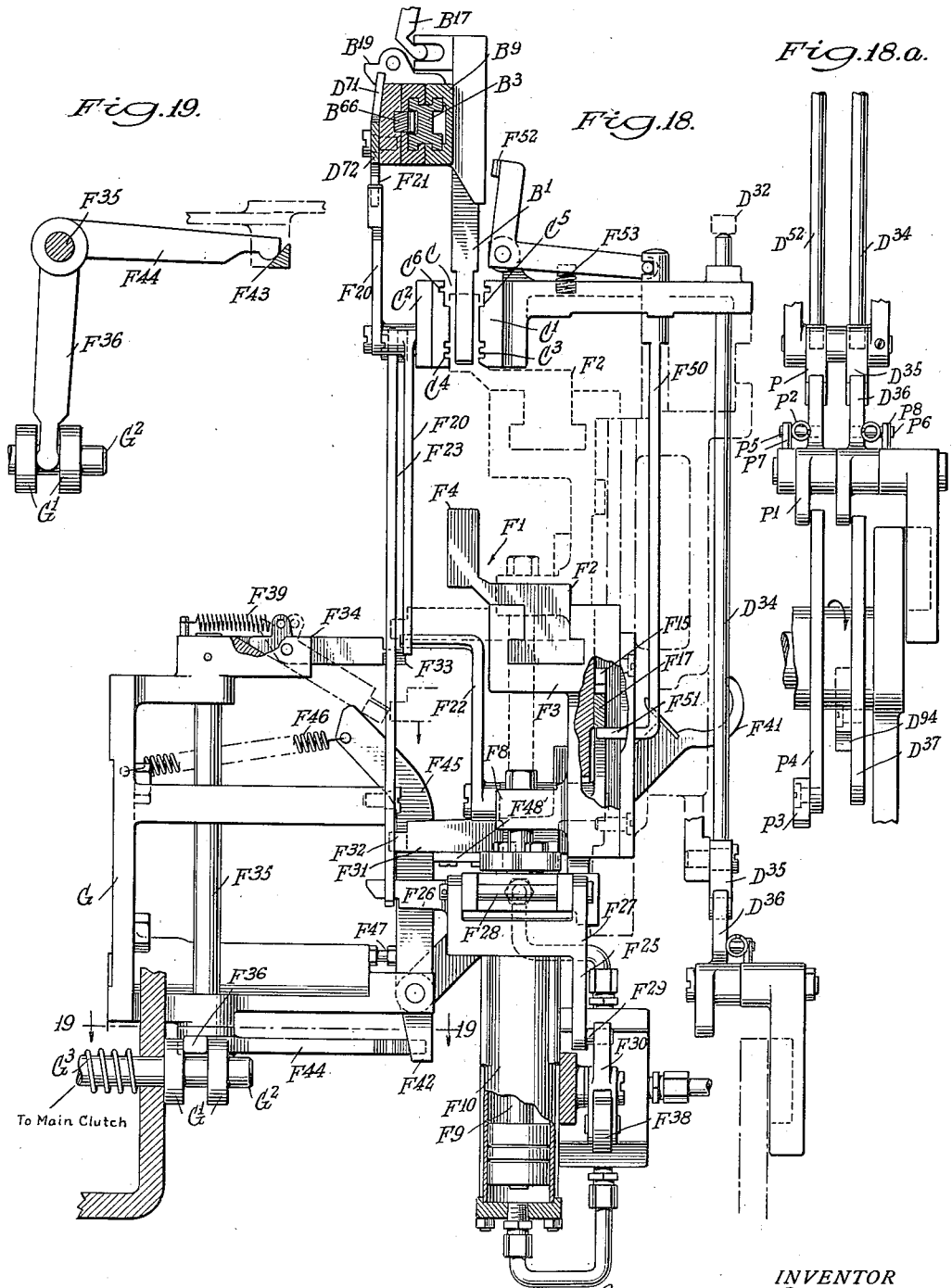

Jan. 5, 1943. J. C. PLASTARAS 2,307,069
TYPOGRAPHICAL COMPOSING, CASTING, AND DISTRIBUTING MACHINE
Filed Feb. 4, 1941 31 Sheets-Sheet 13
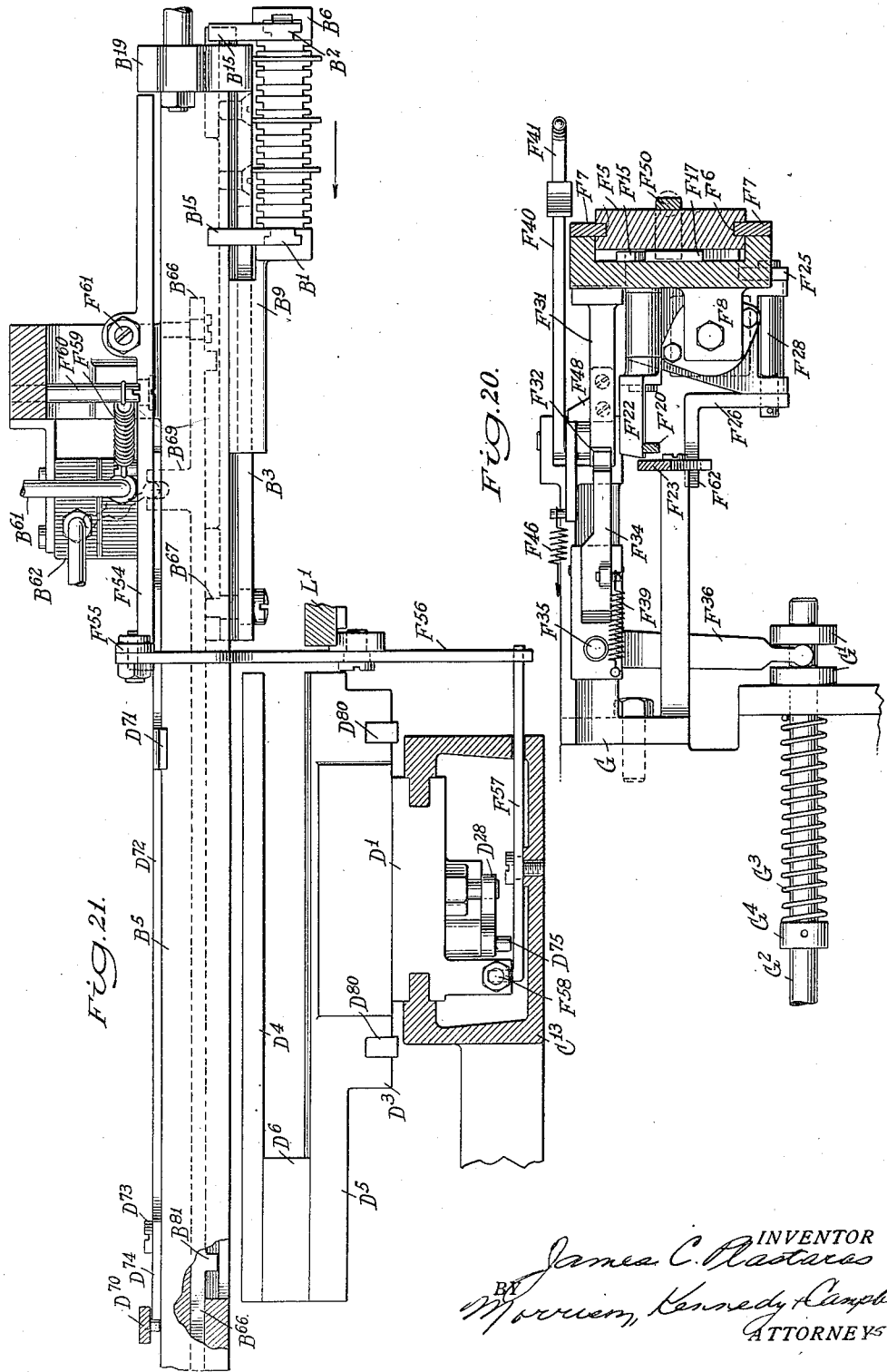

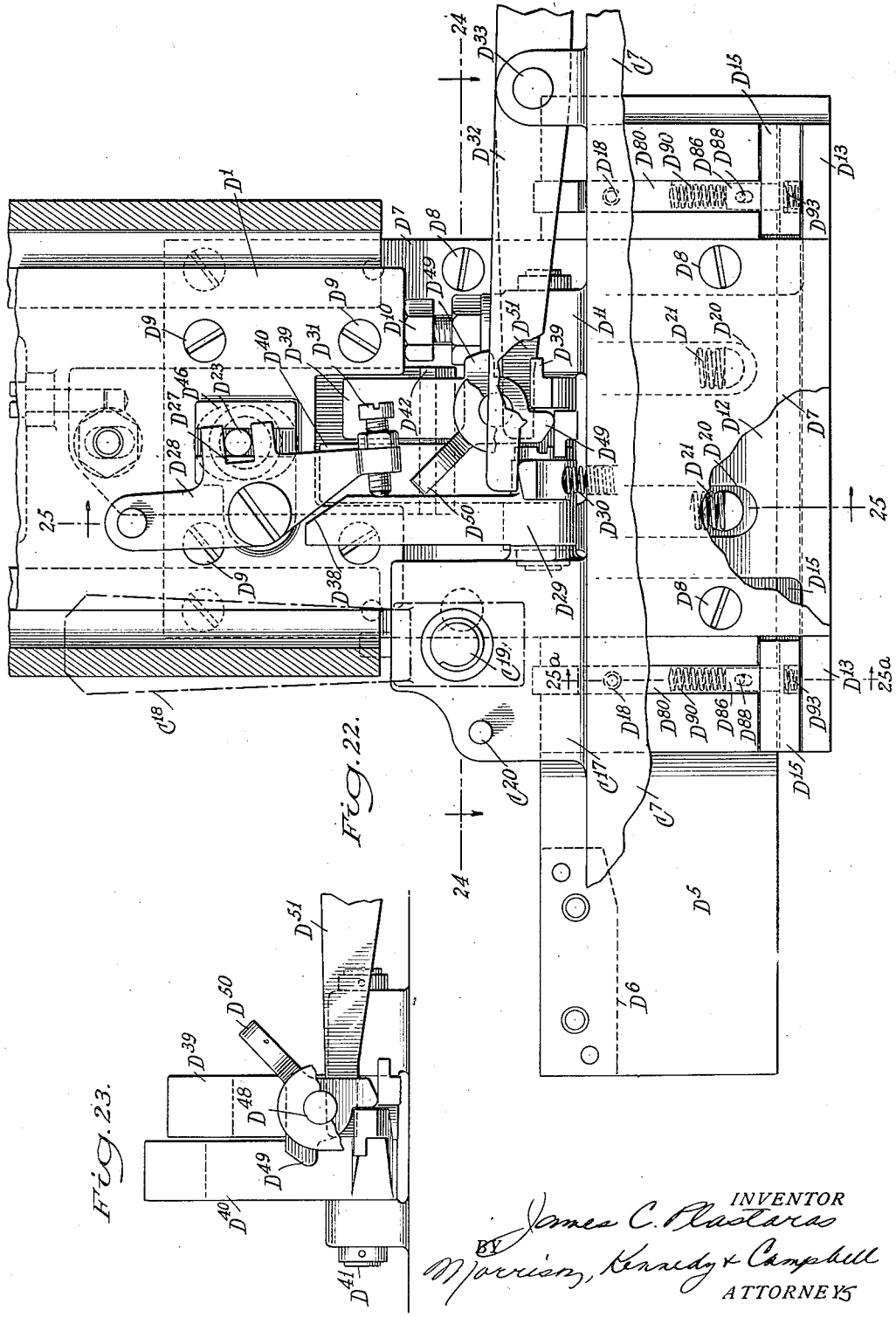

Jan. 5, 1943.   J. C. PLASTARAS   2,307,069
TYPOGRAPHICAL COMPOSING, CASTING, AND DISTRIBUTING MACHINE
Filed Feb. 4, 1941   31 Sheets-Sheet 15
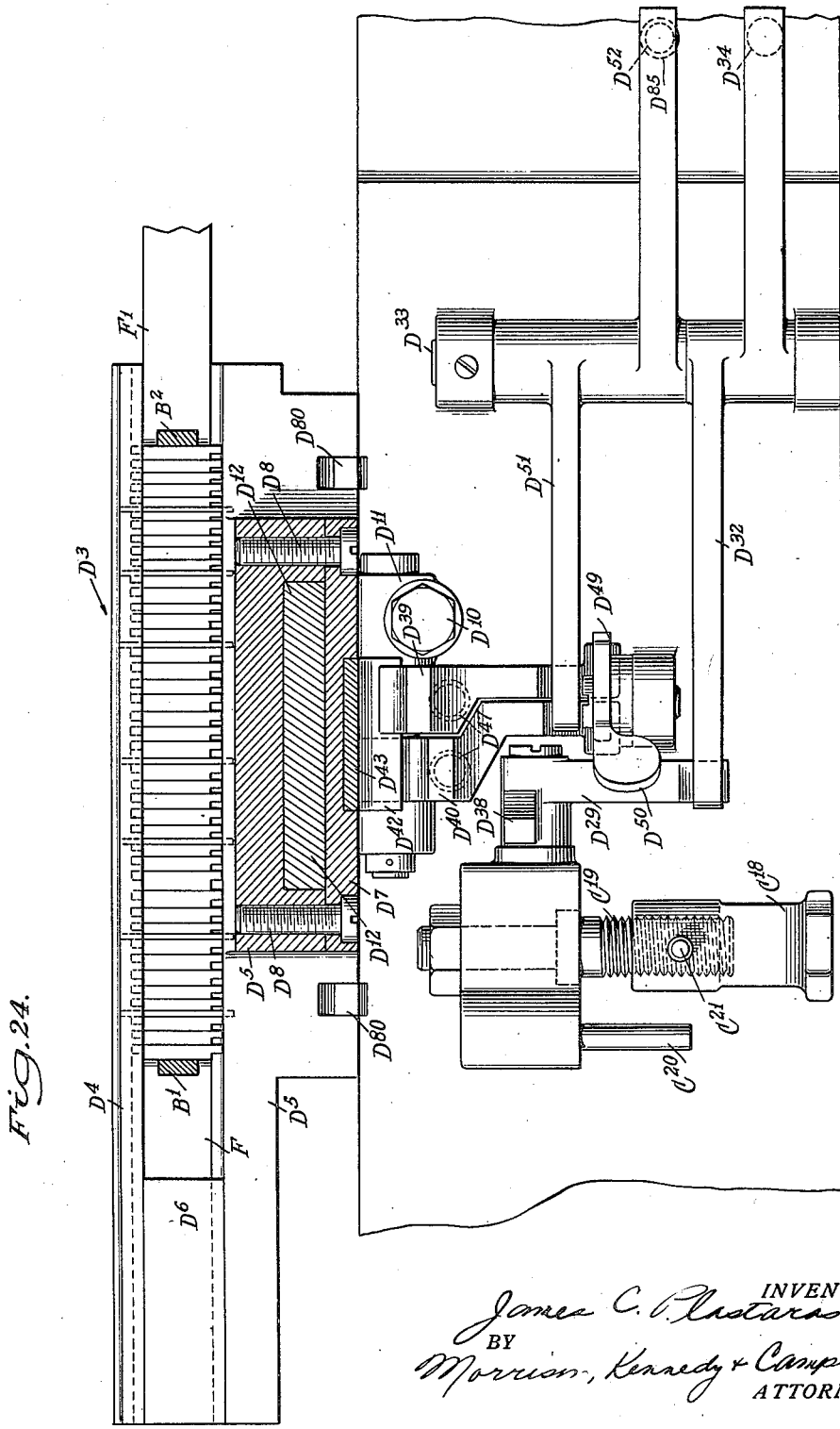
INVENTOR
James C. Plastaras
BY
Morrison, Kennedy & Campbell
ATTORNEYS Jan. 5, 1943.　　　J. C. PLASTARAS　　　2,307,069
TYPOGRAPHICAL COMPOSING, CASTING, AND DISTRIBUTING MACHINE
Filed Feb. 4, 1941　　　31 Sheets-Sheet 16

INVENTOR
James C. Plastaras
BY Morrison, Kennedy & Campbell
ATTORNEYS

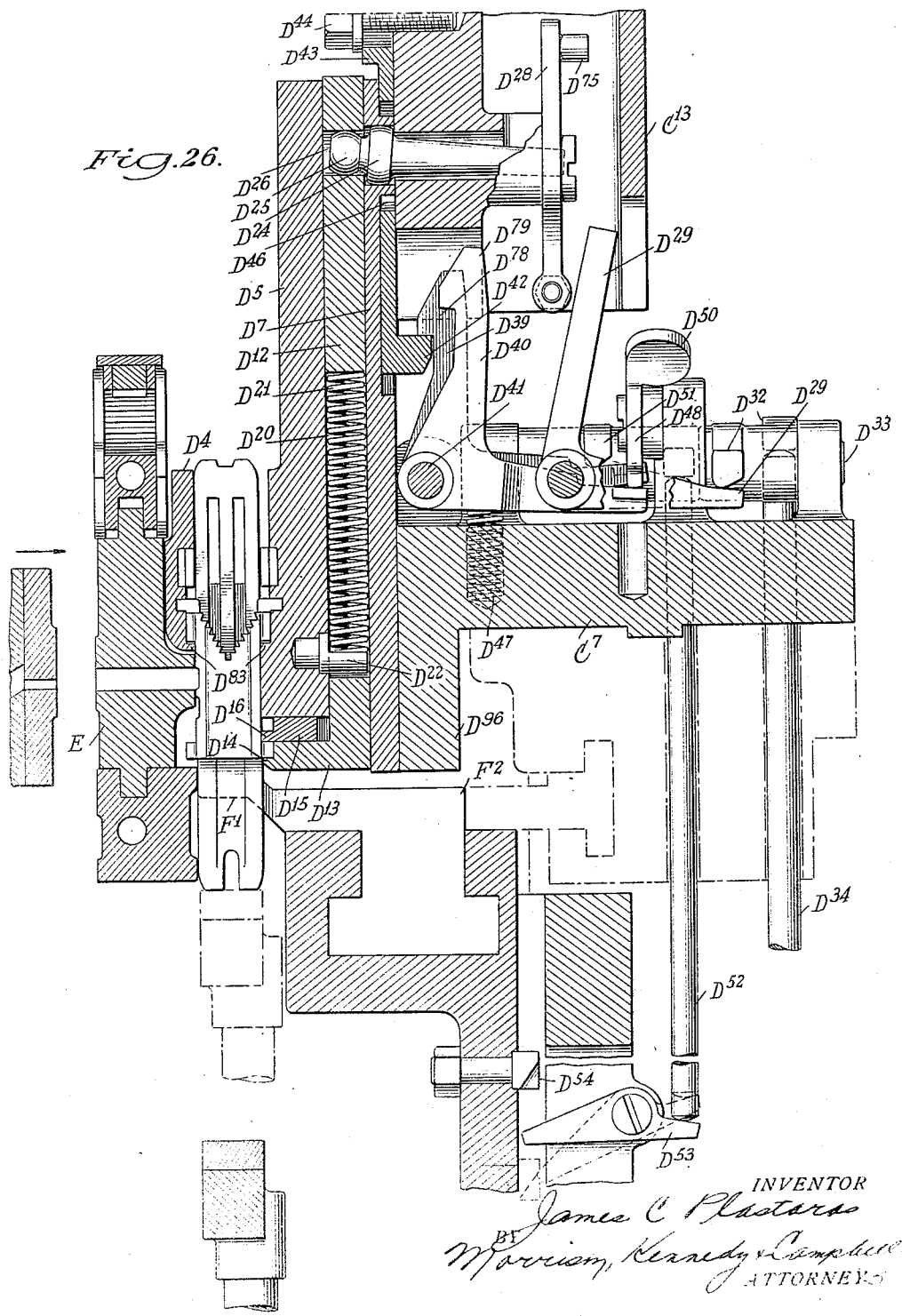

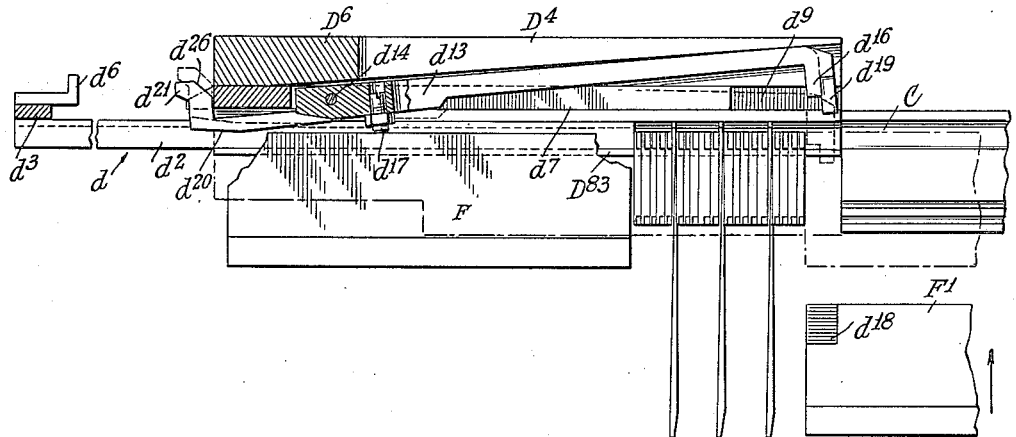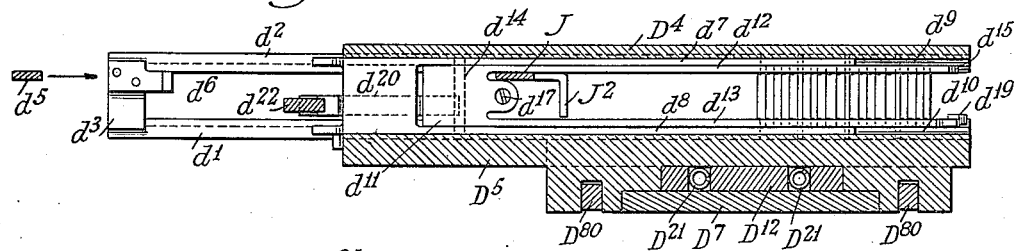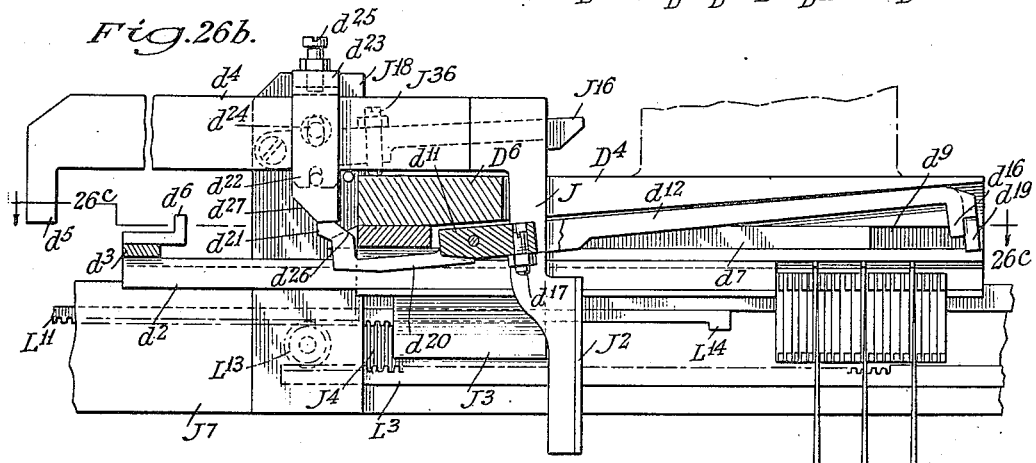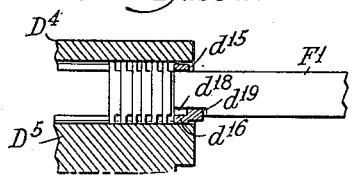

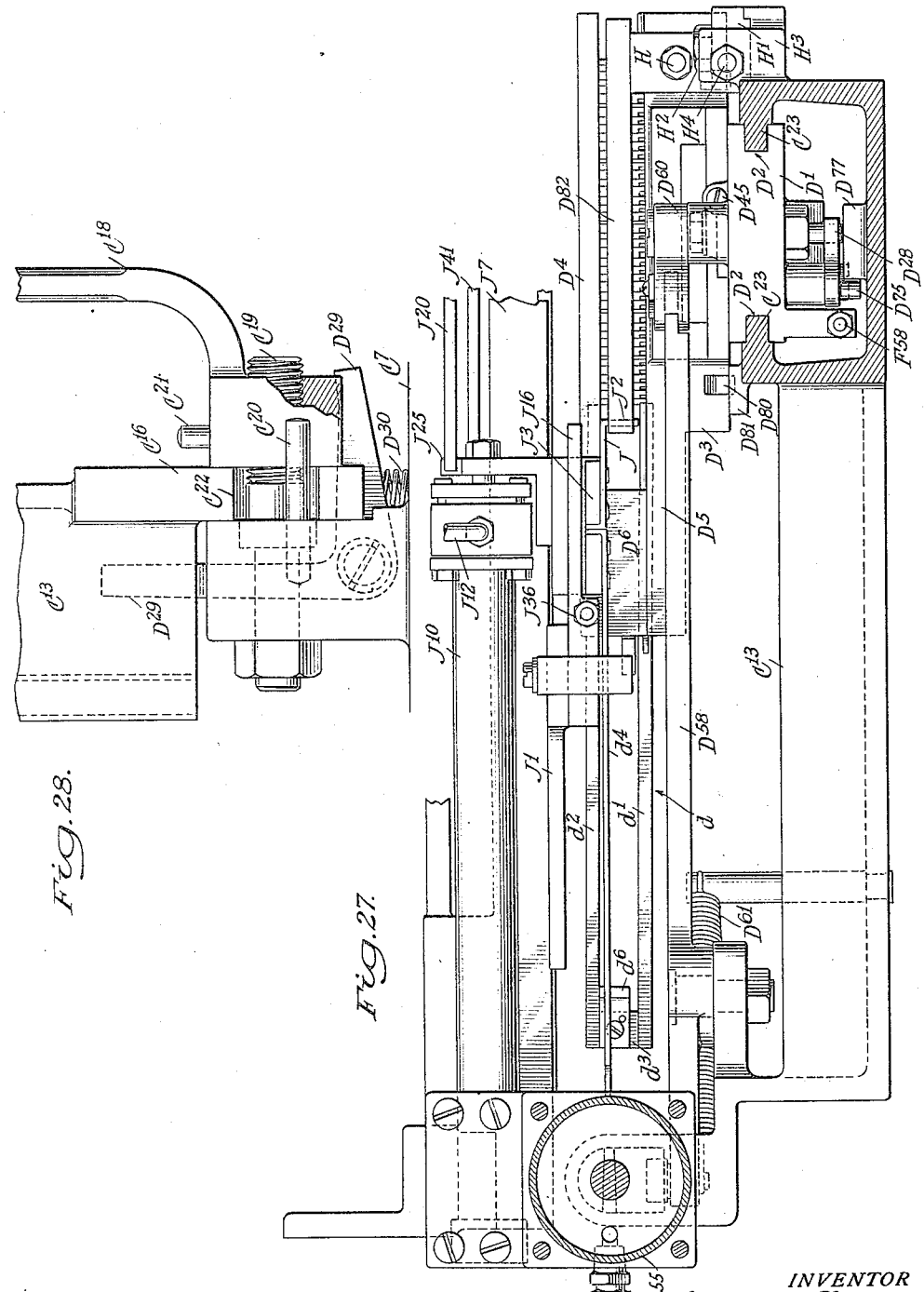

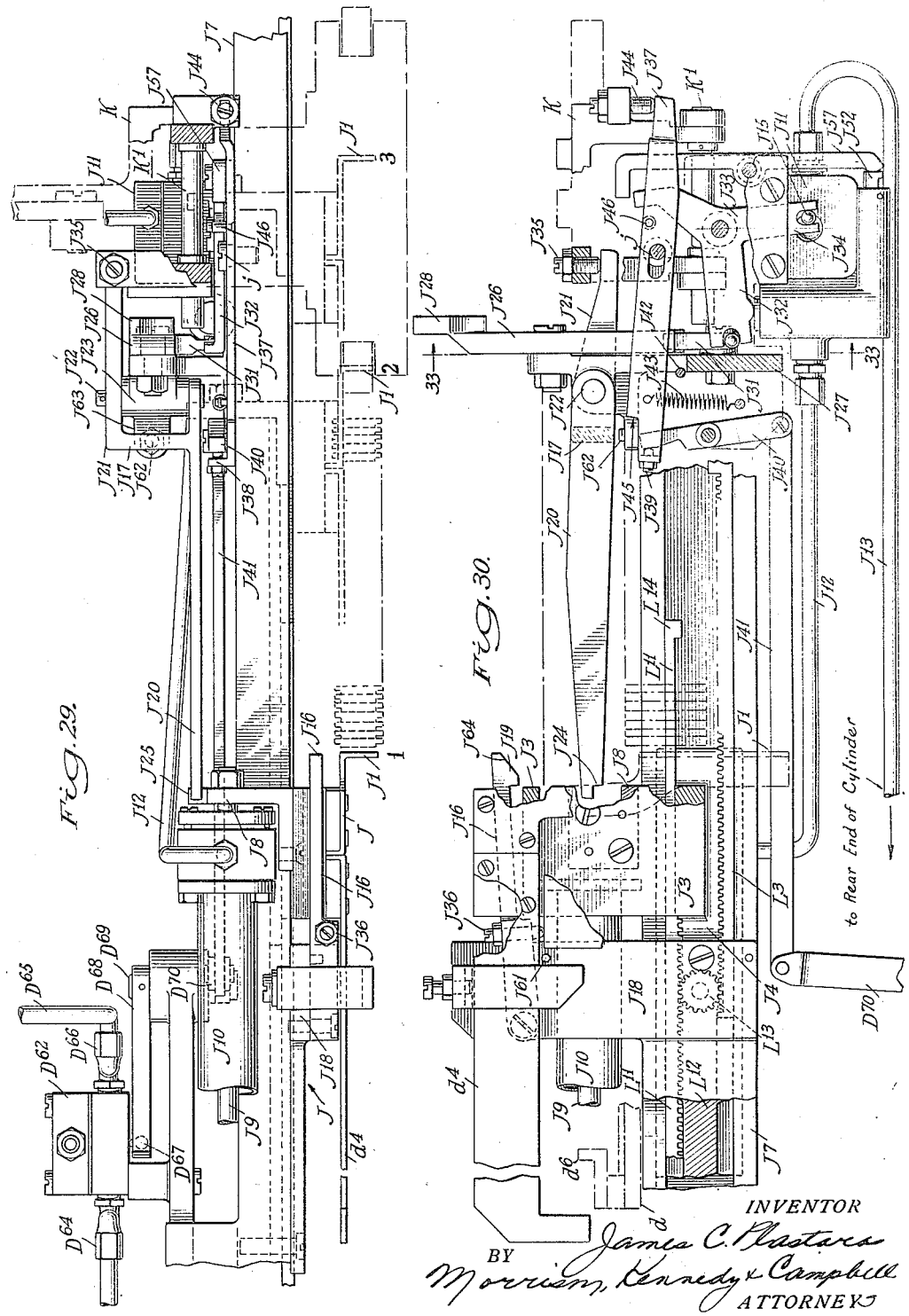

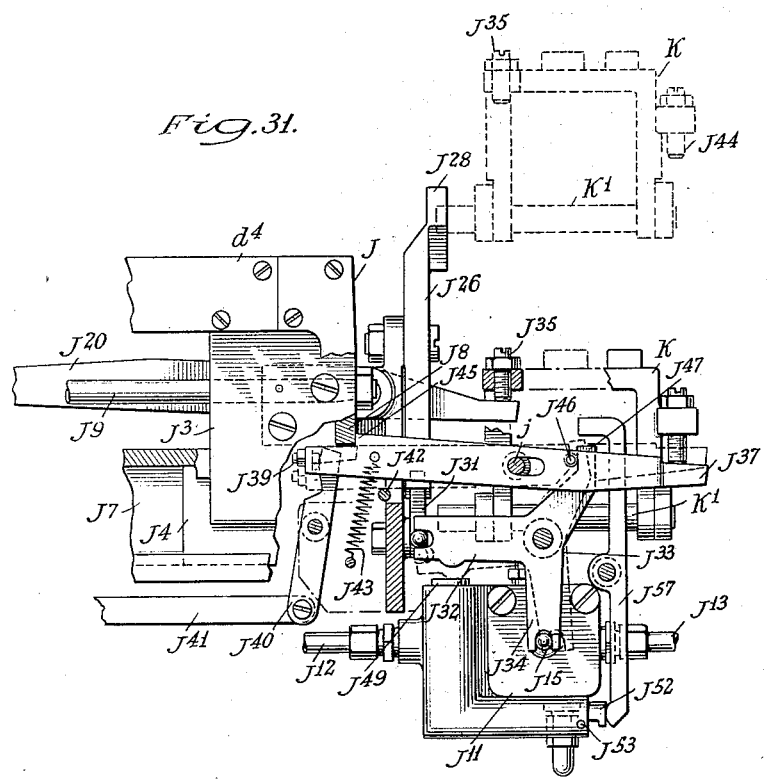

Jan. 5, 1943.   J. C. PLASTARAS   2,307,069
TYPOGRAPHICAL COMPOSING, CASTING, AND DISTRIBUTING MACHINE
Filed Feb. 4, 1941   31 Sheets-Sheet 22
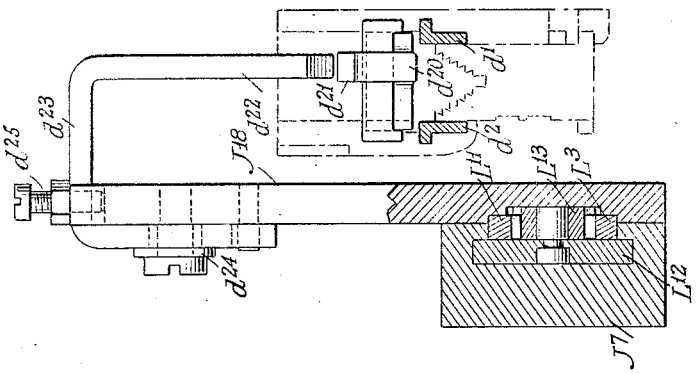
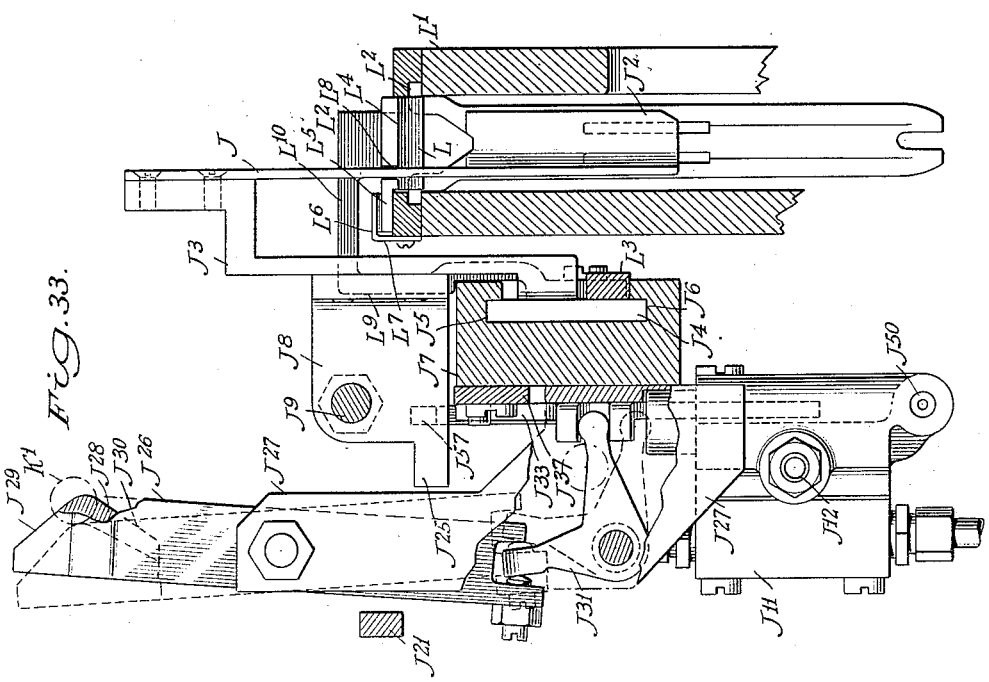
INVENTOR
James C. Plastaras
BY Morrison, Kennedy & Campbell
ATTORNEYS Jan. 5, 1943.  J. C. PLASTARAS  2,307,069
TYPOGRAPHICAL COMPOSING, CASTING, AND DISTRIBUTING MACHINE
Filed Feb. 4, 1941  31 Sheets-Sheet 23
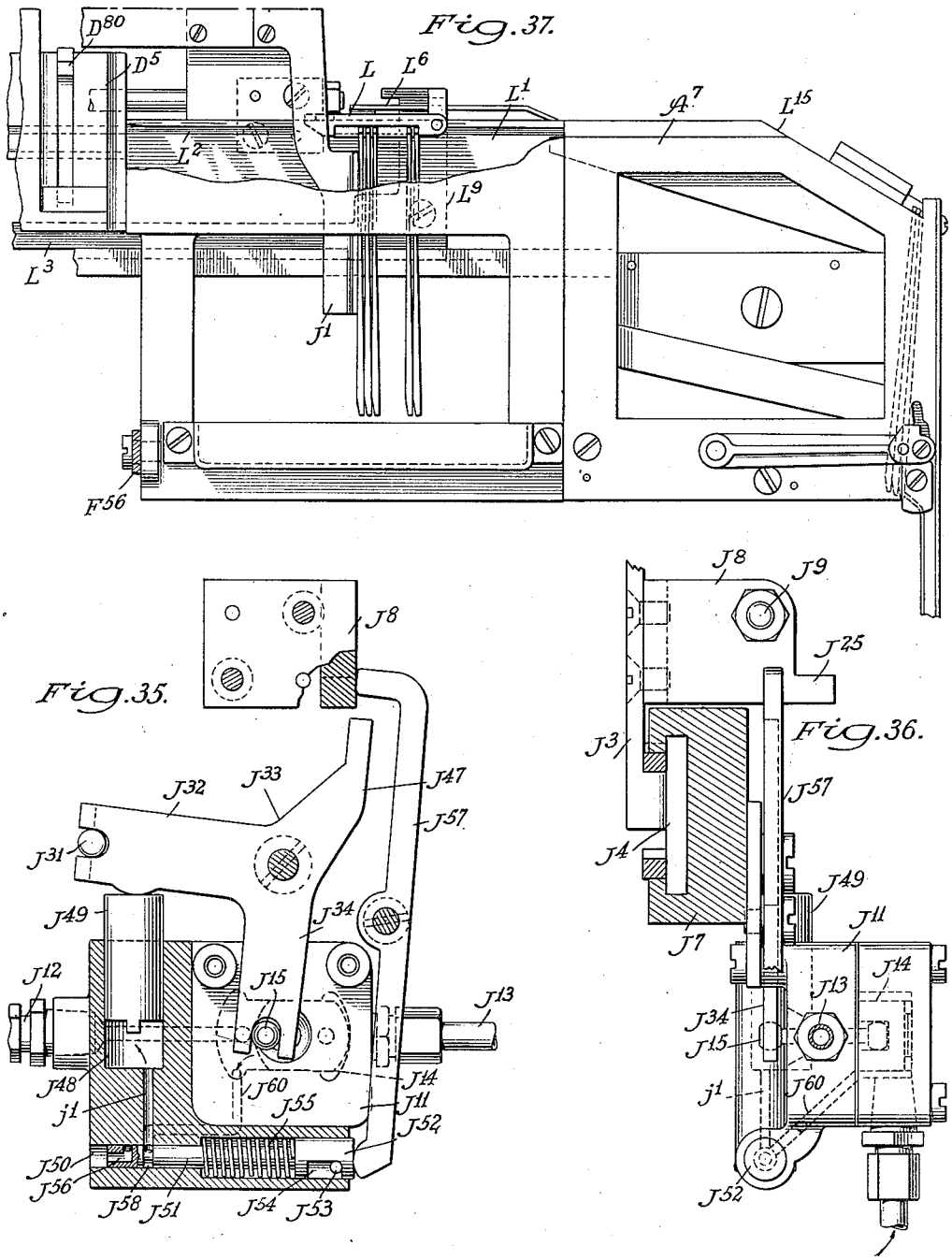

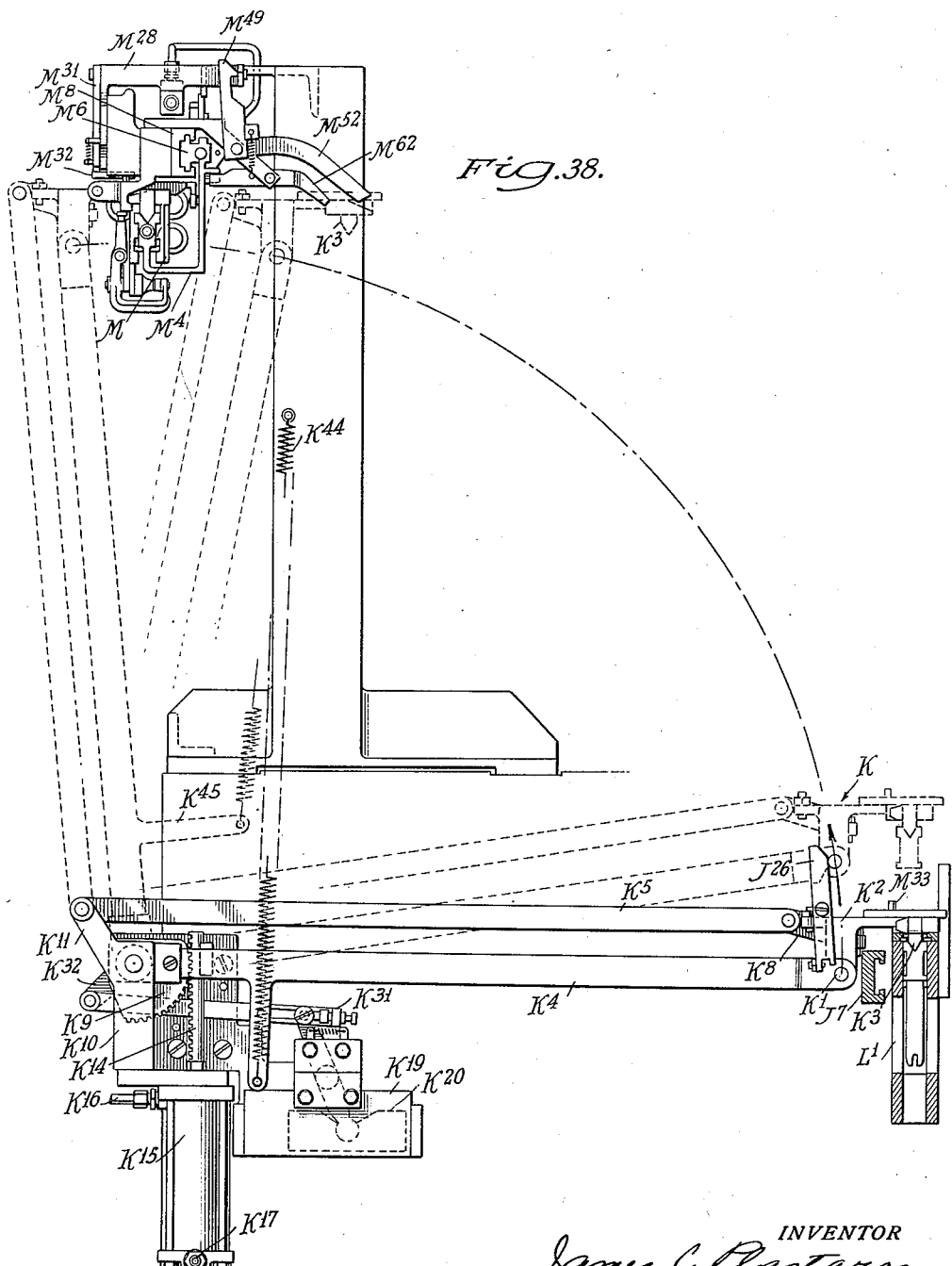

Jan. 5, 1943.   J. C. PLASTARAS   2,307,069
TYPOGRAPHICAL COMPOSING, CASTING, AND DISTRIBUTING MACHINE
Filed Feb. 4, 1941    31 Sheets-Sheet 25
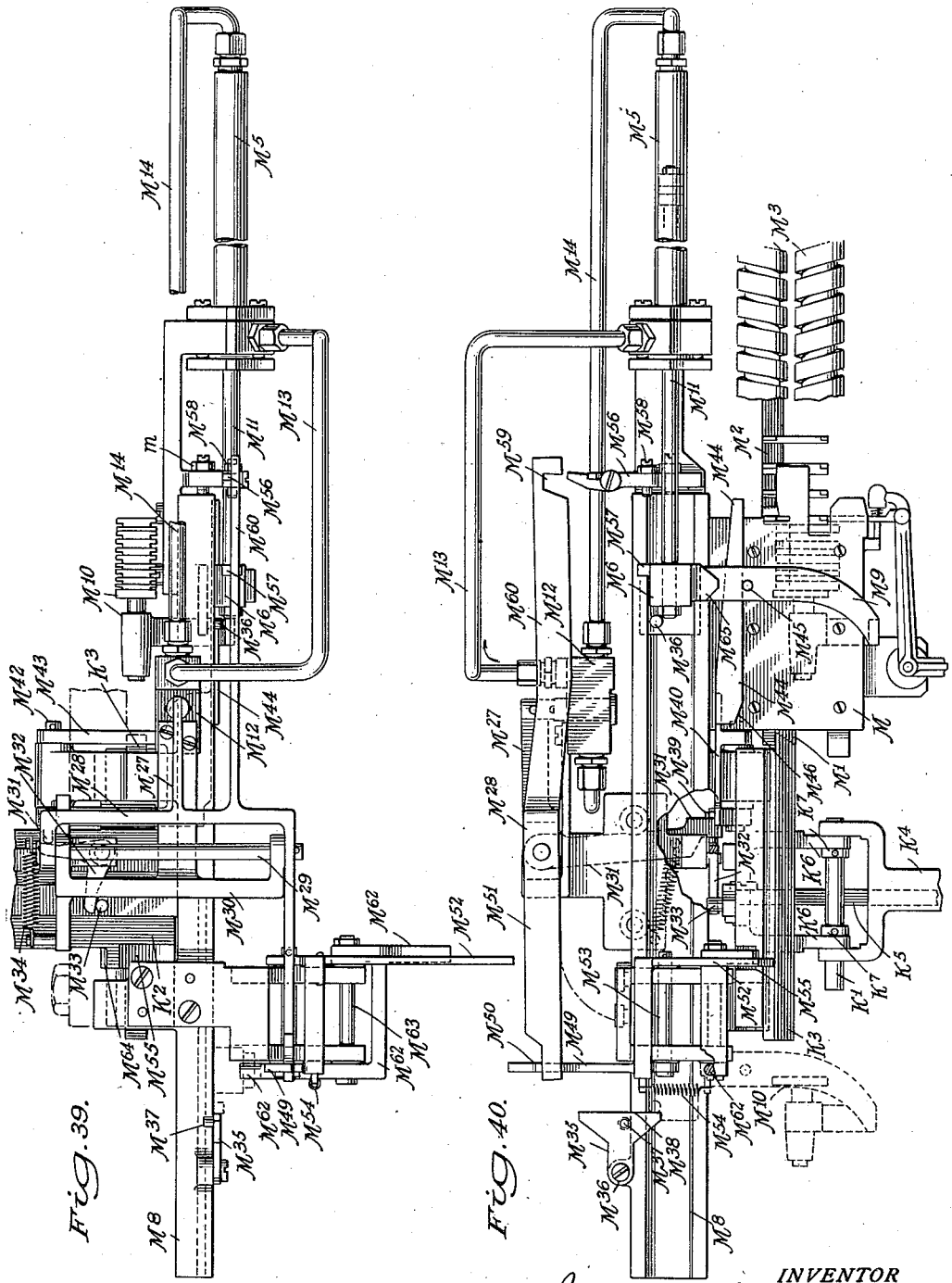
INVENTOR
James C. Plastaras
BY
Morrison, Kennedy & Campbell
ATTORNEYS

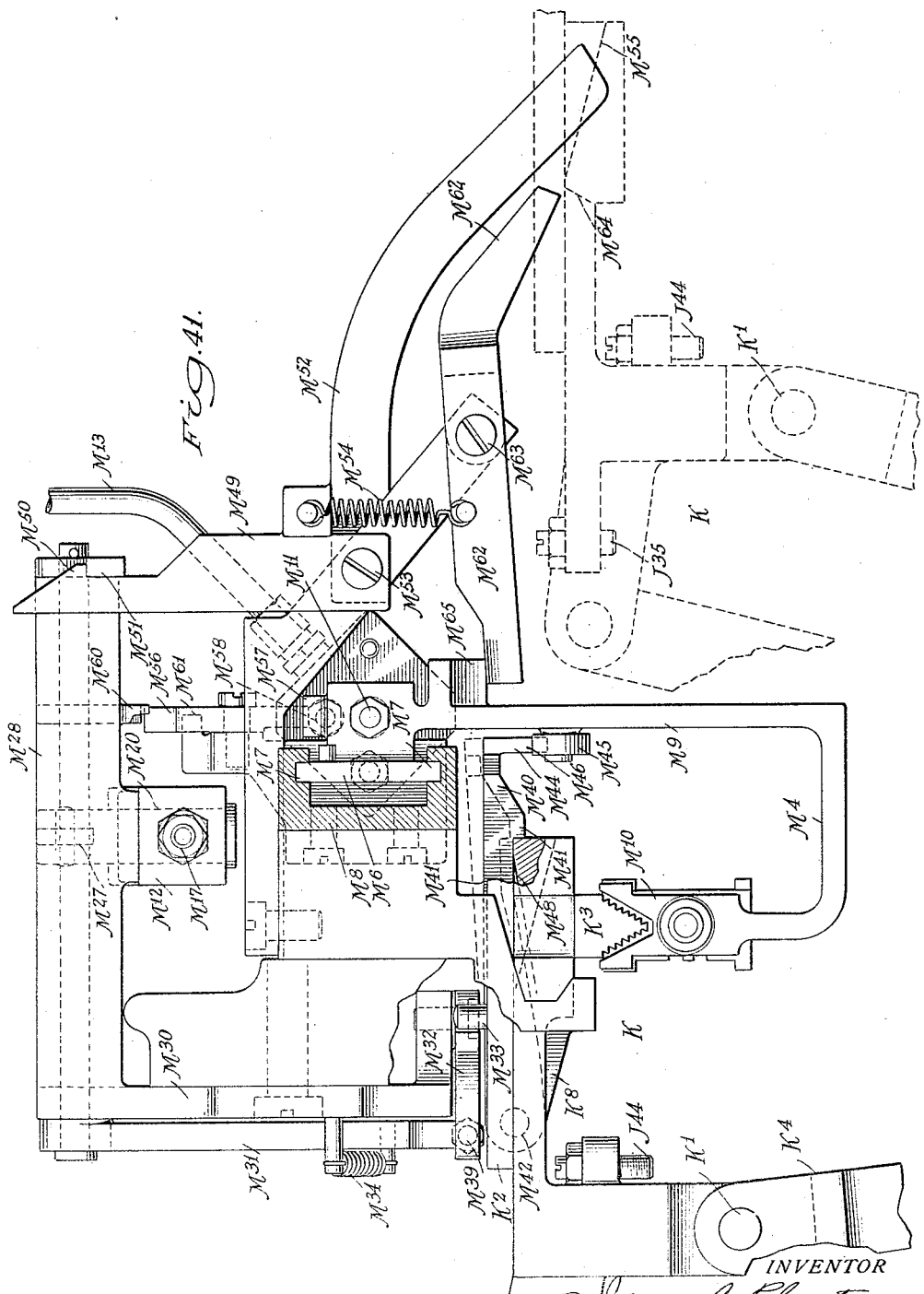

Jan. 5, 1943.  J. C. PLASTARAS  2,307,069
TYPOGRAPHICAL COMPOSING, CASTING, AND DISTRIBUTING MACHINE
Filed Feb. 4, 1941   31 Sheets-Sheet 27
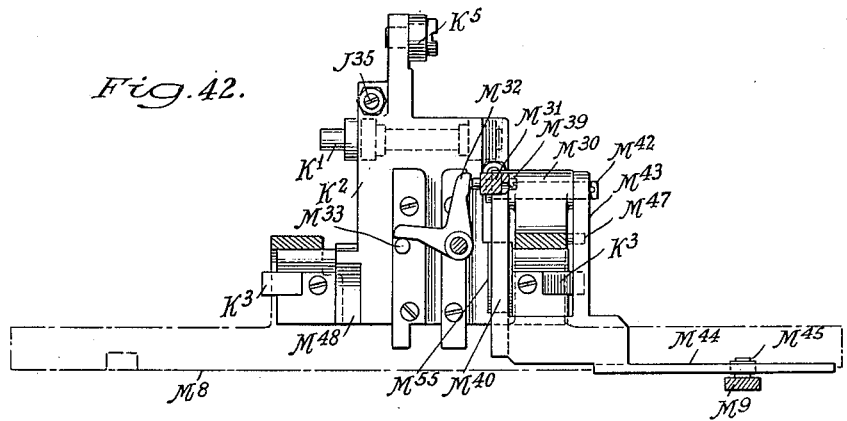
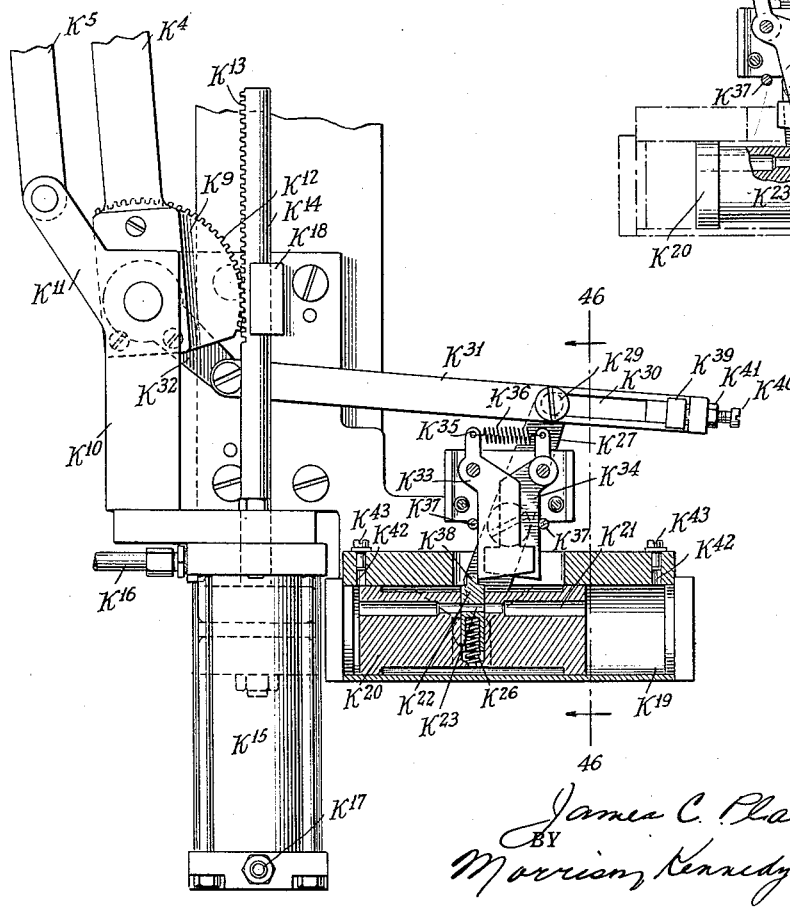
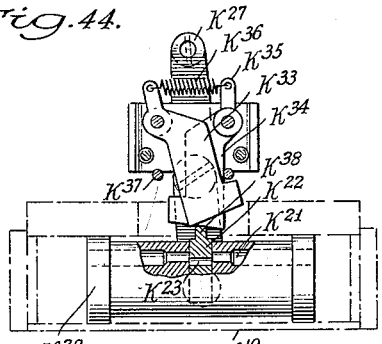
INVENTOR
James C. Plastaras
BY
Morrison, Kennedy & Campbell
ATTORNEYS

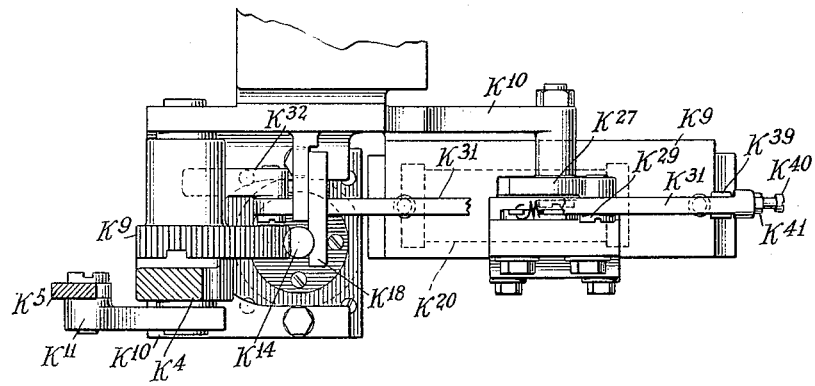
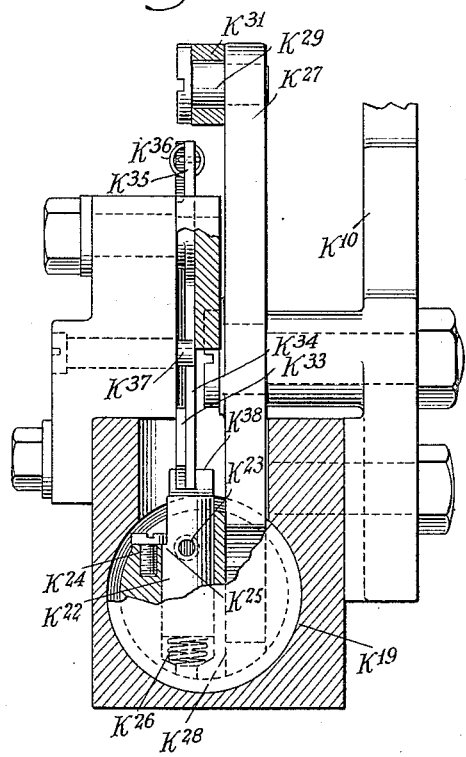
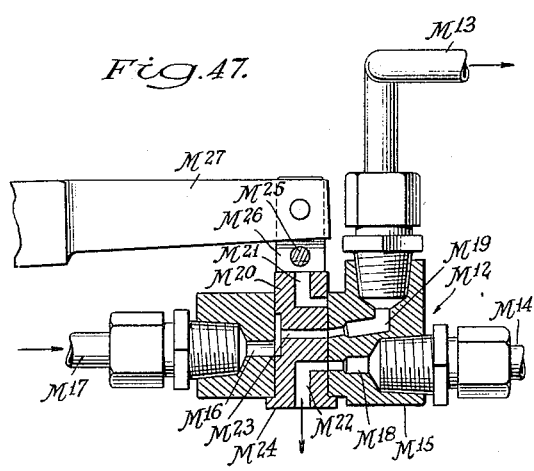

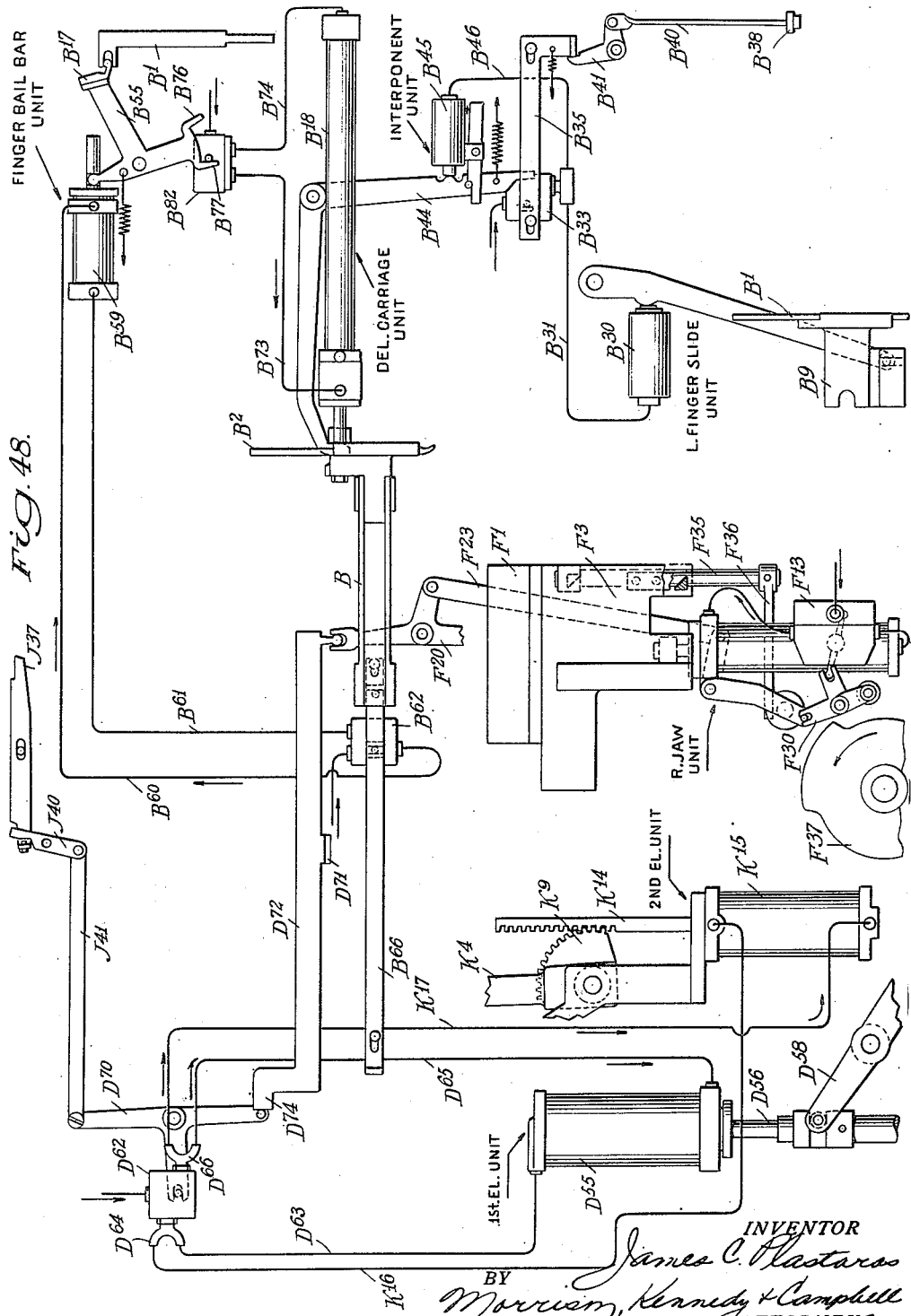

Jan. 5, 1943. J. C. PLASTARAS 2,307,069
TYPOGRAPHICAL COMPOSING, CASTING, AND DISTRIBUTING MACHINE
Filed Feb. 4, 1941 31 Sheets-Sheet 30
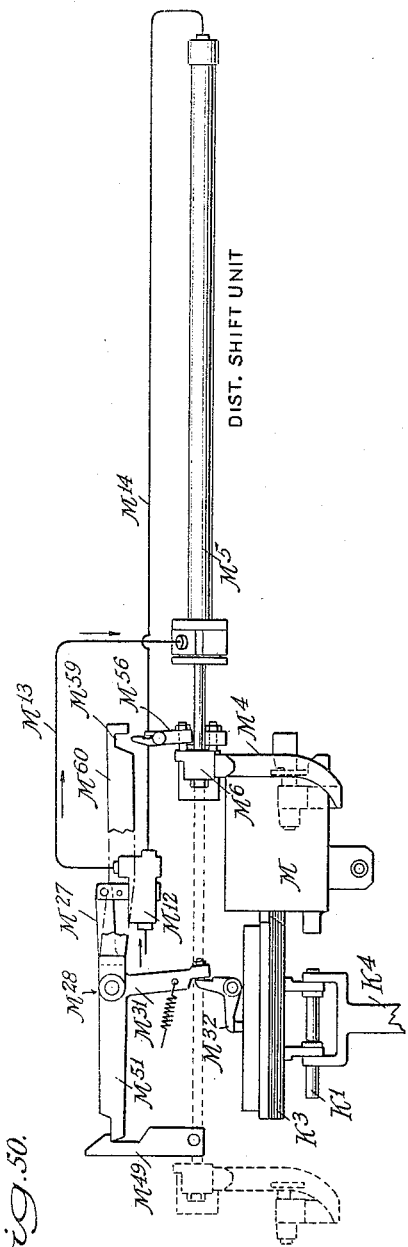
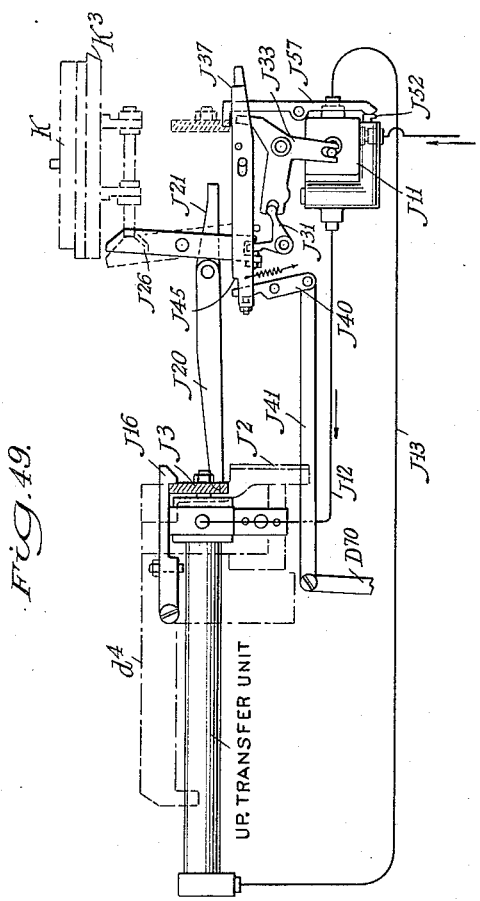
INVENTOR
James C. Plastaras
BY Morrison, Kennedy & Campbell
ATTORNEYS

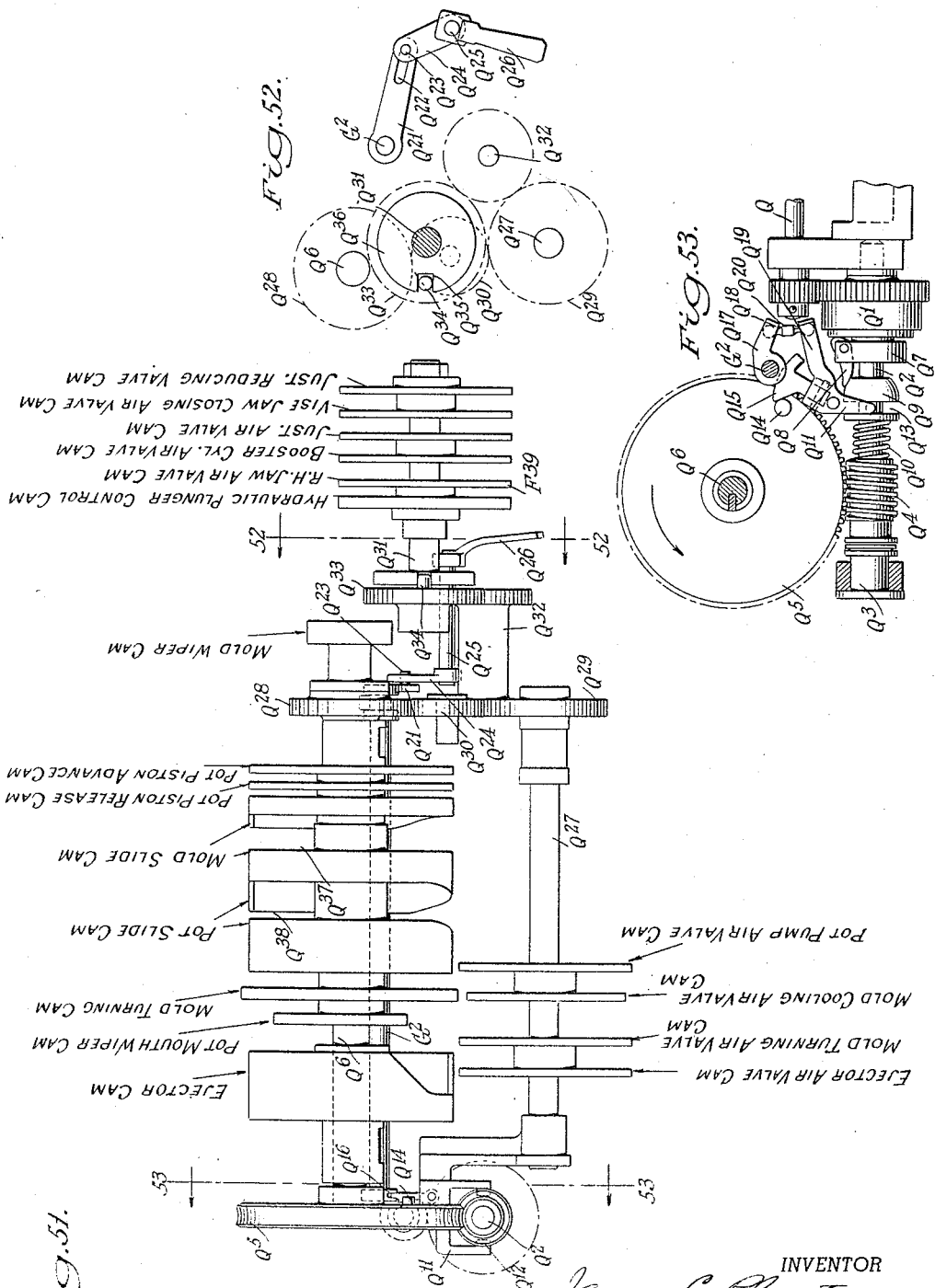

Patented Jan. 5, 1943

2,307,069

UNITED STATES PATENT OFFICE 2,307,069

TYPOGRAPHICAL COMPOSING, CASTING, AND DISTRIBUTING MACHINE

James C. Plastaras, Laurelton, N. Y., assignor to Mergenthaler Linotype Company, a corporation of New York Application February 4, 1941, Serial No. 377,364

206 Claims. (Cl. 199—11)

This invention relates to typographical composing, casting and distributing machines of the general organization wherein circulating matrices are released from a magazine in the order in which their characters are to appear in print, the matrices assembled in line together with spacebands which likewise are released from a storage magazine, the composed line transferred to a first elevator which presents it to the face of a slotted mold where the line is justified between two clamping jaws, the mold filled with molten metal to cast a slug or "Linotype" against the matrices, and the line thereafter transferred into an upper transfer channel, from which the matrices are transported by a second elevator to a distributor mechanism for return to the magazine from which they started, and from which the spacebands after separation from the matrices are also restored to their magazine.

The machine herein shown and described is substantially new in its entirety. Among other things, the desiderata of the new design included economy of manufacture, increased speed of operation, and a slug of improved quality. All of these results have been accomplished in a marked degree.

Copending applications Serial Nos. 269,833, 311,091 and 355,434, filed respectively on April 25, 1939, December 27, 1939, and September 5, 1940, deal with some phases of the new machine. Other phases are dealt with in applications Serial Nos. 383,133, 390,558, 408,456, 412,144, 416,325, filed respectively on March 31, 1941, April 26, 1941, August 27, 1941, September 24, 1941, and October 24, 1941. The instant invention deals chiefly with those phases of the machine relating to the assembling of the matrices, the delivery of the composed line to the first elevator, the presentation of the line to the casting mechanism, and the distribution of the matrices after casting, or, in short, to those phases concerned with the transfer of composed lines through the machine.

Economy in manufacture has been obtained by eliminating many of the large castings heretofore present in the commercial linotype machine. The heavy cam shaft typical of prior machines, and which served to transmit power from a main power unit to the various operating organs as well as to time their operation, has been dispensed with together with substantially all of the long and ponderous power transmitting levers and springs. In the improved machine, it is true, a one-revolution cam shaft is employed, but it is relatively small and light and for the most part serves merely as a timing device for certain of the machine organs. The timing of other machine organs is effected by a series of terminal controls requiring one organ to complete its function in order to initiate the operation of the organ performing the function next in order. This feature not only leads to compactness but also acts as a safety measure since if one part fails to complete its operation, the operation of those following will be prevented. The failure of any part to operate also apprises the operator immediately as to the location of the fault.

Throughout the machine, the various operating organs are equipped with individual power units located in close proximity to the parts which they control, thereby eliminating many intermediate connections such as are necessary when the power is derived from a common unit located in some remote part of the machine. The elimination of the heavy power transmitting connections, coupled with a lightening of the movable parts, has decreased inertia to such an extent that the parts not only are enabled to move faster but also to accelerate and decelerate more quickly, resulting in much time saving insofar as certain of the operations are concerned. The speeding up of certain operations has enabled more time to be devoted to other operations which require it. Thus, by way of example, while the output of the machine is in the neighborhood of 10 slugs per minute as compared with 6 for the standard machine, the time devoted to the actual casting of a slug has been increased, a condition which results in a much improved slug.

In the embodiment illustrated and described, the individual power units are valve-controlled pneumatically-operated cylinder-and-piston devices, such power units being eminently suited for a machine of this character wherein, for the most part, the movable organs are of a reciprocating character. However, it will be understood that, in the broader aspects of the invention, other types of individual power units could be employed if desired. The pneumatically-operated power unit has the further advantage that, while all necessary power and speed of operation can readily be obtained, nevertheless, because such power units drive impositively, their operation will be arrested in the event of any interference with normal machine operation. This is a safety factor not only as concerns the machine itself, since breakage of the parts will be prevented, but also as concerns the operator as well.

For purposes of the present description, it can be assumed that the matrices are released from their storage magazines in the usual way, traveling down through the assembler entrance to the assembler proper where they are stacked in line along with spacebands released from a storage magazine located above the assembler at the left of the matrix magazines. In the instant machine, the assembler is fixed but is provided, as usual, with an assembler slide having a line resistant for supporting the leading matrix in the line. The assembler slide is advanced toward the left, as the line is composed, by a star wheel which pushes against each matrix as it is deposited in the assembler to make room for the one to follow.

After its composition is completed, the operator inaugurates the delivery of the line to the first elevator merely by the depression of a finger key. Mechanism controlled by the finger key acts, first, to move the left-hand finger (which is mounted for relative movement on the line delivery slide) toward the right until it is arrested by a stop previously positioned automatically according to the length of the composed line in the assembler. Immediately thereafter, the right-hand finger (which is normally located slightly to the left of the last matrix in the line) is also moved toward the right into engaging relation to the end of the line, whereupon, through a terminal control, an individual power unit is energized to move both fingers downwardly into engagement with the opposite ends of the composed line. In its downward movement, the left-hand finger depresses the line resistant (which is arranged for vertical sliding movement at the leading end of the assembler slide) to a position where it is swung out of the path of the line, the left-hand finger taking over the support of the line at its leading end.

The line delivery slide (on which the right and left-hand fingers are mounted for the vertical movement just described) is movable horizontally to and fro between the assembler and the first elevator by an individual power unit. As the right and left-hand fingers complete their downward movement into engagement with the opposite ends of the line, a terminal control is operated, causing the power unit just mentioned to move the line delivery carriage to the left, with the result that the composed line is transferred directly to the first elevator, which is normally positioned to receive the line at the composing level. In the meantime, the line resistant and the assembler slide are restored to their normal positions, enabling the operator to proceed with the composition of the next line.

Since the instant machine employs what is known as a "straight line transfer," the right-hand vise jaw is normally located in an inoperative position below the delivery path of the line, being caused to ascend to its active or line clamping position after the line has been delivered to the first elevator. In accordance with the general scheme, the right-hand jaw, and also the first and second elevators, are actuated by individual power units. These power units are set into action by terminal control devices actuated by the line delivery carriage as it completes the transfer of the composed line into the first elevator.

As the power unit associated with the first elevator is energized, the elevator ascends a slight distance into engagement with a pawl which arrests it in casting position. The second elevator, as its power unit is energized, descends from its normal or upper position at the distributing level to its lower or line receiving position commonly known as the "upper line transfer level." And the right-hand jaw, as its power unit is energized, ascends from its normal inoperative position to its operative or line clamping position.

As the right-hand jaw reaches its operative position, the casting cycle of the machine is inaugurated by the engagement of the driving clutch, and the fingers of the line delivery carriage are raised clear of the composed line so as to permit the return movement of the line delivery carriage. Terminal controls initiate both these operations and, as the fingers complete their upward movement, another terminal control, actuated thereby, causes the power unit associated with the line delivery carriage to effect the return movement thereof toward the right back to its original position ready to transfer the next line from the assembler.

Upon the inauguration of the casting cycle, the composed line is aligned and justified, the mold swung up into casting position and then moved forwardly into engagement with the composed line. Thereafter, the metal pot is moved forwardly to close the mold slot at the rear, the lock-up effected, and the slug cast. After casting, the metal pot is moved rearwardly to break contact with the mold and the mold in turn moved rearwardly away from the line, after which the mold is swung downwardly to a vertical position for the ejection of the cast slug.

Immediately after the slug is cast, a cam on the timing shaft acts to trip the pawl which, throughout the casting operation, holds the first elevator in casting position, thereby releasing the first elevator and allowing it to ascend to the upper transfer level. Another timing cam adjusts the device controlling the power unit associated with the right-hand jaw and causes the latter to descend to its normal inoperative position.

An upper transfer carriage acts to transfer the matrices of the composed line from the first elevator to the second elevator and to restore the spacebands to their storage magazine. The upper transfer carriage has an individual power unit which is conditioned to effect the line transfer movement of the carriage by a terminal control operated by the second elevator as it moves downwardly to its line receiving position. However, while the power unit for the upper transfer carriage is thus conditioned at an early stage in the machine cycle, its actual operation is prevented until both the second elevator and the first elevator are located at the transfer level.

When both the first elevator and the second elevator are properly located, the upper transfer carriage is released, whereupon it is moved horizontally toward the right by its power unit to transfer the composed line out of the first elevator. The matrices of the composed line are transferred onto the ribbed bar of the second elevator and the spacebands into the upper transfer channel for collection by the spaceband grabber which returns them to their storage magazine. The upper transfer carriage is arrested at an intermediate position, after the matrices have been transferred to the second elevator, to give the latter an opportunity to ascend with the matrices to the distributing organ. As the upper transfer carriage is thus arrested, it operates a terminal control which causes the descent of the first elevator to its normal line receiving position and the ascent of the second elevator to its distributing position. As the second elevator starts its ascent, it operates a terminal control which reenergizes the power unit operating the upper transfer carriage, causing the carriage to continue its movement toward the right to push the spacebands along for collection by the spaceband grabber as previously mentioned. In the instant machine, the spaceband grabber is operated by the upper transfer carriage, to which it is connected by an intermediate rack and pinion device. Upon the completion of its movement toward the right, the upper transfer carriage actuates a terminal control which reverses the operation of its power unit and causes it to move leftward back to its original position.

Like the other organs of the machine, the distributor shifter is powered by an individual unit operable to move it toward the left to a position ready for the transfer of the matrices from the second elevator into the distributor box and in the opposite direction to effect such transfer. When the second elevator starts to descend to its lower line receiving position, a terminal control causes the power unit associated with the distributor shifter to move the latter to ready position and later, when the second elevator ascends to its distributing position with the line of matrices, to effect its return movement.

Since the paths of movement of the second elevator and the distributor shifter intersect, and since they are operated by independent power units, safety devices are provided for preventing collision between these two machine organs. Means are also provided for preventing the descent of the second elevator until all of the matrices have been transferred from it into the distributor box as well as means for preventing the distributor shifter from moving leftward to its ready position until the last matrix in the box has been fed to the distributor. In other words, so long as there are any matrices in the distributor box, the distributor shifter continues active to advance the matrices, thus insuring that all of them will be distributed without delay.

The timing cam shaft in the instant machine is driven from a high speed drive shaft through a worm and wheel connection, with the driving clutch acting on an intermediate counter shaft. After the driving clutch has been engaged by the movement of the right-hand jaw to its line clamping position to inaugurate the casting cycle, mechanism is conditioned to disengage the clutch upon the completion of one revolution of the cam shaft.

As mentioned previously, the first elevator is tripped after the actual slug casting operation to permit the elevator to ascend to the upper transfer level so that the composed line can be transferred for distribution, the casting cycle proceeding in the meantime quite independently, i. e., the mold is swung down to its vertical ejecting position, the ejector blade moved forwardly to eject the slug, and then returned rearwardly to its normal position. Because of the speed of operation of the first and second elevators, the upper transfer carriage and the distributor shifter, it is quite possible to complete the transfer of the matrices from the second elevator to the distributor box and to return the first elevator downwardly to its line receiving position prior to the completion of the casting cycle. Actually, the first elevator can be raised to casting position with the next line to be cast before the previous casting cycle is completed, and the parts have been so timed that the right-hand jaw can be raised to its active position to effect the engagement of the driving clutch for the new casting cycle simultaneously with the completion of the previous casting cycle. In other words, under some conditions of operation depending upon the length of the lines being cast and upon the speed with which the operator composes, the timing shaft may be kept running constantly so that successive casts can be made without any loss of time whatsoever. In a word, it might be said that the only limitations upon the output of the machine are those imposed by the physical requirements of casting a good slug.

Other features of the new machine will be apparent from the following detailed description.

Referring to the drawings:

Fig. 1 is a front elevation of the improved machine;

Fig. 2 is a front elevation of the assembler mechanism and a portion of the line delivery mechanism, the parts being shown after a line has been assembled but before the line delivery operation has been inaugurated;

Fig. 3 is a right side elevation on an enlarged scale of a portion of the mechanism shown in Fig. 2;

Fig. 4 is an enlarged vertical sectional view on line 4—4 of Fig. 2;

Fig. 5 is a front elevation of a portion of the mechanism illustrated in Fig. 2, the parts being shown just after the finger key has been depressed to inaugurate the line delivery operation but prior to the descent of the fingers of the line delivery carriage;

Fig. 6 is a front elevation of a portion of the mechanism illustrated in Fig. 5, the parts being shown just after the descent of the fingers of the line delivery carriage into engagement with the ends of the line;

Fig. 9 is a left end view, partly in section, of the parts shown in Fig. 2;

Fig. 10 is a view from the left of the line resistant just after it has been swung to inoperative position to provide clearance for the transfer of the composed line to the first elevator;

Fig. 11 is an enlarged perspective view of the line delivery carriage;

Figure 16A:
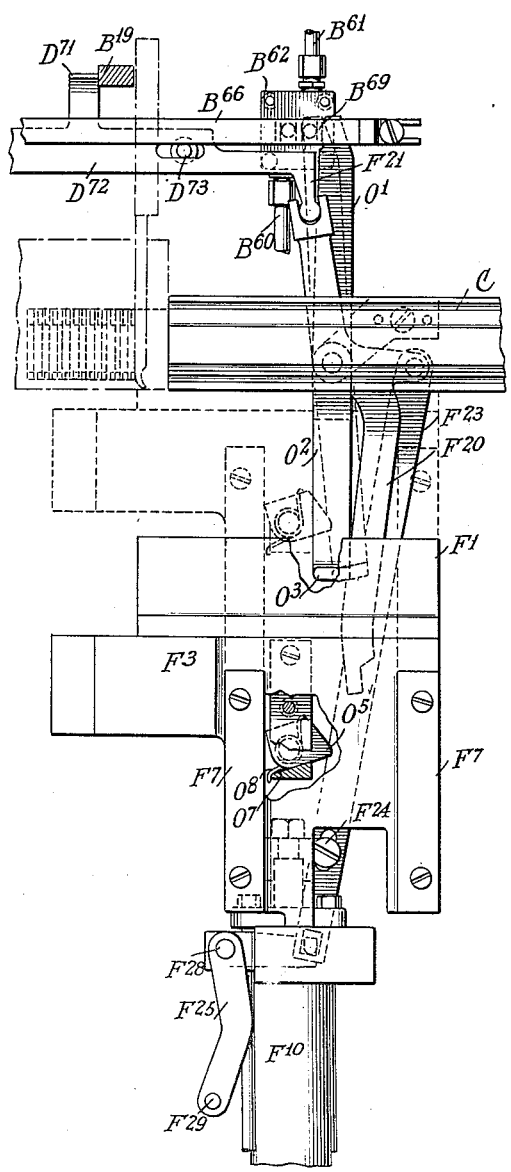
Figure 16B:
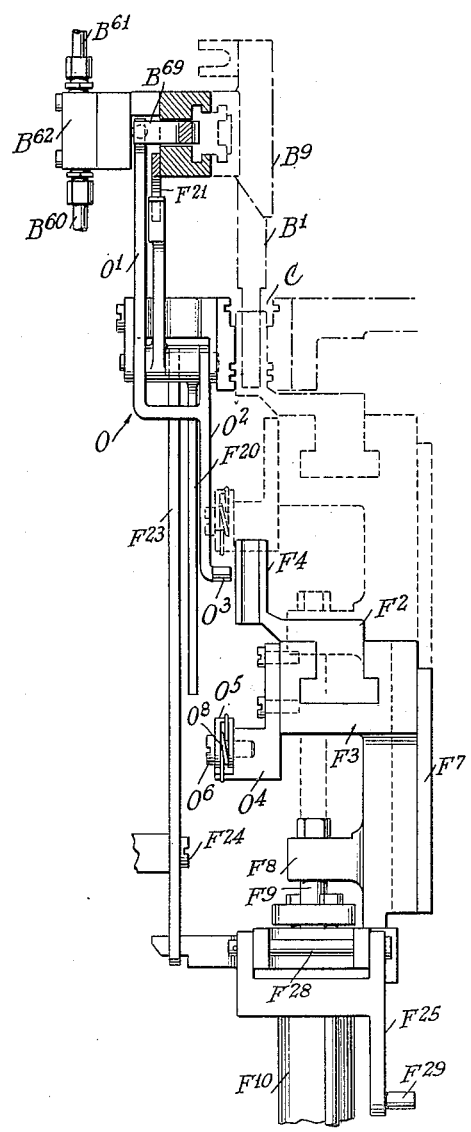
Figure 25A:
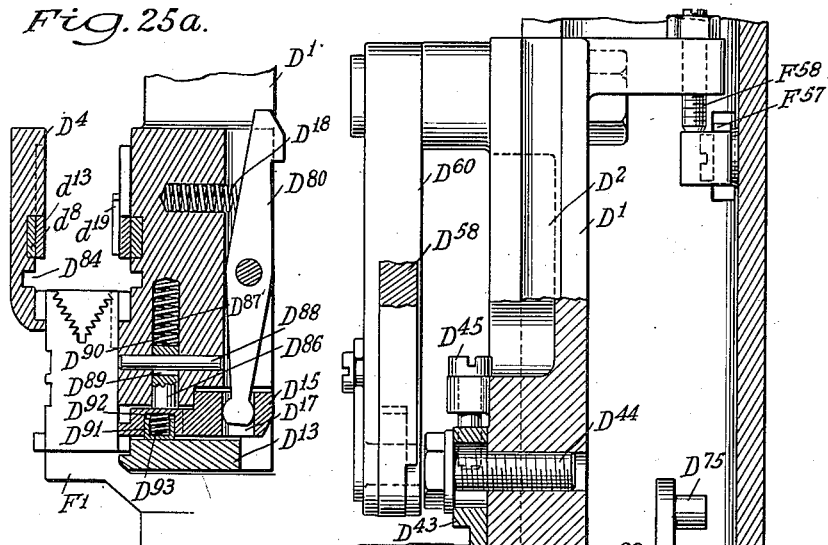
Figure 25:
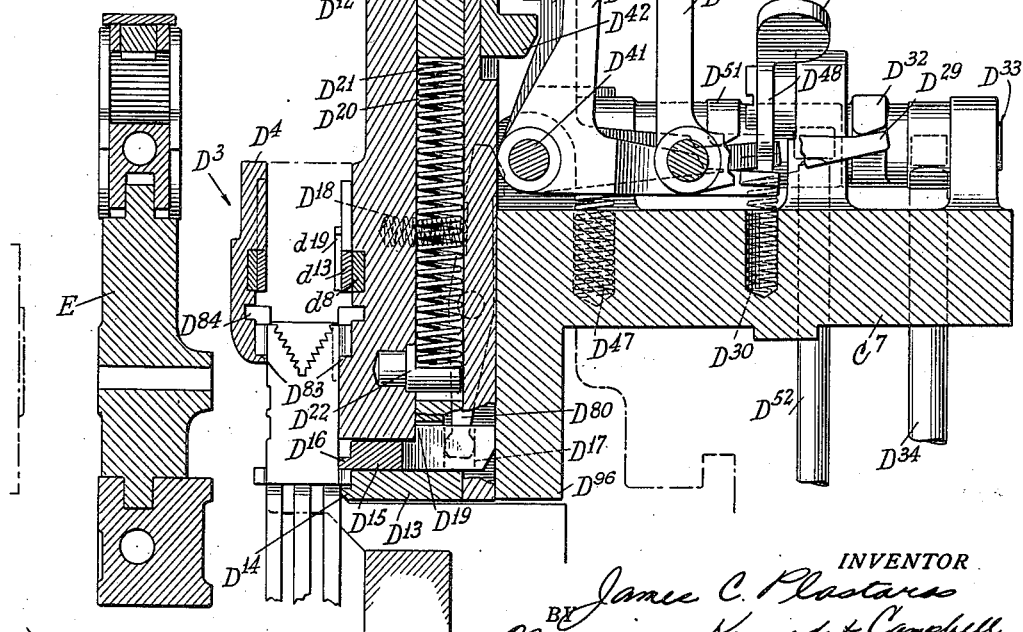

Fig. 11ª is a partial sectional view through the line delivery slide and the lever operated thereby for releasing the assembler slide for its return movement, the construction being a modification of that shown in Fig. 11;

Fig. 12 is a detail view showing the mounting of the line engaging fingers on the line delivery carriage;

Fig. 13 is a top plan view, partly in section, of the line delivery carriage and the mechanism for causing the descent of the line engaging fingers;

Fig. 14 is a top plan view of the mechanism for restoring the line resistant to its normal position after a composed line has been transferred;

Fig. 15 is a front elevation of the left half of the machine illustrated in Fig. 1, the parts being shown in greater detail and in the positions they will assume immediately after a composed line has been delivered to the first elevator;

Fig. 16 is a front elevation of the right-hand vise jaw and its operating mechanism, certain of the parts being broken away to show the mechanism in greater detail;

Fig. 16ª is a front elevation of mechanism for inaugurating the upward movement of the fingers of the line delivery carriage, the construction being a modification of that shown in Fig. 16;

Fig. 16b is a left side elevation of the mechanism shown in Fig. 16a;

Fig. 17 is a perspective view of a portion of the mechanism for controlling the ascent of the right-hand vise jaw;

Fig. 18 is a vertical sectional view on line 18—18 of Fig. 16;

Fig. 18a is a left side elevation of a modification of a portion of the mechanism shown in Fig. 18;

Fig. 19 is a horizontal sectional view on line 19—19 of Fig. 18;

Fig. 20 is a top plan view of the mechanism, controlled by the movement of the right-hand vise jaw, for starting the machine cycle;

Fig. 21 is a top plan view of the line delivery channel and the first elevator;

Fig. 22 is a front elevation of a portion of the first elevator;

Fig. 23 is a detail view of certain of the parts shown in Fig. 22;

Fig. 24 is a horizontal sectional view on line 24—24 of Fig. 22;

Fig. 25 is a vertical sectional view on line 25—25 of Fig. 22, the parts being shown immediately after the line has entered the first elevator and before matrix alignment has taken place;

Fig. 25a is a vertical sectional view on line 25a—25a of Fig. 22;

Fig. 26 is a vertical sectional view similar to Fig. 25, but with the parts shown after matrix alignment has taken place;

Fig. 26a is a vertical longitudinal sectional view through the first elevator showing an improved matrix retaining pawl with which the machine is equipped, the first elevator being shown in its line receiving position;

Fig. 26b is a view similar to Fig. 26a, the first elevator being shown in the upper line transfer position;

Fig. 26c is a horizontal sectional view on line 26c—26c of Fig. 26b.

Fig. 26d is a horizontal sectional view through a portion of the first elevator taken just above the right-hand vise jaw;

Fig. 27 is a horizontal sectional view on line 27—27 of Fig. 15;

Fig. 28 is a left side view of the device for relatively positioning and locking together the vise frame and the first elevator guide frame;

Fig. 29 is a top plan view of the mechanism for transferring the line from the first elevator to the second elevator, the parts being shown just prior to the transfer operation;

Fig. 30 is a front elevation, partly in section, of the mechanism shown in Fig. 29;

Fig. 31 is a front elevation of a portion of the mechanism shown in Fig. 30, the parts being shown just after the line has been received by the second elevator but before the ascent thereof;

Fig. 32 is a view similar to Fig. 31, the upper transfer carriage being shown in its extreme rightmost position just prior to its return to normal position;

Fig. 33 is a vertical sectional view on line 33—33 of Fig. 30;

Fig. 34 is a vertical sectional view through one portion of the upper transfer channel;

Fig. 35 is an enlarged view, partly in section, of the valve control mechanism for the upper transfer carriage;

Fig. 36 is a right side elevation of certain of the parts shown in Fig. 35;

Fig. 37 is a front elevation of the spaceband magazine and the adjacent portion of the upper transfer channel;

Fig. 38 is a left end elevation of the second elevator and the distributor shifter mechanism for transferring the line from the elevator for distribution;

Fig. 39 is a top plan view of the distributor shifter mechanism;

Fig. 40 is a front elevation of the mechanism shown in Fig. 39;

Fig. 41 is a left end elevation, greatly enlarged, of the distributor shifter mechanism;

Fig. 42 is a top plan view of the second elevator head in its raised position and also part of the valve actuating mechanism for controlling the operation of the distributor shifter mechanism;

Fig. 43 is a detail view of the second elevator actuating mechanism showing, in section, a double acting dash pot for cushioning the elevator both at the lower and at the upper ends of its stroke;

Fig. 44 is a detail view of the dash pot mechanism illustrated in Fig. 43, but showing the parts at a different stage in their operation;

Fig. 45 is a top plan view of the mechanism shown in Fig. 43;

Fig. 46 is a vertical sectional view on line 46—46 of Fig. 43;

Fig. 47 is a vertical sectional view of the valve mechanism for controlling the operation of the distributor shifter mechanism;

Fig. 48 is a diagrammatic view of a portion of the pneumatic system, namely, that for effecting line delivery to the first elevator, also that for operating the right-hand vise jaw, the first elevator, and the second elevator;

Fig. 49 is a diagrammatic illustration of that portion of the pneumatic system for effecting line transfer from the first elevator to the second elevator;

Fig. 50 is a diagrammatic illustration of that portion of the pneumatic system for effecting the shifting of the line from the second elevator to the distributor mechanism;

Fig. 51 is a left side elevation of the cam assembly for controlling various functions of the machine;

Fig. 52 is a vertical section view on line 52—52 of Fig. 51; and

Fig. 53 is a vertical sectional view on line 53—53 of Fig. 51.

Assembler mechanism

In the operation of the machine, the matrices are released from a magazine A under the control of a keyboard $A^1$ in the order in which their characters are to appear in print and deposited on a rapidly moving inclined endless belt $A^2$ which carries them down through an assembler entrance $A^3$ and into a fixed assembler $A^4$ where they are composed in line (Figs. 1 and 2). The matrices are supported in the assembler by their lower ears on one or another of a pair of rails, depending upon the level at which the matrices are later to be presented to the mold for casting. The leading end of the composed line is supported by a line abutment or resistant $A^5$, which is moved to the left by the growing line as a rapidly rotating star wheel $A^6$ advances each matrix entering the assembler to make room for the one to follow. The space bands are released from a magazine $A^7$ located, as usual, at the left of the assembler entrance and are composed in line along with the matrices, except that they are supported by ears formed at their upper ends on rails presented at the top of the assembler and are guided at their lower ends by a horizontal rail $A^8$ which, as usual, engages in notches with which the spacebands are formed at the bottom.

As shown best in Fig. 2, the line resistant $A^5$ is mounted at the left end of an assembler slide $A^9$ arranged for endwise movement in a horizontal direction. For this purpose, the assembler slide is provided near its left end with a roller $A^{10}$, arranged to track along a horizontal stationary rail $A^{11}$, and is guided at its right end by a strap $A^{12}$, secured to a fixed supporting member $A^{13}$, the strap, at its lower end, carrying a roller $A^{14}$ underlying and supporting the slide during its travel. As the line grows in length during composition, the assembler slide $A^9$ moves to the left against the pull of a clock spring $A^{15}$, arranged in a housing mounted at the right end of the supporting member $A^{13}$ and connected at its outer end to the slide. Retrograde movement of the assembler slide $A^9$ is prevented by a brake lever $A^{16}$ having a fixed fulcrum and presenting a pair of spaced friction shoes $A^{17}$, arranged one to engage the upper edge of the slide, and the other the lower edge thereof (see also Figs. 3 and 4). A spring $A^{18}$ anchored to a finger depending from the fixed slide supporting member $A^{13}$, pulls on the brake lever at its lower end to urge it in a counterclockwise direction, thereby rendering the friction shoes effective to prevent retrograde movement of the assembler slide toward the right, the frictional force exerted by the shoes being sufficient to overcome the force exerted by the clock spring. After the composed line has been moved out of the assembler, the brake lever $A^{16}$ is turned slightly in a clockwise direction to render the friction shoes inactive and allow the clock spring to pull the assembler slide back toward the right to its normal position. The manner in which this is accomplished, however, is described later on. In its normal or rightmost position, the right end of the assembler slide banks against a stop $A^{19}$ mounted on the clock spring housing, whereas in its leftmost position, a stop plate $A^{20}$ secured to the assembler slide near its right end banks against the guiding strap $A^{12}$, the extreme positions of the assembler slide being thus determined.

Figure 8:
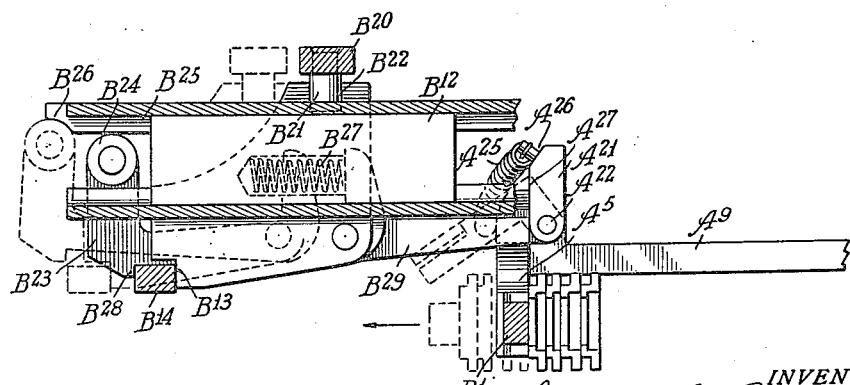
Fig. 8 is a horizontal sectional view on line 8—8 of Fig. 5.

The improved machine employs what is commonly known as "straight line transfer," i. e., the line remains at the composing level during its movement from the assembler to the first elevator. The assembler slide, however, takes no part in the line delivery operation and, for this reason, the line resistant $A^5$ must be moved out of the way so as not to interfere. The construction of the line resistant and its mounting for this purpose are best illustrated in Figs. 8, 9 and 10. As shown, the assembler slide is formed at its left end with a rearwardly projecting portion constituting a hinge bracket $A^{21}$ which extends upwardly at the rear to about the level of the tops of the matrices in the composed line, where it presents a forward extending overhanging portion supporting a vertical hinge pin $A^{22}$ at its upper end, the hinge pin extending downwardly through the bottom portion of the hinge bracket and for a substantial distance below it. The line resistant $A^5$ is mounted on the hinge pin for sliding movement in a vertical direction as well as for horizontal swinging movement, the resistant for this purpose being formed with a body portion presenting hinge lugs $A^{23}$ at the top and bottom, the upper lug, when the parts are assembled, being located on the portion of the hinge pin between its spaced supports, and the lower lug on the portion below the bottom support. The resistant is also formed with a vertical portion $A^{24}$, offset forwardly from the main body portion and into the path of the matrices, such offset portion providing the support for the matrices as the line is being composed.

The line resistant $A^5$ is held in its normal or upper position by a tension spring $A^{25}$, connected at its lower end to the resistant and anchored at its upper end by a pin projecting from a bevelled portion $A^{26}$ of the hinge bracket (Figs. 8, 9 and 10). According to the arrangement shown, the spring tends always to rotate the line resistant out of the path of the composed line but, when the resistant is in its normal upper position, such rotation is prevented by an enlarged flat portion $A^{27}$ thereof which rests against the rearwardly extending portion of the hinge bracket $A^{21}$. However, before the composed line is moved out of the assembler, the risistant is automatically pushed downward along the hinge pin to the position shown in Fig. 10, allowing its enlarged lower portion $A^{27}$ to clear the hinge bracket. In that position, the resistant being free for rotation on the hinge pin, the spring $A^{25}$ turns the resistant out of the path of the composed line, which is then ready for the line delivery operation. When the resistant is thus turned to its inactive position, a shoulder $A^{28}$ presented at the upper end of the larger flat portion engages beneath the hinge bracket and holds the resistant down against the tension of the spring $A^{25}$.

After the composed line has been transferred out of the assembler, the assembler slide and the line resistant are restored to their normal positions. The mechanism for this purpose, however, is described later on.

*Line delivery carriage*

The composed line is delivered from the assembler to the first elevator by a line delivery carriage B on which there is mounted a pair of fingers $B^1$ and $B^2$, the carriage as well as the fingers being normally located above the assembler (Figs. 1 and 2). To effect the line delivery operation, the left-hand finger B is first moved toward the right until it registers with the line resistant. Immediately thereafter, the right-hand finger $B^2$, which normally stands somewhat to the left of the terminal end of the line, is also moved toward the right clear of the last matrix in the line. Thereupon both fingers are moved downwardly to embrace the line at its opposite ends, the left-hand finger during its descent acting to depress the line resistant $A^5$ in the manner previously described. The line delivery carriage, then, is moved leftward to transfer the composed line to the first elevator.

As shown best in Figs. 9 and 11, the line delivery carriage includes, in part, a slide $B^3$ presenting at the rear two pairs of vertically spaced tongues $B^4$ located one pair at each end of the slide and guided in opposed grooves of a stationary horizontal guide member $B^5$, the latter forming part of the machine front plate and serving to guide the delivery carriage during its movement from and to its normal position. At the right end of the slide $B^3$, there is secured a bracket $B^6$ formed with a forwardly extending portion in which the right-hand finger $B^2$ is mounted for vertical movement. The finger $B^2$ is formed in its front and rear edges with vertical tongues $B^7$ arranged to slide in correspondingly disposed grooves presented by the bracket $B^6$. The width of the grooves is somewhat greater than the width of the tongues in order to permit a limited tilting of the finger from its normal solid line position, as shown in Fig. 12, to the dotted line position shown therein, this give or tilting action being for the purpose of enabling the finger to insert itself between the star wheel $A^6$ and the adjacent end of the composed line when the finger is lowered preparatory to the transfer of the line. Normally, however, the finger is urged to the solid line position by a leaf spring $B^8$ mounted in the bracket behind the finger, the spring pressing at its upper end against the finger and being anchored at its lower end to the bracket.

The left-hand finger $B^1$ is mounted in a bracket $B^9$ which, (unlike the bracket $B^6$), is tongued and grooved to the slide $B^3$ so that the left-hand finger can be moved relatively to the slide and, consequently, relatively to the right-hand finger $B^2$. The bracket $B^9$ likewise presents a forwardly extending portion in which the finger $B^1$ is mounted for movement in a vertical direction. Thus, the finger $B^1$ has vertical tongues $B^{10}$ arranged to slide in correspondingly disposed grooves presented by the bracket, the width of the grooves (as in the case of the bracket $B^6$ of the right-hand finger) being greater than the width of the tongues on the finger in order to permit a tilting motion corresponding to the tilting motion of the right-hand finger. And, (again like the right-hand finger) the left-hand finger is urged to its normal position by a leaf spring $B^{11}$ arranged in the bracket behind the finger, the spring pressing at its lower end against the finger and being anchored at its upper end to the bracket.

The normal position of the left-hand finger $B^1$ is determined by a block $B^{12}$ located beneath the delivery slide guide member $B^5$ to which the block is tongued and grooved for limited sliding movement in a horizontal direction (Figs. 8 and 9). The block is formed in its front edge with a shoulder $B^{13}$ serving as a stop or banking surface for a post $B^{14}$ formed integral with and depending from the bracket $B^9$. In the normal position of the block $B^{12}$, its shoulder $B^{13}$ locates the left-hand finger somewhat to the left of the extreme position occupied by the line resistant $A^5$ when the assembler contains the longest line the machine can handle.

The fingers $B^1$ and $B^2$ are both formed at the top (Fig. 11) with portions $B^{15}$ extending rearwardly and bifurcated to engage a bead $B^{16}$ presented at the front edge of a bail bar $B^{17}$ which extends across the front of the machine so as to accommodate the full range of travel of the fingers during the transfer of a line from the assembler to the first elevator. The mounting of this bar will be described later on. For the present, it will be sufficient to state that it is capable of being rocked downwardly to lower the fingers $B^1$ and $B^2$ into the assembler to embrace the line and upwardly to lift the fingers clear of the line after the latter has been transferred to the first elevator.

*Line delivery operation*

The line delivery carriage B is pneumatically operated in its to and fro movements by a double acting cylinder and piston mechanism $B^{18}$ mounted in a horizontal position on a fixed part of the machine at the rear of the assembler entrance (Figs. 2 and 11). The piston rod projects from the left end of the cylinder and is connected at its outer end to a rearwardly extending portion $B^{19}$ of the bracket $B^6$ which supports the right-hand finger $B^2$. This mechanism will be described in greater detail at a later, more convenient, point.

As mentioned previously, the first step in the delivery of the composed line to the first elevator involves a movement of the left-hand finger $B^1$ toward the right to locate it in a position immediately overlying the line resistant $A^5$ (Figs. 5, 8 and 9). This is accomplished by the block $B^{12}$ which is moved toward the right by a counterclockwise swinging movement of a relatively long lever $B^{20}$, pivotally mounted at its upper end on a fixed part of the machine and provided at its lower end with a pin $B^{21}$ engaging in a vertical slot $B^{22}$ formed in the rear face of the block $B^{12}$. The block $B^{12}$ is provided with a pawl $B^{23}$, pivotally mounted thereon so as to swing in a horizontal plane and formed at its left end with a rearwardly extending portion mounting an antifriction roller $B^{24}$, arranged to track along a rail $B^{25}$ presented by the member which supports the block.

Before the lever $B^{20}$ is actuated, the pawl $B^{23}$ stands in the dotted position shown in Fig. 8, wherein the anti-friction roller $B^{24}$ seats in a depression $B^{26}$ formed at the left end of the track rail $B^{25}$, the pawl being urged to such position by a compression spring $B^{27}$ located in a recess formed in the block $B^{12}$ and which presses against the pawl. As the block $B^{12}$ is moved toward the right by the lever $B^{20}$, the roller $B^{24}$ is cammed out of the recess $B^{26}$ and the pawl $B^{23}$ is swung forwardly to the solid line position shown in Fig. 8 and locates a shoulder $B^{28}$ thereon at the left of the post $B^{14}$ depending from the bracket $B^9$, with the result that the left-hand finger $B^1$ is moved to the right from the position shown in Fig. 2 to the position shown in Fig. 5, in which latter position it is arrested by the engagement of a depending finger $B^{29}$, fastened to the block $B^{12}$ at the bottom, with the line resistant $A^5$ (see also Fig. 9). When the left-hand finger is thus arrested, it will overlie the front line engaging portion $A^{24}$ of the line resistant and be in position, when lowered, to push the resistant downwardly and cause it to be swung out of the way to permit the transfer of the line.

The swinging movement of the lever $B^{20}$ to adjust the left-hand finger is effected by a single acting cylinder and piston mechanism $B^{30}$, mounted on a fixed part of the machine and arranged so that the piston rod thereof engages the left edge of the lever $B^{20}$ (Figs. 2 and 5). The cylinder $B^{30}$ is connected through a pipe line $B^{31}$ and a T-connection $B^{32}$ with a valve $B^{33}$ which controls the charging of the cylinder. The construction details of this valve are not shown, but it consists merely of a chamber connected to a source of air pressure and a slide movable between two positions by a swivel bar $B^{34}$ (Fig. 3). In one position, the slide covers a port which communicates with the pipe line $B^{31}$ leading to the cylinder $B^{30}$ so as to prevent the passage of air thereto and at the same time connects the pipe line to the atmosphere so as to vent the cylinder. In the other position of the slide, venting to the atmosphere is prevented and, instead, the port is uncovered to connect the pipe line to the source of air pressure and consequently charge the cylinder.

As shown in Figs. 3 and 5, the valve $B^{33}$ is operated by a slide $B^{35}$ mounted on the fixed frame member $A^{13}$ which supports the assembler mechanism, a pair of pin and slot connections permitting the slide to have a limited movement in a horizontal direction. In its normal or leftmost position, to which the slide is urged by a tension spring $B^{36}$, a lip $B^{37}$ projecting from the rear face thereof stands at the left of the swivel bar $B^{34}$, the latter, at the time, being adjusted to the position wherein the cylinder $B^{30}$ is uncharged.

The slide $B^{35}$ is pushed toward the right by the depression of a finger key $B^{38}$ located at the right of the keyboard within easy reach of the operator. The key is presented at the front end of a key lever $B^{39}$ which is pivotally connected at its rear end to the keyboard frame (Figs. 3 and 5). The intermediate connections between the key lever and the slide include a link $B^{40}$, connected at its lower end to the key lever somewhat in advance of its pivot, and a bell crank lever $B^{41}$, one arm of which is connected to the link at its upper end and the other arm of which stands at the left of a forwardly extending lip on the slide $B^{35}$. As the slide $B^{35}$ is pushed to the right, the lip $B^{37}$ thereon, by engaging the swivel bar $B^{34}$, adjusts the valve $B^{33}$ to the position in which the cylinder $B^{30}$ is charged. As the piston thereof moves out of the cylinder, it swings the lever $B^{20}$ in a counterclockwise direction to adjust the left-hand finger $B^1$ into registry with the line resistant $A^5$ in the manner before stated.

The second step of the line delivery operation involves a movement of the right-hand finger $B^2$ rightward from a normal position somewhat to the left of the terminal end of the composed line, to a position wherein there will be sufficient clearance to permit the finger to be moved downwardly to engage the line without interference from the matrix last to be composed. Were the right-hand finger $B^2$ normally located in a position to move directly downward it would stand in the way of the spacebands as they are released from their magazine during the composition of a line. It is for this reason that the finger is spaced somewhat to the left of the terminal end of the line. Since the hight-hand finger $B^2$ is fixed on the line delivery carriage slide $B^3$, its rightward movement it brought about by a corresponding movement of the slide. The mechanism for this purpose is brought into operation by a slight rightward movement of the line delivery carriage slide $B^3$ to which the right-hand finger is made fast.

The aforementioned cylinder $B^{18}$, which controls the movement of the line delivery carriage, is normally charged at its left end, thus urging the carriage slide toward the right. The carriage slide, however, is held slightly to the left of its extreme rightmost position by an interponent $B^{42}$, arranged between the rearward extension $B^{19}$ of the right-hand finger supporting bracket $B^6$ and a fixed stop $B^{43}$ (Figs. 2 and 11). The interponent is presented at the left end of a horizontal arm of a bell crank lever $B^{44}$ fulcrumed on a fixed supporting bracket to swing in a vertical transverse plane. When the operator presses the key $B^{38}$ to inaugurate the line delivery operation, the lever $B^{44}$ is swung in a clockwise direction from the position shown in Fig. 2 to the position shown in Fig. 5, in which latter position the interponent is raised clear of the bracket extension $B^{19}$ on the line delivery carriage, allowing the latter to move to its extreme rightmost position as determined by the banking of said extension $B^{19}$ against the fixed stop $B^{43}$.

The bell crank lever $B^{44}$ is swung in the manner stated by a single acting cylinder and piston mechanism $B^{45}$ mounted on a fixed bracket above the assembler slide. The piston of the mechanism engages the right edge of a depending arm with which the lever $B^{44}$ is formed. The operation of the cylinder and piston mechanism $B^{45}$ is controlled from the same valve $B^{33}$ which controls the operation of the cylinder $B^{30}$ by which the initial adjustment of the left-hand finger $B^1$ is effected, the cylinder $B^{45}$ being connected to the valve by a pipe line $B^{46}$ and the T-connection $B^{32}$ which is common to both cylinders (Figs. 2 and 3). Consequently, the cylinder $B^{45}$ is normally in an uncharged condition. However, upon the depression of the finger key $B^{38}$, the cylinder $B^{45}$ is charged simultaneously with the cylinder $B^{30}$ to swing the bell crank lever $B^{44}$ thereby raising the interponent $B^{42}$ and releasing the line delivery carriage slide for its initial movement toward the right (Fig. 5). The lever $B^{44}$ is arrested in its clockwise movement by a fixed stop $B^{47}$ which is engaged by the depending arm thereof when the interponent has been lifted clear of the carriage.

Although the cylinders $B^{30}$ and $B^{45}$ are charged simultaneously under the control of a common valve, mechanism is provided slightly to delay the operation of the devices actuated by the cylinder $B^{45}$ in order to allow the left-hand finger properly to be located above the line resistant before the fingers $B^1$ and $B^2$ start to descend (Figs. 2 and 5). This mechanism includes a lever $B^{48}$ fulcrumed adjacent its center on a lug projecting downwardly from the cylinder $B^{45}$, the lever being provided at its left end with a recess $B^{49}$ arranged to receive a pin $B^{50}$ presented by the depending arm of the bell crank lever $B^{44}$, the engagement being resiliently maintained by a spring $B^{51}$ pressing downwardly upon the lever $B^{48}$ at its right end (Fig. 2). The construction requires a greater air pressure to actuate the bell crank lever $B^{44}$, which controls the rightward movement of the line delivery carriage, than is required to move the left-hand finger into registry with the line resistant, and the time required to build up the greater pressure can be regulated so that the left-hand finger will be properly located before the right-hand finger starts to move. The means for regulating the pressure includes a set screw $B^{52}$ threaded through a portion of the cylinder block and against which the compression spring reacts, a lock nut being provided for maintaining the proper adjustment. Consequently, since the left-hand finger is located first according to the length of the composed line in the assembler, both fingers will be located for downward movement to embrace the line as soon as the right-hand finger has been positioned by the rightward movement of the line delivery slide in the manner described.

The third step in the line delivery operation involves a downward vertical movement of the fingers $B^1$ and $B^2$ which is brought about by a downward rocking movement of the bail bar $B^{17}$ to the beaded edge $B^{16}$ of which the fingers $B^1$ and $B^2$ are connected at their upper ends. To permit the rocking movement just alluded to, the bail bar $B^{17}$ is supported at its left end on an angular shaped bracket $B^{53}$, one arm of which extends rearwardly where it is hinged at its end on a pin $B^{54}$ mounted in a fixed part of the machine (see Fig. 1). About a third of its length from its right end, the bail bar is mounted at the front end of one arm of a three-arm lever $B^{55}$ fulcrumed to rock in a fore-and-aft plane on a bracket $B^{56}$ secured to a rear extension of the fixed front plate (Figs. 9 and 13). Another arm of the lever extends upwardly from the fulcrum, being rounded at the top to engage in a slot $B^{57}$ formed in a piston rod $B^{58}$ of a double-acting cylinder and piston mechanism $B^{59}$, the cylinder of which is likewise secured to the fixed bracket just mentioned in a position to permit the piston to move in a fore-and-aft direction. For the sake of stability, the piston rod $B^{58}$ is guided at its free end in an extension of the bracket support $B^{56}$. The front and rear ends of the cylinder $B^{59}$ are connected respectively through pipe lines $B^{60}$ and $B^{61}$ with an adjustable slide valve $B^{62}$ located at the rear of the line delivery carriage guide $B^5$ and supported by the same rear extension of the front plate that supports the bracket $B^{56}$ mounting the cylinder and piston mechanism $B^{59}$. An air line $B^{63}$, shown in part in Figs. 9 and 13, connects the valve with a source of air pressure, the valve arrangement being such that when it is adjusted to one position, the cylinder at its front end is charged with air pressure, and vented to atmosphere at its rear end. In the other of the two positions to which the valve can be adjusted, the air conditions at the ends of the cylinder $B^{59}$ are reversed.

In the normal position of the parts, namely, that shown by the solid lines in Fig. 9, the cylinder $B^{59}$ is charged with air pressure at its front end, thus locating the three-arm lever $B^{55}$ in a position to maintain the bail bar $B^{17}$, and consequently the line delivery fingers $B^1$ and $B^2$, in elevated position. A spring $B^{64}$, connected at its front end to a pin $B^{65}$ extending laterally from the three-arm lever near the top and anchored at its rear end to the cylinder head, serves to counterbalance the weight of the bail bar $B^{17}$ and the fingers $B^1$ and $B^2$ suspended therefrom (Figs. 9 and 13).

The initial movement of the line delivery carriage slide $B^3$ toward the right to position the right-hand finger for its vertical line engaging movement, is also used to initiate the downward movement of the fingers. When the slide $B^3$ moves toward the right in the manner stated, a horizontal slide $B^{66}$, mounted for limited movement in a left and right direction in the line delivery slide guiding member $B^5$ and which stands behind the line delivery slide so as not to interfere with its movement (Fig. 13), is also moved toward the right by the engagement of a protrusion $B^{67}$, formed at the rear end of a screw threaded through the line delivery slide near its left end, with a lug $B^{68}$ projecting forwardly from said slide $B^{66}$. As the slide $B^{66}$ moves to the right, it adjusts the valve $B^{62}$ to the position wherein the cylinder $B^{59}$ is vented at its front end and charged with air pressure at its rear end, the means for this purpose including a rearwardly extending lug $B^{69}$ on the slide $B^{66}$ bifurcated at the end to engage a swivel bar $B^{70}$ by which the valve is operated. As the cylinder is thus charged, its associated piston $B^{58}$ moves forwardly, turning the three-arm lever $B^{55}$ and consequently the bail $B^{17}$ from the solid line position shown in Fig. 9 to the dotted line position shown therein, with the result that the fingers $B^1$ and $B^2$ of the line delivery carriage are moved downwardly to embrace the composed line at its opposite ends (see also Fig. 6). When this occurs, the line resistant $A^5$ is depressed and swung out of the way, thereby freeing the line for its transfer movement toward the left. The lower position of the fingers $B^1$ and $B^2$ is determined by an adjustable banking screw $B^{71}$ threaded into the bracket $B^{56}$ and arranged to engage the rear edge of the lever $B^{55}$ when the latter swings downwardly. At this point, it should be stated that the front portion $A^{24}$ of the line resistant is formed at its upper end with a lip or abutment $A^{42}$ to prevent the left-hand finger $B^1$ from slipping off the line resistant as it is being depressed (Fig. 14). Were it not for the presence of the lip, this might occur because of the resilient manner in which the finger $B^1$ is mounted. The lip $A^{42}$ further insures that the line resistant will be swung out of the path of the line by the finger $B^1$ in the event the spring $A^{25}$ fails to perform that function. It should also be stated that the finger $B^1$ is tapered at its lower end to insure its entry between the lip and the leading matrix of the composed line. The right-hand finger $B^2$ is also tapered at its lower end but in a somewhat different manner, the face thereof adjacent the star wheel being made concave so that the finger will insert itself readily between the assembler star wheel and the rightmost end of the composed line.

As soon as it has been embraced by the fingers $B^1$ and $B^2$ and the line resistant swung out of the way, the fourth step in the line delivery operation takes place, namely, the composed line is moved toward the left for delivery into the first elevator. The mechanism for this purpose, heretofore referred to, will now be described in more detail. It will be recalled that the line delivery carriage is actuated by a double-acting cylinder and piston mechanism $B^{18}$ normally charged at its left end so that the carriage partakes of an initial movement toward the right to position the right-hand finger $B^2$ and initiate the downward movement of both fingers $B^1$ and $B^2$. This pneumatic mechanism $B^{18}$ is controlled from a valve $B^{82}$ (similar to that controlling the mechanism for lowering the fingers) mounted on the aforementioned bracket $B^{56}$ (Figs. 9 and 13). This valve (like the other one) has a pipe line $B^{72}$ communicating with a source of air pressure and two other pipe lines $B^{73}$ and $B^{74}$, leading one to the left end of the cylinder $B^{18}$, and the other to the right end thereof. Depending upon the adjustment of a swivel bar $B^{75}$ with which the valve is equipped, one end or the other of the cylinder $B^{18}$ will be charged with air pressure and the opposite end vented to the atmosphere, the cylinder normally being charged at its left end as has been stated. However, when the fingers $B^1$ and $B^2$ of the line delivery carriage approach their lowermost positions, a finger $B^{76}$, which is one of a pair of spaced fingers $B^{76}$ and $B^{77}$ presented at the lower end of a third arm of the three-arm lever $B^{55}$, adjusts the swivel bar $B^{75}$ of the control valve, to a position wherein air is admitted at the right end of the cylinder $B^{18}$ and the left end thereof vented, with the result that the line delivery slide is moved toward the left to deliver the line.

To recapitulate, the line delivery operation is inaugurated by the depression of the finger key $B^{38}$. The key is designed for light touch action and only a momentary depression thereof is required. Thereafter, all the various operations proceed automatically, the pneumatic system being such, that within itself, it contains all of the necessary controls to effect the performance of the operations or steps in proper sequence.

Thus, when the key is depressed, the left-hand finger is located in registry with the line resistant at the leading end of the line, immediately followed by the location of the right-hand finger in a position just clear of the terminal end of the line. As the right-hand finger is located by the line delivery carriage slide on which it is fixed, the pneumatic device, controlling the vertical movement of the fingers $B^1$ and $B^2$, is charged in a manner to cause the fingers to be lowered into engagement with the opposite ends of the line, the downward movement of the left-hand finger acting to depress the line resistant out of the way so that the line may be transferred. As the fingers $B^1$ and $B^2$ move into engagement with the line, the pneumatic device, controlling the operation of the line delivery carriage, is charged in a manner to cause the carriage to move leftward and transfer the composed line to the first elevator. The restoration or return of the line delivery carriage to its normal position is dealt with in a later chapter.

*Restoration of line delivery control and assembler mechanisms*

As soon as the line leaves the assembler those parts which were effective in inaugurating the line delivery operation are restored to their normal positions so that the operator can proceed with the composition of a new line even though the preceding one is held up or delayed in its movement toward the first elevator.

Figure 7:
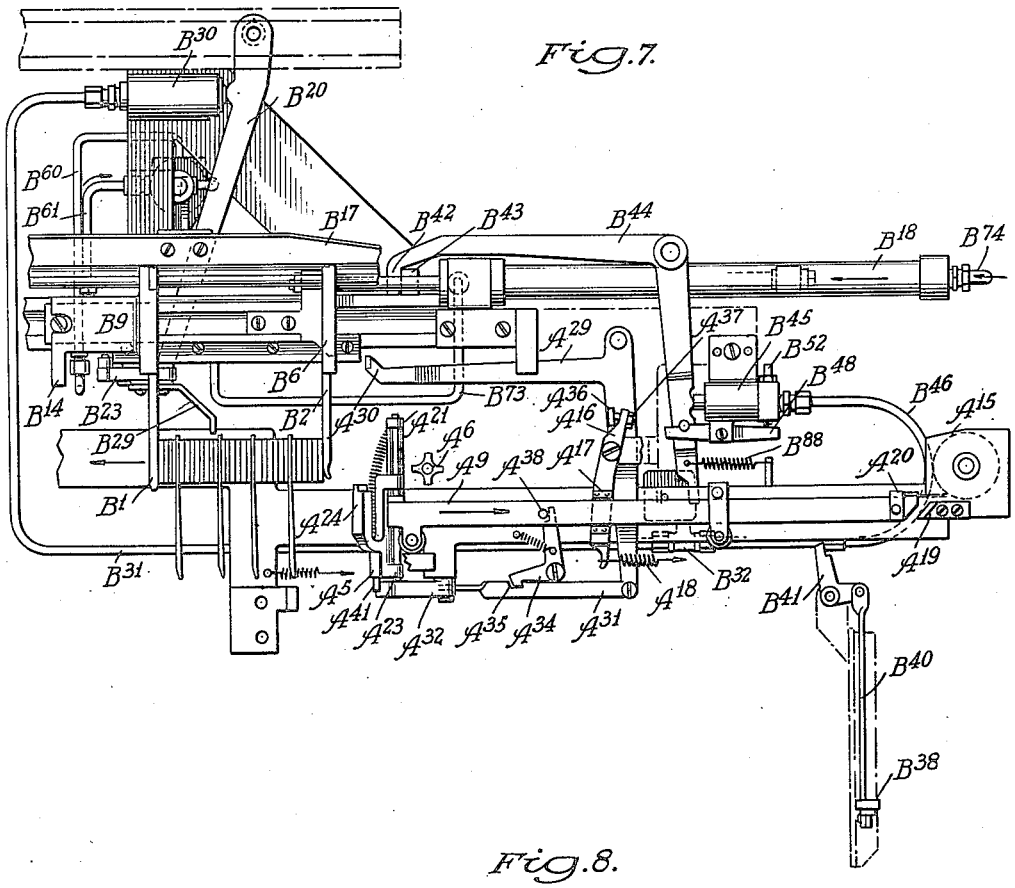
Fig. 7 is a front elevation similar to Fig. 5, the parts being shown just after the line delivery carriage has started the endwise movement of the composed line toward the first elevator.

When the finger key $B^{38}$ is released, it is returned to its normal position by a spring $B^{78}$ fastened at its lower end to the key lever $B^{39}$ and anchored at its upper end to the keyboard frame (Fig. 3). The return of the finger key permits the horizontal slide $B^{35}$, which is controlled thereby, to be restored to its normal position by the spring $B^{36}$, thus releasing the swivel bar $B^{34}$ of the control valve $B^{33}$. The control valve $B^{33}$ is restored to its initial setting almost instantly, at least as soon as the bell crank lever $B^{44}$ has completed the swinging movement which raises the interponent $B^{42}$ to release the delivery carriage slide for its initial movement toward the right. At that time, a finger $B^{79}$, formed at the lower end of the lever $B^{44}$, engages the swivel bar of the valve $B^{33}$, adjusting it to cut off the air from both the cylinders $B^{30}$ and $B^{45}$ and vent them to the atmosphere (Fig. 5). In other words, the cylinders are placed in condition such that the devices operated thereby can be returned to their normal positions. The lever $B^{44}$ is restored to its normal position as soon as the rearwardly extending portion $B^{19}$ on the line delivery carriage slide clears the interponent $B^{42}$ upon the start of the line delivery movement. This is accomplished by a spring $B^{83}$ connected to the lever $B^{44}$ at its lower end and having a fixed anchorage in the fixed assembler slide support $A^{13}$ (Fig. 7).

The block $B^{12}$ and the coupling pawl $B^{23}$, which were instrumental in moving the left-hand finger $B^1$ into registry with the line resistant, are also restored to their normal positions by the initial leftward movement of the line delivery carriage. This is accomplished when the post $B^{14}$ on the finger supporting bracket $B^9$ moves the pawl and block leftward to the dotted line position shown in Fig. 8, wherein the anti-friction roller $B^{24}$ enters the recess $B^{26}$ in the guide rail under the action of the pawl spring $B^{27}$.

The initial leftward movement of the line delivery carriage also conditions mechanism for restoring the line resistant to its normal position. This mechanism includes a bell crank lever $A^{29}$ having an arm extending horizontally to the left from a fixed fulcrum point and which is formed at its end with a bevelled surface $A^{30}$ arranged to be engaged by a similar bevelled surface $B^{80}$ on the line delivery carriage (Figs. 5 and 11). A depending arm of the bell crank lever $A^{29}$ is connected at its lower end by means of an intermediate link $A^{31}$ to a rearwardly extending arm of another bell crank lever $A^{32}$ fulcrumed to swing in a horizontal plane on a depending portion of the assembler slide supporting member $A^{13}$ (Fig. 14). The other arm of the lever $A^{32}$ extends toward the left and, in the normal position of the parts (the dotted-line position shown in Fig. 14), engages the rear edge of the line resistant $A^5$, the lever being urged to such position by a relatively heavy spring $A^{33}$ connected at the end of its rearwardly extending arm and anchored to the assembler slide supporting member. Of course, when there is a composed line in the assembler, the line resistant will be spaced toward the left from the lever $A^{32}$.

When the line delivery carriage starts its leftward movement, it swings the lever $A^{29}$ in a counterclockwise direction by the interengagement of the bevelled surfaces $B^{80}$ and $A^{30}$, with the result that the lever $A^{32}$ is turned from the dotted position to the solid line position shown in Fig. 14 against the tension of the spring $A^{33}$. For the time being, the parts are locked against movement by a pivotally mounted spring operated detent lever $A^{34}$, a nose portion of which engages in a notch $A^{35}$ formed in the link $A^{31}$ (see Figs. 7 and 14).

The counterclockwise movement of the lever $A^{29}$ also acts to release the assembler slide $A^9$ for restoration to its normal position ready for the composition of the next line. Thus, as the lever $A^{29}$ is turned by the line delivery carriage, a lug $A^{36}$ formed thereon engages a set screw $A^{37}$ threaded through the brake lever $A^{16}$ at its upper end, thereby turning the brake lever to the position shown in Fig. 7, wherein the friction shoes thereon are rendered inactive and the assembler slide released. The set screw $A^{37}$ permits the proper adjustment for this purpose.

As soon as the assembler slide $A^9$ is released, it is pulled toward the right by the clock spring $A^{15}$, but just before it is brought to rest (Fig. 7), a pin $A^{38}$ thereon engages the detent lever $A^{34}$ and rocks the same out of the notch $A^{35}$ in the link $A^{31}$. The disengagement of the detent releases the lever $A^{32}$, which thereupon under the action of its spring $A^{33}$ moves from the solid line position to the dotted line position shown in Fig. 14 engaging as it moves, a pin $A^{41}$ presented by the line resistant at its lower end, thereby rotating the resistant back into a fore-and-aft plane wherein it is free to move upwardly to its normal position under the influence of its spring $A^{25}$, it being understood that the pin $A^{38}$ on the assembler slide is so located as to release the detent $A^{34}$ at the moment the line resistant arrives opposite the restoring lever $A^{32}$. It will be noted that the resistant engaging arm of the lever $A^{32}$ flares rearwardly at its end to make sure the line resistant will slide in front of it without interference as the assembler slide moves toward the right.

Simultaneously with the restoration of the line resistant to its normal position, the larger bell crank lever $A^{29}$ is likewise restored by the spring $A^{33}$ acting through the lever $A^{32}$ and the connecting link $A^{31}$, thereby permitting the brake lever $A^{16}$ to be returned by its spring $A^{18}$ to the position wherein the friction shoes $A^{17}$ again engage the edges of the assembler slide ready for the composition of the next line. Since the lever $A^{29}$ is restored before the return movement of the line delivery carriage, it would prevent the latter from reaching its normal position, were it not for the fact that the upper horizontal arm of the lever $A^{29}$ is sufficiently resilient to allow it to be cammed back clear of the line delivery carriage which then can pass without interference. To facilitate this operation, the line delivery carriage at its right rear corner and the lever arm at its extreme left end are formed with complementary bevelled surfaces $A^{39}$ and $A^{40}$ adapted to engage one with the other as the carriage moves past (Figs. 4 and 11).

Because of the resilient character just mentioned, it may be desirable to guide the lever arm $A^{29}$ when it is initially cammed downwardly by the leftward movement of the line delivery slide $B^3$. An arrangement that can be used most efficaciously for that purpose is illustrated in Fig. 11ª. There, it will be seen that the cooperating bevelled surfaces $B^{801}$ and $A^{301}$ (corresponding to the surfaces $B^{80}$ and $A^{30}$ in Fig. 11) are formed, one with a V-shaped tongue $A^{302}$, and the other with a complementary V-shaped groove $B^{802}$ so that the parts will be effectively held against relative lateral displacement during the camming action of the lever $A^{29}$ by the line delivery slide $B^3$.

Restoration of the line delivery carriage

When the line delivery carriage B reaches the end of its line delivery movement, i. e., when it has transferred the composed line into the first elevator, it adjusts the valve control slide $B^{66}$ back to its original position, this adjustment being effected by the rearwardly projecting pin $B^{67}$ on the carriage which engages a forwardly extending lip $B^{81}$ at the left end of the slide $B^{66}$ and pushes the latter to the left just as the carriage completes its movement (Fig. 16). As the slide $B^{66}$ is thus moved, it adjusts the valve $B^{62}$ which is controlled thereby to a position wherein the cylinder $B^{59}$ (of the pneumatic mechanism controlling the raising and lowering of the line delivery fingers) is charged at the front end and the rear end vented to the atmosphere. The result is that the piston $B^{58}$ is moved rearwardly to rotate the three-arm lever $B^{55}$ back to its normal position as shown by the solid lines in Fig. 9 and raise the bail bar $B^{17}$, thus restoring the fingers $B^1$ and $B^2$ to their normal upper level out of engagement with the composed line which now is supported in the first elevator.

As the bail bar $B^{17}$ arrives in its upper position, the other finger $B^{77}$ of the pair located at the lower end of the depending arm of the three-arm lever $B^{55}$ which supports the bail bar, engages the swivel bar $B^{75}$ of the valve $B^{82}$ and adjusts the valve to the position wherein the carriage cylinder $B^{18}$ is charged with air at its left end and vented at its right end to the atmosphere. This reversal of the air charge causes the restoration of the line delivery carriage to its normal position ready to transfer the next line, the interponent $B^{42}$ having been restored in the meantime to its normal position (Fig. 7). The left-hand finger $B^1$ is pulled back to its normal position by the head of the projecting pin $B^{67}$, said head extending forwardly to engage the finger supporting bracket $B^9$ (see Fig. 11), the depending post $B^{14}$ of which engages the shoulder $B^{13}$ on the block $B^{12}$ which, as will be recalled (see Fig. 8), operates to locate the finger in registry with the line resistant when the line delivery operation is inaugurated. Since the block $B^{12}$, however, is now in its normal position as shown by the dotted lines in Fig. 8, the left-hand finger will be arrested so that it will have its maximum spacing with reference to the right-hand finger.

The intermediate channel

As the composed line travels from the assembler to the first elevator, it is supported in an intermediate channel C located at the composing level and which, as shown in Figs. 1 and 18, comprises front and rear walls $C^1$ and $C^2$ presenting two pairs of opposed grooves $C^3$ and $C^4$ to accommodate the lower ears of the matrices, depending upon the level at which they were composed in the assembler. Further up, the walls are recessed as at $C^5$ to accommodate the upper ears of the matrices. Then, near the top of the channel, there is provided another pair of opposed grooves $C^6$ in which the spaceband ears engage.

The member which presents the rear wall of the intermediate channel is mounted on the front plate of the machine. The front wall of the channel $C^1$, however, is presented at the inner end of a horizontal platform $C^7$ forming part of the vise frame $C^8$ of the machine.

Vise frame and first elevator frame

The vise frame $C^8$ swings horizontally on a vertical hinge pin $C^9$ supported in lugs $C^{10}$ formed on the fixed machine frame at the left (Fig. 15). When the vise frame is closed, it receives support at the right from a lug $C^{11}$ projecting forwardly from the machine frame and which cooperates with a notch formed in the vise frame, a bolt $C^{12}$ of the usual type serving to hold the vise frame in its closed position. The first elevator, instead of being supported in the vise frame as usual, is mounted in a separate frame $C^{13}$ located above the vise frame and which, like it, swings horizontally on a vertical hinge pin $C^{14}$ located in vertical alignment wth the hinge pin $C^9$ of the vise frame and supported in lugs $C^{15}$ formed in the machine frame. The arrangement is such that the two frames $C^8$ and $C^{13}$ may be swung outwardly either as a unit or separately as desired. The relative positions of the two frames are determined by the engagement of the rear face of a depending lug $C^{16}$ on the upper elevator frame with the front face of an upstanding lug $C^{17}$ on the lower vise frame. A handle $C^{18}$, threaded to receive a bolt $C^{19}$ projecting forwardly from the lug on the lower frame, will, when turned to the vertical position shown in Figs. 15 and 28, press tightly against the front face of the depending lug on the upper frame so as to clamp both frame members tightly together. This setting of the handle is maintained when it is desired to swing the upper and lower frame members as a unit. When it is desired to swing the members separately, however, the handle $C^{18}$ is turned toward the left into a horizontal position, as determined by a pair of cooperating stop pins $C^{20}$ and $C^{21}$ located one in the vise frame lug $C^{16}$ and the other in the handle $C^{18}$ (Figs. 24 and 28). In the horizontal position of the handle, a recess $C^{22}$ provided in the depending lug $C^{16}$ on the first elevator frame will allow the necessary clearance for any relative movement between the frame members.

The first elevator and its operation

A first elevator D, arranged for vertical movement in the elevator frame $C^{13}$, includes, in part, a body portion or slide $D^1$ formed in its lateral edges with vertical grooves $D^2$ to receive a pair of opposed vertical guiding rails $C^{23}$ presented by the first elevator frame $C^{13}$ (Figs. 21, 22, 25 and 27). The first elevator further includes a head or jaw unit $D^3$ comprising a rear member $D^4$, a front member $D^5$ and an intermediate connecting member $D^6$ at the left, which latter spaces the front and rear jaw members apart the proper distance to receive the line (Figs. 22 and 24). Secured to the front jaw member $D^5$, in a recess provided for the purpose, is a plate $D^7$, these two parts forming a unit, the upper end of which overlaps the lower end of the elevator slide $D^1$ for a distance sufficient to permit them to be connected together (Fig. 25). The plate $D^7$ is fastened to the jaw member $D^5$ by machine screws $D^8$, whereas the unit itself is fastened at the rear of the elevator slide by machine screws $D^9$ passing through the slide from the front and threaded into the plate member $D^7$ (Fig. 22). The jaw unit is open at its right end and, in the normal (lowermost) position of the first elevator, stands at the composing level so as to receive the line of matrices directly, such normal position of the first elevator being determined by an adjustable banking screw $D^{10}$ threaded into a boss $D^{11}$ projecting upwardly from the vise frame platform $C^7$ and against which the bottom of the elevator seats.

When composed at the lower level, the matrices are supported in the first elevator by their upper ears on a pair of opposed horizontal rails $D^{83}$ presented one by the front and the other by the rear jaw member. When composed at the upper level, the matrices are supported by their lower ears, i. e., the ones presented in the non-casting edges, on a rail $D^{16}$ presented by a horizontal retractible member $D^{15}$ located beneath the front jaw member $D^5$. Above the level of the rails $D^{83}$, the jaw members $D^4$ and $D^5$ are formed with a pair of opposed horizontal slots $D^{84}$ in which the ears of the spacebands engage (Fig. 25). The lower edge of the rear jaw member $D^4$ terminates just below the upper ears of the matrices, so as to expose the characters in the casting edges thereof and to provide clearance for the mold when it comes forward into the casting position (Fig. 26).

The first elevator D travels between its line receiving position and an upper line transfer position and return, being arrested in its upward movement temporarily at a casting position where the composed line is presented to the mold for the casting operation. The casting position is at a slightly higher level than the line receiving position, the manner in which the elevator is arrested being pointed out later on.

The first elevator D is raised and lowered by a double-acting cylinder and piston mechanism $D^{55}$ vertically mounted on a fixed part of the machine and located so that the piston rod $D^{56}$ reciprocates within the hinge pin $C^{14}$ (made hollow for the purpose) of the first elevator frame (Fig. 15). A head $D^{57}$, slidably arranged on the hinge pin, is connected to the piston rod $D^{56}$ by a pin which passes through slots formed in the walls of the hinge pin, the slots being of sufficient length to accommodate the full range of piston movement. A long lever $D^{58}$, fulcrumed somewhat to the left of its center on a pin $D^{59}$ secured in a lug projecting from the first elevator frame, is connected at its left end to the slidable head $D^{57}$ and at its right end to a link $D^{60}$ which, in turn, is pivotally connected to the first elevator slide $D^1$ at the rear thereof and near the top (Figs. 15 and 27). The arrangement is such that, when the cylinder $D^{55}$ is charged at the top, the piston rod thereof will descend, causing the first elevator to move upwardly from its lowermost position to its uppermost position when it is free to do so. On the other hand, when the cylinder $D^{55}$ is charged at its lower end, the piston rod will ascend, thereby causing the first elevator to move from its uppermost position to its lowermost position. A tension spring $D^{61}$, connected to the lever $D^{58}$ at its left end and having a fixed anchorage near the bottom of the first elevator frame, serves to counterbalance the weight of the first elevator.

Both ends of the cylinder $D^{55}$ are arranged to be connected to a source of air pressure through a valve $D^{62}$ secured to a rear extension of the machine front plate (Figs. 15 and 29). The upper end of the cylinder is connected with one side of the valve through a pipe line $D^{63}$ and one branch of a T-connection $D^{64}$, whereas the lower end of the cylinder is connected with the other side of the valve through a pipe line $D^{65}$ and another T-connection $D^{66}$. The valve construction is not shown in detail but, like most of the other valves used in the machine in connection with double-acting cylinder and piston mechanisms, it includes a slide which, when adjusted to one position, connects one end of the cylinder with the source of air pressure while simultaneously venting the other end of the cylinder to the atmosphere, and which, when adjusted to its other position, will vent to the atmosphere the end of the cylinder previously charged with air pressure and charge the end previously vented to the atmosphere. The valve is adjusted by a swivel bar $D^{67}$, one end of which extends from the valve housing.

The swivel bar $D^{67}$ of the valve $D^{62}$ engages at its front end in the bifurcated end of a horizontal arm $D^{68}$ pinned at its opposite end to a short fore-and-aft rock shaft $D^{69}$ journalled in the extension of the machine front plate on which the valve $D^{62}$ is mounted (Fig. 29). A vertical lever $D^{70}$ pinned adjacent its center at the front end of the short rock shaft $D^{69}$, is capable of being adjusted to two different positions corresponding to the two different adjustments of the valve. When the lever $D^{70}$ is in the position shown in Fig. 1, the adjustment of the valve is such that the lower end of the cylinder $D^{55}$ is charged with air pressure, thus retaining the first elevator in its lower or line receiving position. When the composed line is delivered to the first elevator, however, the rear extension $B^{19}$ of the bracket $B^6$, which supports the right-hand finger $B^2$ of the line delivery carriage, engages a finger $D^{71}$ projecting upwardly from a horizontal slide $D^{72}$ mounted by means of pin and slot connections $D^{73}$ on the line delivery carriage guideway adjacent its rear face (Figs. 16 and 21). The pin and slot connections allow the slide a limited movement in a horizontal direction; normally it is in its rightmost position (Fig. 1), but as the line delivery carriage completes its movement to the left in delivering the line, it moves the slide toward the left, thereby causing an upwardly projecting finger $D^{74}$ at the left end of the slide to engage a pin formed at the lower end of the lever $D^{70}$, and turn the lever to the position shown in Fig. 15, wherein the valve $D^{62}$ is adjusted to admit air pressure to the upper end of the cylinder $D^{55}$, and to vent the cylinder at its lower end. The result is that the first elevator ascends until it is arrested in casting position (after a relatively short movement) by one or the other of a pair of latch members $D^{39}$ and $D^{40}$. Fig. 25 shows the first elevator, in its line receiving position, whereas Fig. 26 shows it in its casting position. The cylinder $D^{55}$ remains charged at its upper end, so that the first elevator will ascend to the upper transfer level when later it is released by the movement of the active latch member to its inactive position, after the casting operation. After the line has been transferred to the second elevator, the first elevator is moved downward to its line receiving position by an adjustment of the valve $D^{62}$ to admit air to the lower end of the cylinder $D^{55}$ and vent the upper end thereof to atmosphere. The manner in which this is accomplished is described at a later more convenient point.

As mentioned previously, the elevator D is arrested after a very slight ascent and located in horizontal casting position by one or the other of the latch members $D^{39}$, $D^{40}$ which are pivotally mounted to swing in a fore-and-aft plane on a short transverse shaft $D^{41}$ mounted at the top of the vise frame (Figs. 22, 23, 24 and 25). The latch members are formed with nose pieces $D^{78}$ and $D^{79}$ which, in the active positions of the members, overlie a forwardly projecting shoulder $D^{42}$ formed at the lower end of a plate $D^{43}$ seated in a recess formed in the aligning slide retaining plate $D^7$. The plate $D^{43}$ is secured to the first elevator slide $D^1$ adjacent its rear face, and just above the elevator jaw unit, by means of a screw and slot connection $D^{44}$, which permits a limited adjustment of the plate $D^{43}$ in a vertical direction to insure that the elevator will be arrested at the proper casting level. The adjustment is determined by an adjustable screw $D^{45}$ passing downwardly through a lug formed on the elevator slide and threaded into the adjustable plate $D^{43}$ at the top.

The latches $D^{39}$ and $D^{40}$ are in all respects the same except that their nose portions $D^{78}$ and $D^{79}$ are located at different levels, one or the other of the latches being used according to whether the operator desires to cast from the upper or lower matrix characters, assuming of course that the line is composed at the lower level. As is well known, a standard matrix is formed in its casting edge with two characters, a roman character at the top, and a corresponding italic character at the bottom. If the operator desires to cast from the roman characters, the matrices are assembled at the lower level, in which case the latch $D^{39}$, having its nose portion disposed at the lower level, is used to arrest the first elevator in casting position. The same latch is also used if the matrices are assembled at both levels since, under such conditions, the casting from the italic characters is taken care of by those matrices standing at the upper level. However, in casting from whole lines of italics or head letter characters, the matrices are assembled at the lower level in the assembler, and the first elevator arrested in casting position by the second latch member $D^{40}$, whose nose piece is located at the higher level.

Both latches $D^{39}$ and $D^{40}$ are provided with forwardly extending tail pieces overlying springs $D^{47}$ seated in recesses formed in the top of the vise frame and which urge the latch members toward their active positions. The selection of either latch member for use is made by disabling the other latch member, the means for this purpose including a rocker member $D^{48}$ formed with a pair of nose pieces $D^{49}$ spaced 90° apart (Figs. 22 and 23). When the rocker member $D^{48}$ is in the position shown in Fig. 23, it depresses the tail piece of the shorter latch member $D^{39}$, leaving the longer latch member $D^{40}$ free to act. When the rocker member is in its other position of adjustment, however, as shown in Fig. 22, it depresses the tail piece of the longer latch member $D^{40}$ leaving the shorter member $D^{39}$ free to act. A finger piece $D^{50}$ with which the rocker member is provided facilitates its manual adjustment.

Throughout the casting operation, the latch member $D^{39}$ or $D^{40}$, whichever is active, maintains the first elevator at the casting level. Upon the completion of the casting operation, however, and after the mold E has been withdrawn from its engagement with the line, the latch member is tripped so as to release the first elevator and allow it to ascend to the upper transfer level. The means for tripping the active latch is best shown in Fig. 24 and includes a relatively long, two-arm, horizontally disposed lever $D^{51}$ centrally fulcrumed on a fore-and-aft rod $D^{33}$ mounted in lugs formed at the top of the vise frame $C^8$. At its left end, the lever $D^{51}$ overlies the tail pieces of both the latch members $D^{39}$ and $D^{40}$ whereas at its right end, it overlies the upper end of a push rod $D^{52}$ which is arranged for limited vertical sliding movement in the vise frame. When the rod $D^{52}$ is in its lowermost position, as determined by a collar $D^{85}$ formed on the rod near its upper end and which seats against the vise frame top, the rod will serve as an abutment for the lever $D^{51}$ which, in turn, will locate the operative latch member in its active position by restraining it against the reaction of its underlying spring $D^{47}$ (Figs. 24 and 26). However, at the proper moment, the rod $D^{52}$ is pushed upwardly, thereby rocking the lever $D^{51}$ in a counterclockwise direction, looking at the machine from the front, and pushing the tail piece of the active latch member downwardly so as to withdraw the nose piece thereon out of overlying engagement with the shoulder $D^{42}$ on the first elevator. The means for pushing the rod $D^{52}$ upwardly to release the active latch includes a dog $D^{53}$ (see Fig. 26) pivotally mounted on a fixed part of the vise frame and which has a portion extending forwardly to underlie the vertical rod and another portion extending rearwardly into the path of a cam block $D^{54}$ mounted on the right-hand jaw support. As the right-hand jaw descends, in the manner subsequently to be described, the block $D^{54}$ engages the dog $D^{53}$, rocking it from the solid line to the dotted line position shown in Fig. 26 and thereby raising the rod $D^{52}$ with the results just set forth.

The first elevator ascends to the upper transfer level as soon as it is released by the latch member, since, as will be recalled, it is biased at the time to move in that direction. Thereupon, the latch $D^{39}$ or $D^{40}$, whichever was active, and its operating parts, are restored to their normal positions as the cam block $D^{54}$ travels down past the dog $D^{53}$, the restoring action being effected by the spring $D^{47}$ which acts to push the latch member upwardly. The restored latch member will not obstruct the descent of the first elevator to its line receiving position, since the latch will be momentarily cammed out of the way as the lug $D^{42}$ on the first elevator rides past it, the lug $D^{42}$ and the nose pieces $D^{78}$ and $D^{79}$ of latch members $D^{39}$ and $D^{40}$ being formed with complementary bevelled surfaces for this purpose. It might also be stated here that during the ascent of the right-hand jaw prior to the casting operation, the dog $D^{53}$ is turned up out of the way by the cam block $D^{54}$, returning by gravity to its normal position after the block passes beyond it (Fig. 26).

Instead of tripping the active pawl $D^{39}$ or $D^{40}$, as the case may be, by the descending movement of the right-hand vise jaw to permit the ascent of the first elevator, it is proposed in the alternative to perform the pawl tripping function under the control of the cam shaft movement. Some time can be saved in this way particularly where the machine is equipped for quadding with the right-hand jaw since, under such circumstances, the tripping of the first elevator will not have to await the return of the right-hand jaw to its rightmost position, an operation which must be performed before the jaw can descend to its normal or lowermost position.

The tripping of the active pawl is effected through the lever $D^{51}$ and the push rod $D^{52}$ as in the embodiment previously described. The upward movement of the rod $D^{52}$, however, is effected by mechanism similar to that for operating the vertical rod $D^{34}$ which is active in effecting alignment (Figs. 18$^a$ and 24). That is, it includes a rocker member P arranged to engage the rod at its lower end and which is fulcrumed on the vise frame, the rocker member in turn being operated by a second rocker member $P^1$, constrained by a tension spring $P^2$ in a position permitting the vertical rod to be located in its lowermost position. At the proper stage in the machine cycle, a shoe $P^3$ located on a convenient cam $P^4$ having another purpose not specifically dealt with in this application and which is driven from the main cam shaft of the machine, turns the rocker member $P^1$ against the tension of the spring $P^2$, the rocker member $P^1$ in turn actuating the rocker member P to raise the rod $D^{52}$, which thereby trips the pawl and releases the first elevator in the same manner as when the tripping function is performed by the descent of the right-hand vise jaw. As shown in Fig. 18$^a$, the vertical rods $D^{52}$ and $D^{34}$ are arranged one behind the other, while the rocker members P and $P^1$ are fulcrumed on the same pins as are the rocker arms $D^{35}$ and $D^{36}$, respectively. It might also be stated here, that the normal positions of the rocker members $P^1$ and $D^{36}$ are determined by pins $P^5$ and $P^6$ projecting respectively from said members and which are arranged to engage pins $P^7$ and $P^8$ fixed in the bracket that supports said rocker arms (see also Fig. 15).

Matrix Alignment

In the present machine, the alignment of the matrices is effected solely by means in the first elevator and without any cooperation from the mold, the latter being devoid of the usual aligning ribs found in the commercial machine. The aligning mechanism includes a slide member $D^{12}$ presenting a vertical body portion seated in a recess formed in the front face of the elevator jaw member $D^5$ behind the plate member $D^7$ which holds it in its vertical position. At its lower end, the slide member $D^{12}$ terminates in a rearwardly extending flange $D^{13}$, the ends of which extend beyond the lateral edges of the body portion, the flange being long enough to accommodate a composed line of full length (Figs. 22 and 25). The flange is recessed at its rear edge to present a rail $D^{14}$ which underlies the front lower ears of the matrices composed at the lower level. The flange $D^{13}$ is spaced somewhat below the lower edge of the front jaw member $D^5$ to provide room for the horizontally disposed retractible member $D^{15}$, which, as will be recalled, is likewise recessed in its rear edge to present the rail $D^{16}$ which underlies the front lower ears of the matrices composed at the upper level, it being understood that such rail $D^{16}$ will be effective to support the matrices at that level when the member $D^{15}$ is in its rearmost or active position as shown in Fig. 25. The retractible rail member $D^{15}$ is coextensive in length with the flange $D^{13}$ located beneath it, being recessed in its front edge to clear the vertical portion of the aligning slide $D^{12}$ as well as the front retaining plate $D^7$. The clearance provided is also sufficient to permit the rail member $D^{15}$ to be withdrawn forwardly a distance sufficient to clear the ears of the matrices supported thereby, so as to allow such matices to drop to the lower level during the later transfer of the matrices from the elevator for distribution. Normally, however, the rail member $D^{15}$ is held in its active position by a pair of pivotally mounted levers $D^{80}$ vertically disposed in recesses provided in the front face of the first elevator jaw member $D^5$ (Figs. 22, 24 and 25). The levers act one at each end of the retractible rail member and at their lower ends extend into recesses $D^{17}$ formed in the wider end portions thereof. Compression springs $D^{18}$, seated in recesses provided in the front jaw member $D^5$, press against the rear edges of the levers above their pivot points, urging them in a direction to maintain the retractible rail in its normal active position as determined by a pair of raised shoulders $D^{19}$ presented by the rail member at its opposite ends and which engage a portion of the front elevator wall.

In the normal position of the parts, there is sufficient clearance to permit the lower ears of matrices composed at the lower level readily to slide in between the rail $D^{14}$ presented by the flange $D^{13}$ and the rail $D^{16}$ presented by the retractible member $D^{15}$, and also sufficient clearance for the lower ears of matrices composed at the upper level readily to slide between the rail $D^{16}$ and the bottom edge of the front elevator jaw member $D^5$. This clearance is maintained by floating the retractible rail member $D^{15}$ midway between the overlying first elevator jaw member $D^5$ and the underlying flange $D^{13}$. The mechanism for the purpose includes a pair of plungers $D^{86}$ mounted for limited vertical movement in recesses $D^{87}$ formed in the bottom of the elevator jaw member $D^5$ and located one behind each of the pivotally mounted levers $D^{80}$ (Figs. 22 and 25$^a$). The plungers $D^{86}$ press downwardly against an upper surface of the retractible rail member $D^{15}$ and when fully depressed, space the retractible rail from the first elevator jaw member $D^5$ a distance which will provide adequate clearance for the lower ears of those matrices composed at the upper level. The depressed position of the plungers is determined by horizontal pins $D^{88}$ extending in a fore-and-aft direction through the first elevator jaw member $D^5$ and also through slots $D^{89}$ formed in the plungers, said position being resiliently maintained by overlying springs $D^{90}$ reacting between the plungers and the upper ends of the recesses $D^{87}$ in which they are mounted.

The clearance between the retractible rail member $D^{15}$ and the underlying flange $D^{13}$ is resiliently maintained by a pair of thimbles $D^{91}$ slidably mounted in recesses $D^{92}$ formed in the bottom of the retractible rail member approximately in alignment with the plungers, the thimbles seating on the top surface of the flange $D^{13}$ and containing springs $D^{93}$ which react upwardly against the retractible rail member. While the springs $D^{93}$ are of sufficient strength to lift the retractible rail member $D^{15}$ off the flange $D^{13}$, they are somewhat weaker than the springs $D^{90}$ which react against the plungers $D^{86}$ to maintain the clearance at the top of the retractible rail member. In a word, the arrangement is such as to cause the retractible rail member $D^{15}$ to float substantially midway between the first elevator jaw member $D^5$ and the flange $D^{13}$, thus providing clearance for the lower ears of the matrices as the composed line is moved into the first elevator, regardless of the level at which the matrices are composed.

The clearance at the top and at the bottom of the retractible rail is taken up in effecting the alignment of the matrices, the aligning slide $D^{12}$ being moved upwardly to overcome the force exerted by both pairs of springs $D^{90}$ and $D^{93}$, the slots $D^{89}$ in the plungers $D^{86}$ being long enough to permit the retractible rail to seat against the lower end of the first elevator jaw member $D^5$ and the clearance between the thimbles $D^{91}$ and the overlying surfaces of the recesses $D^{92}$ in which they slide being sufficient to permit the flange $D^{13}$ in turn, to seat against the bottom surface of the retractible rail. The mechanism for moving the aligning slide $D^{12}$ upwardly will now be described. As shown in Figs. 22 and 25, the aligning slide $D^{12}$ is formed with a pair of vertical slots or recesses $D^{20}$, each housing a compression spring $D^{21}$ reacting between the slide at the upper end of the recess and a stud $D^{22}$ projecting forwardly from the jaw member $D^5$ into each recess near its lower end, sufficient clearance being provided, however, between the ends of the recesses and the studs to allow the slide to partake of the necessary upward movement in effecting alignment. During the delivery of the line to the elevator, the slide $D^{12}$ is held downwardly against the reaction of the springs $D^{21}$ by a lever $D^{23}$ having a collar $D^{24}$ in the form of a spherical segment which fulcrums in a recess formed in the retaining plate $D^7$ near its upper end. At its rear end, the lever is formed with another smaller spherical segment $D^{25}$ which engages in a recess $D^{26}$ drilled in the aligning slide near the top. The lever extends forwardly through a hole formed in the elevator slide $D^1$ and at its front end engages in a flat-sided recess $D^{27}$ cut in a short laterally extending arm of a three-arm lever $D^{28}$ fulcrumed on the first elevator slide $D^1$. The three-arm lever is maintained in a position to hold the aligning slide depressed by a bell crank lever $D^{29}$, pivotally mounted at the top of the vise frame for rocking movement in a fore-and-aft plane, and formed with a vertical arm which in the active position of the lever stands at the left of the three-arm lever to hold the latter in the position stated. A spring $D^{30}$ recessed into the upper surface of the vise frame pushes upwardly on a forwardly extending arm of the bell crank lever to render it active. An adjustable set screw $D^{31}$, threaded through the three-arm lever at its lower end and which engages the vertical arm of the bell crank lever, insures the proper adjustment of the aligning slide (Figs. 22 and 25).

At the proper stage in the machine cycle, the bell crank lever $D^{29}$ is rocked forwardly clear of the three-arm lever $D^{28}$, thereby removing the restraining influence on the aligning slide $D^{12}$, which then is urged upwardly under the action of its associated springs $D^{21}$ to the position shown in Fig. 26, wherein the proper alignment of the matrices is effected. Such forward rocking of the bell crank lever $D^{29}$ is effected by a relatively long horizontal lever $D^{32}$ fulcrumed on the same fore-and-aft rod $D^{33}$ on which the latch tripping lever $D^{51}$ is mounted (Figs. 15 and 24). At its left end, the lever $D^{32}$ overlies the forwardly extending arm of the bell crank lever $D^{29}$, and at its right end it overlies a rod $D^{34}$ slidably arranged in the vise frame for limited endwise movement in a vertical direction (Fig. 15). At its lower end, the rod is engaged by a rocker member $D^{35}$, fulcrumed on the vise frame and which in turn is operated by a second rocker member $D^{36}$, normally held under spring tension in a position to permit the vertical rod $D^{34}$ to be located in its lowermost position with the bell crank lever $D^{29}$ active. However, at the proper stage in the machine cycle, a shoe $D^{94}$ which is suitably located on cam $D^{37}$ (having another purpose not specifically dealt with in this application) driven from the main cam shaft of the machine turns the rocker member $D^{36}$ against the tension of its associated spring and through it the rocker member $D^{35}$ to raise the rod $D^{34}$, which thereby actuates the horizontal lever $D^{32}$ and turns the bell crank lever $D^{29}$ forwardly so as to permit the alignment of the matrices in the manner described (Figs. 15 and 18a). The shoe $D^{94}$ is active for a moment only, the parts being immediately conditioned for restoration to their normal positions under the action of the compression spring $D^{30}$ which pushes upwardly on the forwardly extending arm of the bell crank lever $D^{29}$. Immediate restoration of the parts cannot take place, since the three-arm lever $D^{28}$ will stand in the way of and prevent the return of the bell crank lever $D^{29}$ to its normal position. However, as soon as the first elevator ascends after the casting operation, the bell crank lever will then be restored, since the three-arm lever $D^{28}$ will be carried upwardly out of the way by the first elevator slide on which it is mounted. When the first elevator later descends, after the line has been transferred, the aligning slide $D^{12}$ will likewise be restored to its normal position, ready to receive the next line, by a restoring movement of the three-arm lever $D^{28}$ which is brought about by the engagement of the set screw $D^{31}$ thereon with a bevelled surface $D^{38}$ with which the bell crank lever is formed at the top and which cams the three-arm lever, and consequently the aligning slide, back to normal as the first elevator seats in its normal or line receiving position.

As described in the copending Plastaras application Serial No. 311,091, the mold E is swung upwardly to a horizontal position and then moved forwardly to engage the composed line which closes the mold slot at the front. It was pointed out in that application, that as the mold moves forwardly into engagement with the line, it cooperates with means on the vise frame which insures its proper horizontal casting position.

Since the latches $D^{39}$ and $D^{40}$ locate the first elevator in definite positions as regards the vise frame and since the aligning devices locate the composed line definitely as regards the first elevator, the result is that the desired matrix character (either upper or lower depending on the manner in which the matrices are composed and upon the latch in use) will be in perfect alignment with the mold slot.

When the first elevator is in the casting position, the lower portion thereof adjacent the composed line stands at the rear of a depending apron $D^{96}$ on the vise frame (Fig. 26). Thus, as the mold moves forward into engagement with the line followed by the forward movement of the metal pot for the casting operation, the thrust is borne by the vise frame which backs up the first elevator with the result that the parts of the latter may be made lighter than would otherwise be the case were it necessary for the elevator itself to bear the brunt of the lock-up pressure.

To complete the description of the parts, it should be stated that the plate $D^{43}$ which presents the lug $D^{42}$ that cooperates with the latch members $D^{39}$ and $D^{40}$ is formed with an elliptical-shaped hole $D^{46}$ in the vicinity of the lever $D^{23}$ (which adjusts the aligning plate $D^{12}$ through the retaining plate $D^7$), the hole being made sufficiently large along its major axis to accommodate whatever adjustment is required in the location of the plate $D^{43}$ to insure the arrest of the first elevator in the proper casting position.

The right-hand vise jaw and its operation

The line delivery slide is arrested at the end of its line delivery stroke by banking against a stop late $D^{95}$ (Figs. 1 and 16) in which position the composed line will be located in the first elevator with its leading matrix engaging the left-hand vise jaw F, which is supported in the vise frame at the casting level and recessed in its active or line engaging face to accommodate the left-hand finger $E^1$ of the line delivery carriage (Fig. 24). The right-hand vise jaw $F^1$, on the other hand, is normally located at a level sufficiently low to clear the lower ends of the spacebands as the line is delivered to the first elevator (Figs. 1, 16 and 18). Before justification and alignment take place, the right-hand vise jaw is raised into engagement with the right end of the composed line (see Fig. 26).

The right-hand vise jaw $F^1$ is formed with a body portion $F^2$, tongued and grooved in a jaw support or slide $F^3$, and with an upstanding jaw portion $F^4$ offset to the rear of the body portion so as to be located in the same vertical plane as the composed line. The jaw support is channeled vertically at the front to provide clearance for a fixed guiding member $F^5$ secured to the vise frame and formed in its lateral edges with grooves $F^6$ to receive a pair of vertical guiding tongues $F^7$ screwed to the jaw support adjacent its front face (Figs. 16, 18 and 20). The jaw support $F^3$ is formed with a rearwardly extending lug $F^8$ through which a piston rod $F^9$ extends at its upper end, the piston rod forming part of a vertically arranged double-acting cylinder and piston $F^{10}$ mounted on the vise frame. The upper end of the piston rod is formed with a reduced portion and the lug through which it extends machined to fit, the piston rod and the lug thus present interengaging shoulders, as at $F^{11}$, so that the jaw support will move upwardly upon the ascent of the piston rod. A nut $F^{12}$, threaded on the piston rod at its upper end into engaging relation with the upper surface of the lug $F^8$ insures that the jaw support will move downwardly upon the descent of the piston rod.

Both ends of the cylinder $F^{10}$ are adapted to be connected to a source of air pressure through a valve $F^{13}$, which is similar to the other valves employed throughout the machine for double-acting piston and cylinder mechanisms. The valve is operated by a swivel bar $F^{14}$ and is adapted, when in one position, to allow one end of the cylinder to be charged and the other end to be vented to the atmosphere and, when in the other position, to reverse the pressure conditions in the cylinder. Normally, the cylinder $F^{10}$ is charged at the top and urges the right-hand jaw to its lowermost position. The jaw is held in that position by a latch member $F^{15}$ fast to the front end of a short fore-and-aft rock shaft $F^{16}$ journalled in a lug projecting upwardly from the bracket which supports the cylinder, the latch engaging at the top of a block $F^{17}$ mounted on the jaw slide $F^3$ (Figs. 1, 16 and 18). The latch is held in its active position by a spring $F^{18}$ fastened at its upper end to a pin $F^{19}$ projecting leftward from the latch in the vicinity of the rock shaft and having an anchorage down below in a fixed part of the machine, the spring tending to urge the latch in a counterclockwise direction (looking at the machine from the front).

It will be recalled that when the composed line is delivered into the first elevator, the line delivery carriage, upon finishing its leftward or line delivery movement, actuates the slide $D^{72}$ which conditions mechanism for causing the ascent of the first elevator. The same movement of the slide also acts to turn the latch $F^{15}$ to its inactive position, as shown in Fig. 16, to free the right-hand jaw for upward movement. The connections for this purpose include a lever $F^{20}$, fulcrumed just above its center on a pin extending rearwardly from the intermediate channel, and bifurcated at its upper end to receive a finger $F^{21}$ depending from the slide $D^{72}$ at its right end. The lever $F^{20}$, at its lower end, is located at the left of a rearwardly extending horizontal finger formed at the upper end of an arm $F^{22}$ pinned to the rear end of the rock shaft $F^{16}$ on which the latch member $F^{15}$ is mounted. According to this arrangement, as the slide $D^{72}$ is moved to the left by the line delivery slide, the lever $F^{20}$ is turned in a counterclockwise direction, thereby pushing the arm $F^{22}$ in a direction to disengage the latch $F^{15}$ from the block $F^{17}$ and release the right-hand jaw for upward movement.

The leftward movement of the slide $D^{72}$ also acts to adjust the valve $F^{13}$ to its position wherein the lower end of the cylinder $F^{10}$ is charged and the upper end thereof vented to the atmosphere. The mechanism for this purpose (Figs. 16, 17, 18 and 20) includes a link $F^{23}$ mounted for limited sliding movement in a substantially vertical direction by means of a pin and slot connection $F^{24}$ at the front end of a fixed arm extending in a fore-and-aft direction from a bracket G secured to the machine frame. At its upper end, the link $F^{23}$ is connected to a laterally extending arm of the lever $F^{20}$ which controls the release of the jaw retaining latch $F^{15}$. At its lower end, the link $F^{23}$ is connected to a lever consisting of two arms $F^{25}$ and $F^{26}$ spaced apart in a fore-and-aft direction but integrally connected by a bail member $F^{27}$, the arms being drilled to receive a pivot pin $F^{28}$ which extends therethrough and also through holes formed in a pair of spaced lugs projecting leftward from the member which supports the cylinder $F^{10}$. The rear lever arm $F^{26}$ extends horizontally toward the right from the pivot pin $F^{28}$, being formed at its end with a rearwardly extending finger $F^{62}$ which engages in a square aperture $F^{63}$ located in the link $F^{23}$ at its lower extremity. The front lever arm $F^{25}$ extends downwardly from the pivot pin, presenting at its lower end a pin $F^{29}$ engaging in a bifurcated arm of a small three-arm swivel member $F^{30}$, a second arm of which is likewise bifurcated to engage the swivel bar $F^{14}$ by which the slide valve $F^{13}$ is adjusted.

The arrangement just described is such that when the latch operating lever $F^{20}$ is swung in a counterclockwise direction by the slide $D^{72}$ as the latter is moved toward the left by the line delivery carriage, the link $F^{23}$ is pulled upwardly, thereby swinging the lever arm $F^{25}$ likewise in a counterclockwise direction. This has the effect of swinging the three-arm swivel member $F^{30}$ to the position shown in Fig. 16, wherein the valve $F^{13}$ is adjusted to admit air to the lower end of the cylinder $F^{10}$ and vent the upper end thereof to the atmosphere. As the cylinder is thus charged, the right-hand jaw $F^{1}$ ascends from the solid line to the dotted line position shown in Figs. 16 and 18, in which latter position the jaw will stand at the right end of the line and serve together with the left-hand jaw to clamp the line at its opposite ends during the casting operation.

The right-hand jaw, like the left-hand jaw, is recessed in its line engaging face to accommodate the right-hand finger $B^{2}$ should it arrive in its topmost position before the finger is drawn upwardly out of the way, thus preventing any danger of interference between the parts (Fig. 24).

After the actual casting of the slug, but before the machine cycle is completed, a cam $F^{37}$, operated in timed relation with the main cam shaft of the machine, rocks the swivel member $F^{30}$ back to the position wherein the valve $F^{13}$ is adjusted to charge the cylinder $F^{10}$ at the top, and, of course, to vent said cylinder to the atmosphere at the bottom. When the pressure conditions in the cylinder are thus reversed, the right-hand vise jaw descends to its normal position (Fig. 18). The swivel member $F^{30}$ below its fulcrum is equipped with an anti-friction roller $F^{38}$ which tracks along the edge of the cam $F^{37}$, it being understood that the cam is formed at the proper point in its periphery with a raised portion for rocking the swivel member $F^{30}$ in the manner stated (Fig. 16).

As the cam $F^{37}$ operates the swivel member $F^{30}$ in adjusting the valve $F^{13}$ to effect the descent of the right-hand jaw, it also operates to restore the control slide $D^{72}$ to its normal position through the levers $F^{25}$, $F^{26}$, the link $F^{23}$ and the lever $F^{20}$ connected to the upper end of the link. The restoration of the lever $F^{20}$ releases the latch member $F^{15}$ which, when freed, returns to its normal position under the action of its associated spring $F^{18}$. This will occur before the right-hand jaw completes its descent, but the latch, being bevelled at its upper end, will permit the block member $F^{17}$ to cam it out of the way. Of course, the latch will assume its original position as soon as the right-hand jaw reaches its lowermost position and will remain active until it is again released upon the arrival of a new line in the first elevator.

*Modification utilizing upward movement of right-hand jaw to inaugurate ascent of line engaging fingers*

Instead of inaugurating the ascent of the line engaging fingers by the terminal movement of the line delivery carriage as has been described earlier in the specification, it is proposed, as a modification, to utilize the upward movement of the right-hand jaw to perform that function. In one respect, the modification has the advantage of maintaining the line under confinement by the fingers until the right-hand jaw is in a position to take over that function. The modified mechanism, best shown in Figs. 16ª and 16ᵇ, includes a lever O fulcrumed on the same pin that supports the lever $F^{20}$. The lever consists of two arms $O^{1}$ and $O^{2}$ rigidly yoked together, the arm $O^{1}$ extending upwardly from the fulcrum point and located with its upper end standing just at the right of the lug $B^{69}$ presented by the slide $B^{66}$ which operates the valve controlling the admission of air to the cylinder $B^{59}$ for raising and lowering the line engaging fingers. The other arm $O^{2}$ of the lever extends downwardly, terminating at its lower end in a forwardly extending lip $O^{3}$.

At the rear of the right-hand jaw support $F^{6}$, there is mounted a bracket $O^{4}$ having a rearwardly extending horizontal portion, presenting, at its rear end, a dog $O^{5}$ which is pivotally mounted on a pin $O^{6}$ threaded into the bracket. The dog $O^{5}$ is constrained against rotation in a clockwise direction by the interaction of its lower edge with a bevelled surface $O^{7}$ presented by the bracket, the parts being resiliently held in that position by a torsion spring $O^{8}$ encircling the pivot pin $O^{6}$, the spring having its ends reacting between the dog and the bracket. The location of the dog $O^{5}$ is such that as the right-hand jaw ascends to its active or line clamping position, i. e., from the solid to the dotted line positions shown in Figs. 16ª and 16ᵇ, the dog, near the top of the stroke, will engage the forwardly extending lip $O^{3}$, causing the lever O to rotate from the solid to the dotted line position shown in Fig. 16ª, to adjust the valve $B^{62}$ to charge the cylinder $B^{59}$ at its front end thereby raising the line engaging fingers out of engagement with the line. From then on, the restoration of the line delivery carriage proceeds as in the embodiment previously described.

The lever O is designed to return to its original position by gravity. The lip $O^{3}$ thereof will not interfere with the descent of the right-hand jaw to its normal position since the dog $O^{5}$ will merely rotate in a counterclockwise direction against the reaction of its spring as it passes the lip, the dog thereafter snapping back to its normal position. In this connection, it might be stated that the lower left corner of the dog is rounded off to permit such rotation. Should the lever O not return to its original position in the manner stated, it will of course be positively restored when the slide $B^{66}$ is moved rightward to inaugurate the downward movement of the line engaging fingers preparatory to transferring the next line.

*Inauguration of the casting cycle*

The casting cycle of the machine is inaugurated by the right-hand jaw during the final stage of its upward movement. To this end, an arm $F^{31}$, extending rearwardly from the right-hand jaw slide $F^{3}$, is formed at its rear end with a bevelled surface $F^{32}$, which is arranged to engage a complementary bevelled surface $F^{33}$ formed at the front end of an arm $F^{34}$ pinned to the top of a vertical shaft $F^{35}$ journalled in vertically spaced members of the fixed bracket G (Figs. 16, 18 and 20). To the lower end of the shaft $F^{35}$, there is pinned another arm $F^{36}$ arranged for swinging movement in a horizontal plane and which engages at its outer end between spaced collars $G^1$ formed at the front end of a clutch control rod $G^2$ mounted for limited movement in a fore-and-aft direction. According to this arrangement, just as the right-hand vise jaw $F^1$ nears the top of its stroke, the shaft $F^{35}$ is turned in a counterclockwise direction (looking at the parts from the top), due to the engagement of the bevelled arms $F^{31}$ and $F^{34}$, and the arm $F^{36}$ is rocked in a direction to pull the clutch control rod $G^2$ forwardly to inaugurate the machine cycle. A machine cycle of operation involves one complete rotation of the main cam shaft (not shown) which controls the various operations taking place during the casting cycle, all as set forth in my copending application Serial No. 355,434.

After the machine cycle has been inaugurated, the clutch control rod $G^2$ is restored to its normal position by a compression spring $G^3$ encircling the rod and which reacts between a collar $G^4$ pinned on the rod and a fixed part of the machine (Fig. 20). Consequently, the arm $F^{34}$ at the upper end of the vertical shaft $F^{35}$ will be restored to its normal position prior to the descent of the right-hand jaw and will stand in the path of the arm $F^{31}$ on the right-hand jaw slide $F^3$. In order, therefore, that no interference will be presented to the descent of the right-hand jaw, the arm $F^{34}$ is made in two parts pivotally connected and formed with bevelled surfaces cooperating in such manner that the arm acts as a rigid member during the ascent of the right-hand jaw, but breaks at the pivot during the descent of the jaw. The latter condition is shown by the dotted lines in Fig. 18, the front portion of the arm having been swung downwardly out of the way by the rearwardly extending arm $F^{31}$ on the right-hand jaw slide. However, as soon as the arms $F^{31}$ and $F^{34}$ are clear of each other, the front portion of the arm $F^{34}$ will be restored to its original position by a spring $F^{39}$ connected at one end to a lug extending upwardly therefrom and anchored at its other end to a pin presented by the rear portion of the arm (Fig. 18).

The machine is also equipped with mechanism for manually inaugurating the casting cycle. This mechanism includes a lever $F^{40}$ pivotally mounted on a forward extension of the bracket G and formed with an arm extending upwardly at an angle toward the front of the machine where it terminates in a handle $F^{41}$ (Fig. 18). A short arm $F^{42}$ depending below the fulcrum presents a bevelled surface $F^{43}$ which engages a nose portion at the front end of an arm $F^{44}$ formed integrally with the arm $F^{36}$ by which the clutch control rod is actuated (Fig. 19). The lever $F^{40}$ is held in its normal or inactive position by a tension spring $F^{46}$ having a fixed anchorage in the bracket G and which is connected at the upper end of a third arm $F^{45}$ rising from the hub portion of the lever $F^{40}$. The normal position of the lever is determined by an adjustable banking screw $F^{47}$ against which the lever arm $F^{45}$ banks at its rear edge. When the operator desires to start the machine, he pulls down on the handle $F^{41}$ against the tension of the spring $F^{46}$, with the result that the lever $F^{40}$, through the engagement of its bevelled surface $F^{43}$ with the nose piece on the arm $F^{44}$, swings the latter in a direction to pull the clutch control rod forwardly and start the machine. Once the machine cycle has been started, the operator releases the handle, which thereupon is restored to its normal position by the spring $F^{46}$, the machine cycle, of course, proceeding until completed.

Safety devices

The machine is equipped with several safety features; one to prevent starting the machine manually except when the right-hand jaw is in its raised or active positon, a second to arrest the leftward movement of the line delivery carriage in the event an attempt is made to deliver a line to the first elevator when the right-hand jaw is raised, and a third to arrest the line delivery movement of the carriage when the first elevator is in any position other than its (lowermost) line receiving position.

The first safety device includes a stop plate $F^{48}$ secured to the rearwardly extending arm $F^{31}$ on the right-hand jaw slide and having a laterally extending portion standing in front of the vertical arm $F^{45}$ of the manual starting lever $F^{40}$, when the right-hand jaw is in its lowermost positon (Figs. 18 and 20). Under such conditions, the forward movement of the manual starting lever is prevented. However, when the jaw has been raised to its active position, the manual starting lever will clear the stop plate $F^{48}$ and permit the inauguration of a casting cycle.

The second safety device includes a lever $F^{49}$ fulcrumed at the top of the vise frame for swinging movement in a fore-and-aft direction (Fig. 18). The lever is formed with a forwardly extending arm presenting a pin at its front end which engages in a recess formed at the top of a vertical rod $F^{50}$ arranged in the vise frame for vertical sliding movement. At its lower end, the rod $F^{50}$ is formed with a portion $F^{51}$ extending rearwardly beneath the block $F^{17}$ on the right-hand jaw slide $F^3$. The lever $F^{49}$ is also formed with a vertical arm presenting a nose piece $F^{52}$ which, in the normal position of the lever, stands clear of the path of travel of the line delivery fingers $B^1$ and $B^2$, the lever being held in such position against the reaction of a compression spring $F^{53}$, by the block $F^{17}$ which immediately overlies the rearwardly extending portion $F^{57}$ of the vertical rod $F^{50}$ when the right-hand vise jaw is in its lowermost position. The spring $F^{53}$ is seated in a recess in the vise frame beneath the lever and in a position to push upwardly against the lower edge thereof. Consequently, so long as the right-hand vise jaw is in its lowermost position, the stop lever $F^{49}$ will not interfere with the delivery of a line to the first elevator. However, as soon as the right-hand vise jaw starts its upward movement, which occurs after the line is in the first elevator, the lever will be freed and will be turned by the action of the spring $F^{63}$ to position its nose portion $F^{52}$ into the path of the line delivery carriage.

As shown in Fig. 1, the location of the lever $F^{49}$ is such, that when active, it will engage the bracket $B^9$ supporting the left-hand finger and will arrest the line delivery carriage in a position wherein the left-hand finger is located just to the right of the right-hand jaw. Of course, as soon as the right-hand jaw is restored to its lowermost position, the block $F^{17}$ thereon will pull the vertical rod $F^{50}$ downwardly and render the stop lever inactive, thereby permitting the line delivery carriage to proceed on its way. It should be pointed out that the stop lever is rendered active as soon as the right-hand jaw begins its upward stroke and when the line delivery carriage is in its leftmost position. Consequently, it will stand in the path of the finger supporting brackets $B^6$ and $B^9$ when the line delivery carriage is being returned to its normal position. The stop lever, however, will not interfere with the return movement of the carriage since the nose portion $F^{52}$ thereof is bevelled so as to cause the stop lever to be cammed out of the way by the finger supporting brackets during such return movement. When the fingers have traveled past, the stop lever snaps back into its active position, being free at the time to do so.

The third safety device, which prevents the delivery of a line to the first elevator when the latter is in any position other than its line receiving position, includes a horizontal lever $F^{54}$ fulcrumed at its center on a bracket located at the rear of the line delivery guide $B^5$ (Figs. 1 and 21). The lever is connected at its left end to a vertical link $F^{55}$ which in turn is connected at its upper end to another horizontal lever $F^{56}$ mounted on the machine front plate and arranged to rock in a fore-and-aft plane. The second lever $F^{56}$, forward of its fulcrum, overlies the right end of a horizontal lever $F^{57}$ extending at right angles thereto and which is pivotally mounted adjacent its center on the stationary first elevator supporting frame $C^{13}$. The frame is slotted to accommodate the lever, which at its left end underlies a banking screw $F^{58}$ theaded downwardly through a lug projecting forwardly from the first elevator slide $D^1$ near its upper end. When the first elevator is in its lowermost or line receiving position, it will, through the intermediate linkage just described, locate the first-mentioned horizontal lever $F^{54}$ with its right end standing clear of the line delivery carriage so as not to interfere with the line delivery movement thereof. However, when the first elevator is raised above its line receiving position even but slightly, the lever $F^{54}$ will be turned to locate its right end in the way of the rearwardly projecting lug $B^{19}$ on the line delivery carriage and thus arrest its line delivery movement (Fig. 11). The lever $F^{54}$ is turned to its carriage arresting position by a tension spring $F^{59}$ connected at one end to the lever $F^{54}$ at the left of its fulcrum point and at its other end to an overlying pin $F^{60}$ projecting forwardly from the bracket upon which said lever is supported (Figs. 1 and 21). The active position of the lever $F^{54}$ is determined by a banking screw $F^{61}$ threaded downwardly through the lever at the right of its fulcrum and adapted at its lower end to engage the bracket support.

The slight upward movement of the first elevator from its line receiving position to its casting position is sufficient to render the safety device active and, of course, it will continue active when the first elevator is raised to the upper transfer level.

Upper transfer position of first elevator

Reference has been made earlier to the fact that the first elevator is released upon the descent of the right-hand vise jaw after the casting operation, permitting the elevator to ascend to the upper line transfer position shown by the dotted lines in Fig. 15. In this position of the elevator, the composed line is removed therefrom, the matrices being transferred to the second elevator and the spacebands returned to their storage magazine.

The first elevator D is arrested in its topmost position by the engagement of the first elevator jaw with an adjustable banking screw H threaded downwardly through the horizontal arm of an angle bracket $H^1$ located at the right of the elevator supporting frame $C^{13}$ (Figs. 15 and 27). At the rear end of said horizontal arm, there is formed a long V-shaped bar $D^{82}$ adapted to enter the V-shaped notches of the matrices supported in the first elevator as the latter reaches its topmost position to depress any matrices that may have been standing in the elevator at the upper level, thereby insuring that all of the matrices will stand at the proper level for transfer to the second elevator. The bar $D^{82}$ is maintained in a perfectly horizontal position at all times since the angle bracket $H^1$ of which it forms part is tongued and grooved to a fixed lug $H^3$ presented by the first elevator frame $C^{13}$. The angle bracket is secured to the lug $H^3$ by a pair of bolt and slot connections $H^2$, the slots providing for a limited adjustment in the vertical position of the V-shaped bar as determined by an adjusting screw $H^4$ threaded downwardly through an overlyin portion of the lug $H^3$ and into engagement with the top of the angle bracket.

Before the line can be transferred from the first elevator, the clamping pressure exerted on the ears of the matrices by the aligning plate $D^{12}$ must be removed and the upper rail $D^{15}$ retracted to allow the matrices supported thereon (should there be any) to drop to the lower level in the elevator. The pressure on the matrices exerted by the aligning plate $D^{12}$ is relieved by depressing the plate to its normal position in the elevator head against the tension of its springs $D^{21}$. This is accomplished by rocking the swivel member $D^{28}$ (which positions the aligning plate adjusting lever $D^{23}$) in a counterclockwise direction when the first elevator reaches its topmost position. To this end, the swivel member $D^{28}$ is formed at the top with a forwardly projecting pin $D^{75}$ adapted to engage an inclined surface $D^{76}$ of a block $D^{77}$ presented by the first elevator frame near the top (Figs. 15 and 27). As the first elevator nears the transfer level, the pin D engages the inclined surface of the block $D^{77}$ and cams the swivel member $D^{28}$ in a direction to depress the aligning plate $D^{12}$ and release the matrices for transfer.

The depression of the aligning plate $D^{12}$ also releases the clamping pressure on the retractile rail $D^{15}$, which thereupon is cammed forwardly as its operating pawls $D^{80}$ engage at their upper ends against fixed lugs $D^{81}$ (only one of which is shown) on the first elevator frame (Fig. 27).

Upper transfer carriage and its line transfer operation

When the first elevator is at the upper transfer level, the composed line stands at the right of a depending transfer finger J forming part of an upper transfer carriage $J^1$ and which enters between the first elevator jaw at the left (Fig. 27).

The transfer finger J is a relatively thin member formed at its lower end with a wide flange portion $J^2$ for engagement with the composed line and fastened at the top to the forward overhang of a vertical member $J^3$ integrally connected at its lower end with a slide $J^4$ forming part of the transfer carriage (Figs. 29, 30 and 33). The slide $J^4$ is a long horizontally disposed member, the upper and lower edges of which fit into upper and lower opposed grooves $J^5$ and $J^6$ formed in a fixed horizontal member $J^7$ of the machine front plate and constituting a guideway for the transfer carriage (see also Fig. 1). At the rear of the vertical member $J^3$, there is secured an angularly shaped bracket $J^8$, one leg of which extends rearwardly and is connected at the right end of a piston rod $J^9$ forming part of a double-acting pneumatically operated cylinder and piston mechanism $J^{10}$, supported at its opposite ends in a fixed part of the machine. The opposite ends of the cylinder are connected to a valve mechanism $J^{11}$ through individual pipe lines $J^{12}$ and $J^{13}$, the valve mechanism (see Figs. 35 and 36) including a slide $J^{14}$ adjustable by a swivel bar $J^{15}$ between two extreme positions. The valve, in one extreme position of adjustment, acts to connect one end of the cylinder to a source of air pressure and to vent the other end of the cylinder to the atmosphere, and, in the other extreme position of adjustment, it acts to reverse the air pressure conditions in the cylinder. The slide $J^{14}$ of this particular valve has a neutral position of adjustment between the two extremes wherein neither end of the cylinder will be charged, the piston remaining stationary.

Under normal conditions, the valve $J^{11}$ is adjusted to charge the cylinder at its right end, the transfer carriage $J^1$ then being located in its leftmost position wherein the line transfer finger $J$ stands at the left of the composed line when the latter is brought to the transfer position by the first elevator. Two safety latch members $J^{16}$ and $J^{17}$ act to hold the transfer carriage in its normal position (Figs. 1, 29 and 30). The latch member $J^{16}$ is pivotally mounted at its left end on a standard forming part of a retaining plate $J^{18}$ fastened at the front of the guide member $J^7$ and which acts to hold the slide $J^4$ therein. The latch member $J^{16}$ overlies the forwardly offset portion of the transfer carriage on which the finger piece $J^2$ is mounted, being formed with a nose $J^{19}$ engaging the right edge of said offset portion to lock the carriage against movement toward the right (Figs. 1 and 30). The second latch member $J^{17}$ comprises a lever having two arms $J^{20}$ and $J^{21}$ yoked together in spaced relation and pivotally mounted on a pin $J^{22}$ extending in a fore-and-aft direction through both arms and also through a bearing $J^{23}$ located between the arms and mounted on a fixed part of the machine (Figs. 29 and 30). The front arm $J^{20}$ of the lever is relatively long and extends towards the left from its pivot mounting, being notched at its left end to present a shoulder $J^{24}$ which stands at the right of a rearwardly extending portion $J^{25}$ of the bracket $J^8$ on the transfer carriage to which the piston rod $J^9$ is connected, i. e., the shoulder $J^{24}$ engages the bracket extension $J^{25}$ when the parts are in their normal positions and thus also acts to lock the transfer slide against movement toward the right.

As will be explained in detail later on, the second elevator $K$ is conditioned to descend to the upper transfer level at the same time the first elevator is conditioned to ascend, i. e., at the time the line delivery carriage completes its line delivery movement toward the left. Indeed, the second elevator and the first elevator have a common valve control, as will later appear.

Under normal conditions, the second elevator $K$ descends to the upper line transfer level prior to the ascent of the first elevator thereto, and as it nears said level, an extension at the left of a transverse rod $K^1$ forming part of the second elevator head engages the upper end of a lever $J^{26}$ fulcrumed at its center on a fixed bracket $J^{27}$ and arranged to rock in a fore-and-aft plane (Figs. 30 and 33). At its upper end, the lever $J^{26}$ is formed with an embossed or laterally offset portion $J^{28}$ presenting two inclined surfaces located one above the other, the upper surface $J^{29}$ being inclined downwardly toward the front of the machine, and the lower surface $J^{30}$ inclined downwardly toward the rear. As the rod $K^1$ engages the upper inclined surface $J^{29}$ as the second elevator descends, it cams the lever $J^{26}$ from the solid line position shown in Fig. 33 to the dotted line position shown therein, and as the lever is thus actuated, it adjusts the valve $J^{11}$ to the position wherein the cylinder $J^{10}$ is vented at its right end and charged with air under pressure at its left end. In other words, the cylinder is conditioned to move the transfer slide toward the right. The intermediate connections by which the lever $J^{26}$ adjusts the valve $J^{11}$ include a small bell crank lever $J^{31}$ pivotally mounted on the bracket $J^{27}$ to swing in a fore-and-aft plane. The lever $J^{31}$ has an upwardly extending arm engaging the bifurcated lower end of the lever $J^{26}$ and a forwardly extending arm engaging the bifurcated end portion of one arm $J^{32}$ of a three-arm swivel plate $J^{33}$, which latter is pivotally mounted on the transfer slide guideway $J^7$ adjacent its rear face. A second depending arm $J^{34}$ of the swivel plate $J^{33}$ is likewise bifurcated at its lower end to engage the swivel bar $J^{15}$ of the valve $J^{11}$. According to the arrangement, when the lever $J^{26}$ is swung to the dotted line position shown in Fig. 33, as the second elevator nears the line transfer position, the swivel plate $J^{33}$ is moved by the intermediate bell crank lever $J^{31}$ to the position shown in Fig. 30, adjusting the valve $J^{11}$ to charge the cylinder $J^{10}$ at its left end and vent it at its right end, and thus conditioning the cylinder to move the transfer carriage to the right.

The transfer carriage cannot move toward the right, however, until it is released by the two safety latches $J^{16}$ and $J^{17}$. The safety latch $J^{17}$ is rendered inactive as the second elevator seats at the transfer level, said elevator being provided for the purpose with a banking screw $J^{35}$ which engages the rear arm $J^{21}$ of the latch lever to rock the front arm $J^{20}$ thereof upwardly out of the way of the transfer carriage (Fig. 30). The banking screw $J^{35}$ is adjustable to insure that the necessary clearance is provided.

The second latch member $J^{16}$, on the other hand, is rendered inactive upon the arrival of the first elevator at the line transfer level. At that time, the elevator jaw engages the lower end of a banking screw $J^{36}$ threaded downwardly through the latch member at about its center, thereby pushing the latch member upwardly to the position shown in Fig. 30 and freeing the transfer carriage for movement toward the right.

Upon its release by the two latch members $J^{16}$ and $J^{17}$ in the manner stated, the line transfer carriage moves toward the right from its normal position marked 1 in Fig. 29 to an intermediate position marked 2 therein, in which latter position it is momentarily arrested to permit the ascent of the second elevator with the matrices for distribution. Such arrest of the line transfer carriage is accomplished in the following manner:

Referring to Figs. 29 and 30, it will be observed that immediately above the swivel plate $J^{33}$, by which the valve $J^{11}$ is operated, there is located a horizontal slide $J^{37}$ mounted by means of a pin and slot connection $j$ on the fixed transfer slide guide member $J^7$ adjacent its rear face. At its left end, the slide $J^{37}$ is formed with a rearwardly extending lip $J^{38}$ accommodating a banking screw $J^{39}$ which engages the left upper edge of a vertical lever $J^{40}$. The lever $J^{40}$ is fulcrumed at its center in a fixed part of the machine and connected at its lower end, by means of a horizontal link $J^{41}$, with the lever $D^{70}$ which effects the adjustment of the valve $D^{62}$, i. e., the common valve for controlling the raising and lowering of the first and second elevators. Normally, i. e., when the elevator control valve $D^{62}$ is adjusted to the position to maintain the first elevator in its lowermost position and the second elevator in its raised position, the slide $J^{37}$ will be located in its rightmost position as determined by its pin and slot mounting. Normally, too, the lower edge of the slide $J^{37}$ engages a fixed pin $J^{42}$, the engagement being resiliently maintained by a spring $J^{43}$ which is connected at its upper end to the slide at the right of the pin and slot mounting and at its lower end to a fixed part of the machine.

Now, when the lever $D^{70}$ is rocked by the movement of the line delivery carriage at the end of its leftward stroke, to adjust the valve $D^{62}$ to the position wherein the respective cylinders are charged for raising the first elevator and lowering the second elevator, said lever $D^{70}$ also turns the vertical lever $J^{40}$ to the position shown in Fig. 30, which movement of the lever acts to pull the slide $J^{37}$ toward the left as permitted by its pin and slot mounting. Later on, when the second elevator seats at the line transfer level, a vertical banking screw $J^{44}$, threaded downwardly through a lug on the elevator head, engages the slide $J^{37}$ at its right end and turns it clockwise to the position shown in Fig. 30, wherein a shoulder $J^{45}$ formed in its upper edge is presented in the path of movement of the line transfer carriage. As the carriage nears its intermediate position, the angular plate $J^8$ thereon engages the shoulder $J^{45}$ and pushes the slide $J^{37}$ to the solid line position shown in Fig. 31. That movement of the slide $J^{37}$ serves a double function; first, it causes a stud $J^{46}$ thereon to engage an upwardly extending arm $J^{47}$ of the three-arm valve control member $J^{33}$ and turn it from the dotted line to the solid line position shown in Fig. 31, wherein the valve $J^{11}$ controlling the transfer carriage cylinder and piston mechanism $J^{10}$ has a neutral setting. The result is that, for the moment, all movement of the transfer carriage ceases. Secondly, the slide $J^{37}$ turns the vertical lever $J^{40}$ to the position likewise shown in Fig. 31, with the result that the lever $D^{70}$ which is connected to it by the link $J^{41}$ is restored to the position wherein the valve $D^{62}$ causes the descent of the first elevator to its lowermost or line receiving position and the ascent of the second elevator to the distributing level, the second elevator, of course, carrying with it the matrices that have been transferred from the first elevator. As the second elevator ascends, it frees the slide $J^{37}$, which thereupon is turned by its associated spring $J^{43}$ to the dotted line position shown in Fig. 31 (that incidentally being the normal position of the slide).

As the slide $J^{37}$ is restored to its normal position, the shoulder $J^{45}$ is moved out of the path of the transfer carriage, leaving the latter free to continue its movement toward the right. This second phase in the movement of the transfer carriage is for the purpose of pushing the spacebands in the direction of the spaceband magazine and is inaugurated by the second elevator as it starts its ascent to the distributing level. As the second elevator leaves the transfer level, the transverse pin $K^1$ thereof engages the lower inclined surface $J^{30}$ of the vertical lever $J^{26}$, which, as will be recalled, controls the adjustment of the valve $J^{11}$, it being understood that the lever $J^{26}$ is rocked to a neutral position when the valve is correspondingly adjusted by the slide $J^{37}$, the intermediate connections between the lever and the swivel member $J^{47}$ being of a positive character. The transverse pin $K^1$ cams the lever $J^{26}$ back to the dotted line position shown in Fig. 33, with the result that the valve $J^{11}$ is again adjusted to the position wherein the cylinder $J^{10}$ operating the transfer carriage is charged at its left end. Consequently, the carriage continues its movement toward the right, moving the finger $J$ to the position marked 3 in Fig. 29, the finger during such movement pushing the spacebands before it until they are in a position to be engaged by a pawl or grabber $L$ which pulls the spacebands back into the magazine $A^7$ from which they were originally released during the composition of the line (Fig. 37).

*Spaceband grabber and its operation*

Upon leaving the first elevator, the spacebands enter an upper transfer channel $L^1$ located between the first elevator and the spaceband magazine $A^7$ and which presents opposed grooves $L^2$ wherein the spacebands are supported by their upper ears (Figs. 33 and 37). The spaceband pawl $L$ normally stands near the right of the spaceband magazine $A^7$ as shown in Fig. 1. However, during the movement of the transfer carriage toward the right, the pawl is moved leftward from its normal position to the position shown in Fig. 37, the means for this purpose including a slide $L^3$ on which the pawl is pivotally mounted. The pawl $L$ is formed with a nose portion $L^4$ extending downwardly into the channel so as to engage the spacebands at the top and also with a flange $L^5$ overlying the rear wall of the channel. A horizontal leaf spring $L^6$, which for the most part overlies the rear wall of the channel in spaced parallel relation therewith, is bent down at its right end so as to engage the top of said rear wall, the spring being secured in place by a vertical flange $L^7$ screwed to the channel adjacent its upper rear face (Fig. 33). During the movement of the transfer finger $J$ toward the right, the pawl $L$ is moved toward the left, the flange at the rear edge thereof riding up onto the leaf spring and then dropping down into engagement with the top wall of the channel when the left end of the leaf spring has been cleared. At that time, there will be a sufficient overlapping between the pawl $L$ and the finger $J$ of the transfer carriage to insure that all of the spacebands will be engaged by the pawl (see Fig. 37). In this connection, it should be noted that the pawl is formed with a notch $L^8$ at its left end to accommodate the vertical member $J$ which supports the transfer finger in order that the requisite overlapping of the parts is obtained.

In the instant machine, the spaceband pawl $L$ is actuated by the line transfer carriage, the mechanism for the purpose being shown best in Figs. 1, 30, 33, 34 and 37. It includes the long horizontal bar $L^3$, which is mounted in the line transfer carriage guide $J^7$ at the front but near the bottom of the slide $J^4$, the bar being held in position by the front retaining plate $J^{18}$ to which reference has already been made. At its right end (see Figs. 33 and 37), the bar $L^3$ is provided with a standard $L^9$ formed to clear the carriage guide member and provided at the top with a forwardly extending portion $L^{10}$ located above the rear wall of the channel and on which the pawl itself is pivotally mounted. A somewhat similar bar $L^{11}$, arranged near the top and at the front of the slide $J^4$, extends from the left end of the guideway to a point somewhat to the right of the line transfer carriage. The bars $L^3$ and $L^{11}$ are spaced apart in a vertical direction by a tongue $L^{12}$, projecting inwardly from the retaining plate $J^{18}$, and are formed in their opposed edges with rack teeth meshing with an intermediate pinion $L^{13}$ journalled at the rear of the retaining plate $J^{18}$. In the immediate vicinity of the transfer carriage, the upper bar $L^{11}$ is devoid of teeth so that, during the first stage of the line transfer movement, the bar remains stationary. However, as the carriage approaches the right end of the bar $L^{11}$, it engages a depending nose portion $L^{14}$ thereon and pulls the bar $L^{11}$ with it toward the right. Such rightward movement of the upper bar $L^{11}$, through the pinion $L^{13}$, moves the lower bar $L^3$ toward the left to locate the spaceband pawl $L$ in its spaceband engaging position (Fig. 37). Upon the return of the transfer carriage leftward to its normal position, the first rack tooth at the right on the bar $L^{11}$ is engaged by the carriage and the bar thereby restored to its normal position. The return movement of the upper bar $L^{11}$ will, of course, move the lower bar $L^3$ toward the right, thus returning the pawl $L$ to its normal position shown in Fig. 1. This return movement of the pawl $L$, constituting its effective stroke, gathers the spacebands together and sweeps them from the upper transfer channel $L^1$ into the storage magazine $A^7$, the spacebands sliding along the grooves $L^2$ until they reach a pair of inclined upper rails $L^{15}$ on the magazine which allow them to drop by gravity to their proper place in the magazine.

The relative movement between the transfer carriage $J^1$ and the upper bar $L^{11}$ is necessary for the reason that the full movement of the carriage toward the right is greater than the distance through which the spaceband pawl is required to move toward the left. In other words, the distance through which the spaceband pawl moves is equal to the distance between the full range of movement of the transfer carriage and the distance through which the carriage moves idly with respect to the upper bar.

*Return movement of the upper transfer carriage*

The return movement of the upper transfer carriage to its normal position is brought about by a reversal in the adjustment of the control valve $J^{11}$. For this purpose, there is provided a supplementary cylinder and piston mechanism, arranged in the housing of the valve $J^{11}$ and which includes a vertically disposed piston $J^{49}$ underlying the horizontal leftward extending arm $J^{32}$ of the three-arm member $J^{33}$ which effects the setting of the main valve $J^{11}$ (Figs. 35 and 36). The cylinder $J^{48}$, at its lower end, is connected by means of a duct or passageway $j^1$ with a cylindrical chamber $J^{50}$ drilled horizontally in the valve housing to accommodate the reduced portion of a valve stem $J^{51}$. At its right end, the valve stem is formed with an enlarged portion $J^{52}$ slidably arranged in a larger portion of the chamber $J^{50}$. The valve stem is adjustable longitudinally to two positions, its normal or rightmost position being determined by a transverse pin $J^{53}$ passing through a recess $J^{54}$ formed in the enlarged portion of the valve stem and fixed at its ends in the walls of the cylindrical chamber. A compression spring $J^{55}$, reacting between the enlarged portion $J^{52}$ of the valve stem and the base of the larger portion of the recess, urges the valve to its normal position.

In the normal position of the valve stem $J^{51}$, a passageway $J^{56}$ in the left end thereof registers with the duct $j^1$, and thus vents the cylinder $J^{48}$ to the atmosphere. Under such conditions, the piston $J^{49}$, under the action of gravity, seats at the bottom of the cylinder and will not interfere with the movement of the lever $J^{33}$. However, as the line transfer carriage reaches the rightmost end of its stroke, where it is arrested by the banking of the angle bracket $J^8$ against a fixed stop $j^2$ (see Fig. 29), said bracket rocks a lever $J^{57}$, fulcrumed at its center on a fixed bracket, from the position shown in Fig. 31 to the position shown in Figs. 32 and 35. As the lever $J^{57}$ is thus rocked by the carriage, it pushes the valve stem $J^{51}$, which it abuts at its lower end, toward the left against the reaction of the spring $J^{55}$, thereby moving the passageway $J^{56}$ out of registry with the duct $j^1$ and bringing another annular passageway $J^{58}$ in the valve stem into registry therewith.

When the annular passageway $J^{58}$ registers with the duct $j^1$, it also registers with another duct $J^{60}$ communicating with the high pressure chamber of the main valve $J^{11}$. The result is that air under pressure is admitted to the cylinder $J^{48}$, thereby moving the piston $J^{49}$ upwardly, the piston in turn rotating the lever $J^{33}$ to adjust the valve $J^{11}$ to the position wherein air is admitted at the right end of the cylinder $J^{10}$ for moving the transfer carriage toward the left back to its original position.

The departure of the transfer carriage toward the left releases the valve stem $J^{51}$, which thereupon is restored to normal position by its spring $J^{55}$, the lever $J^{57}$ likewise being restored to its normal position as well as the piston $J^{49}$ whose cylinder is again vented to the atmosphere.

To complete the description of the supplementary valve, it should be stated that the transverse pin $J^{53}$, which determines the normal position of the valve stem $J^{51}$, also acts to prevent rotary movement thereof, thereby insuring that the passageway $J^{56}$ in the valve stem leading to the atmosphere will register with the duct $j^1$ leading to the cylinder when the valve stem is in its normal position.

During the return of the transfer carriage to its normal position, the long safety latch member $J^{20}$ (which, of course, has now been released by the second elevator), drags along over the top of the rearward extension $J^{25}$ on the angular bracket $J^8$ until the carriage reaches its leftmost position, whereupon the latch member drops down into its active position. The other safety latch member $J^{16}$ (which is operated by the first elevator) is cammed up out of the way during the return of the transfer carriage by the engagement of a portion of the carriage with a bevelled surface $J^{64}$ formed at the right end of the latch member. And, of course, when the transfer carriage reaches its leftmost position, the latch member $J^{16}$ drops into its active position ready to be operated by the first elevator when it next moves up to the transfer level. It may also be added that, when the transfer carriage is in its rightmost position, both latch members are prevented from dropping downwardly too far, the latch member $J^{16}$ by an underlying stop pin $J^{61}$ fixed near the top of the retaining plate $J^{18}$ on which the latch is mounted, and the latch member $J^{20}$ by a banking screw $J^{62}$ threaded upwardly through a lug $J^{63}$ formed on the latch support $J^{23}$ and which underlies the yoke portion $J^{17}$ of the latch member. The banking screw $J^{62}$ is adjustable to allow the latch member, when active, to drop down a distance sufficient to insure engagement of its shoulder $J^{24}$ with the transfer carriage (Figs. 29 and 30).

*First elevator line resistant and matrix retaining pawl*

At this time, mention should be made of the fact that the first elevator jaw is equipped with a line stop $d$ to prevent twisting of the matrices out of position during the ascent of the elevator to the upper line transfer position (Figs. 27 and 30). The line stop includes a pair of spaced parallel bars $d^1$ and $d^2$ arranged to slide horizontally, one in each of the first elevator jaws, the bars being yoked together at the left by a connecting piece $d^3$ so that the stop will act as a unit. Normally, the line stop is located with its right end in a position to be engaged by the leading matrix in the line as the latter enters the first elevator, the stop being pushed toward the left by the line as it is transferred into the first elevator by the line delivery carriage. Consequently, the ultimate position of the line stop $d$ for any given line depends solely upon the length of the line or upon the position of the line where a quadding or centering operation is performed. In other words, regardless of the line length, or its position, the line stop $d$ will engage and support the leading matrix of the line against turning or twisting movement. When the line is transferred out of the first elevator, the line stop is restored to its normal position, ready to cooperate with the next line delivered to the first elevator, by the line transfer carriage which, for this purpose, is equipped with a long horizontal arm $d^4$ fastened at its right end to the upwardly extending vertical portion $J^3$ of the transfer carriage (Figs. 27, 29 and 30) and which is formed at its left end with a depending finger $d^5$ adapted to engage a lip $d^6$ mounted at the left end of the line stop on the connecting portion $d^3$. When the carriage moves rightward to transfer the line from the first elevator, the horizontal arm $d^4$ picks up the line stop and restores it to its normal position. Later, when the transfer carriage is restored leftward to its normal position, the horizontal arm $d^4$ will be located in position to perform the same function upon the ascent of the first elevator with the next line to be transferred.

The improved machine is also equipped with a matrix retaining pawl for supporting the terminal matrix in a line during the movement of the first elevator from casting position to upper line transfer position, the pawl being adapted to sustain the end matrix regardless of the position of the line in the first elevator (Figs. 26$^a$, 26$^b$, 26$^c$ and 26$^d$). Thus, in those instances where the line is moved in the first elevator, bodily toward the left, as for instance, in right-hand quadding or in centering, the pawl is automatically positioned to carry out its function of sustaining the matrices.

The pawl device includes a U-shaped member presenting a pair of legs or side elements $d^7$ and $d^8$ guided for horizontal movement in opposed grooves $d^9$ and $d^{10}$ formed one in the rear elevator jaw member $D^4$ and the other in the front elevator jaw member $D^5$, the elements $d^7$ and $d^8$ being integrally joined together at their left ends. A second U-shaped member $d^{11}$, likewise presenting side elements $d^{12}$ and $d^{13}$, integrally connected together at their left ends, is embraced between the legs $d^7$ and $d^8$ of the first U-shaped member, being pivotally connected thereto by a fore-and-aft pin $d^{14}$ extending through the solid or integral leg connecting portion of the second U-shaped member $d^{11}$ and mounted at its opposite ends in the legs of the first U-shaped member.

The side elements $d^{12}$ and $d^{13}$ are formed at their right ends with depending tongue portions $d^{15}$ and $d^{16}$ adapted, during the ascent of the first elevator, to engage the upper ears of the terminal matrix in the line. When the first elevator is in its normal or line receiving position, however, the U-shaped member $d^{11}$ is tilted to an inclined position, causing the depending tongue portions $d^{15}$, $d^{16}$ to stand clear of the matrices of the composed line, as the latter is moved endwise into the first elevator, regardless of the level at which the matrices are composed. The tilted position of the member $d^{11}$ is determined by a banking screw $d^{17}$ threaded downwardly through the intermediate connecting portion of said member and arranged to bank against the top of the left hand jaw F, the screw being adjustable to insure proper clearance for the incoming line. The front and rear walls of the first elevator are recessed to permit the tilting action of the pawl as just described.

It will be recalled that the first elevator, after the composed line has been transferred thereto, ascends a slight distance into casting position. As the first elevator partakes of such movement, the pawl $d^{11}$ drops by gravity from the solid to the dotted line position shown in Fig. 26$^a$, wherein the depending tongue portions $d^{15}$ and $d^{16}$ engage or at least stand just to the right of the upper ears of the last matrix in the line and consequently will perform their intended function of preventing the displacement of such matrix during the ascent of the first elevator to its upper line transfer position.

It will be observed that the right-hand jaw $F^1$ is formed at the top and adjacent its line engaging face with a recess $d^{18}$ which accommodates a rearwardly extending lug $d^{19}$ forming part of the depending tongue portion $d^{16}$ at the right end of the front pawl element $d^{13}$. When the right-hand jaw is moved leftward during a quadding or a centering operation, a shoulder presented by the recessed portion of the jaw engages the lug $d^{19}$ and moves the pawl leftward so that it retains its relative position with respect to the line regardless of its final casting position. The entire pawl unit is moved leftward by the jaw $F^1$ being guided by the grooves $d^9$ and $d^{10}$ in which the side elements $d^7$ and $d^8$ of the outer U-shaped member slide.

Upon the arrival of the first elevator at the upper transfer level, the pawl $d^{11}$ again is tilted upwardly to move the depending tongue portions $d^{15}$ and $d^{16}$ clear of the matrix line to facilitate its transfer for distribution. For this purpose, the pawl member is formed with an extension $d^{20}$ at its left end, which terminates in an upwardly extending lip $d^{21}$ adapted to engage an overlying portion $d^{22}$ of a U-shaped bracket $d^{23}$ fixed to the standard $J^{18}$ forming part of the upper transfer guide (Figs. 26$^b$ and 34). A screw and slot connection $d^{24}$ and an adjustable set screw $d^{25}$ enable the bracket to be adjusted relatively to the standard to a position insuring that the depending tongue portions of the pawl will clear the matrix line when the pawl is tilted upwardly.

When a right-hand quadding or a centering operation has taken place, the lip $d^{21}$ on the pawl $d^{11}$ will stand at the left of the overlying bracket $d^{23}$ when the first elevator reaches the transfer level. Under such conditions, the pawl $d^{11}$ is dragged rightward by the matrix line as the latter is pushed along by the transfer finger J until the line reaches the right end of the elevator whereupon the pawl is cammed upwardly to its inactive position by the engagement of the lip $d^{21}$ with the bracket $d^{23}$, the lip and the bracket being formed with complementary bevelled surfaces $d^{26}$ and $d^{27}$ to facilitate the camming action.

It will be observed that the rearwardly extending lug $d^{19}$ at the right end of the pawl and which is engaged by the right-hand jaw during quadding, extends downwardly for a short distance beyond the matrix engaging edge of the tongue on which it is formed. This is to insure engagement of the pawl by the right-hand jaw when the first elevator is in the upper of the two positions.

The second elevator and its operation

The second elevator K is arranged to swing in a fore-and-aft vertical plane between a normal upper or line distributing level and a lower or line receiving level (Fig. 38). It includes a head portion $K^2$, carrying a V-shaped ribbed bar $K^3$, which supports the matrices by their teeth, and the aforementioned banking screws $J^{35}$ and $J^{44}$, the first of which operates the safety latch member $J^{20}$ for releasing the transfer carriage, and the second of which operates the slide member $J^{37}$ for controlling the arrest of the transfer carriage in its intermediate position to permit the ascent of the second elevator, all as previously described. In the instant machine, the second elevator head $K^2$ is positively maintained in a horizontal position at all times, being mounted for this purpose at the ends of a pair of parallel motion arms $K^4$ and $K^5$ (Fig. 38). The front arm $K^4$ is forked at the end to span a pair of spaced lugs $K^6$ depending from the elevator head, said lugs and forked portion being pivotally connected together by a horizontal pin $K^1$, which pin is the one previously referred to as extending to the left to cooperate with the lever $J^{26}$ by which the transfer carriage control valve $J^{11}$ is operated (Figs. 38 and 40). A pair of spaced collars $K^7$, secured to the pivot pin $K^1$ adjacent the inner faces of the depending lugs $K^6$, serve to prevent longitudinal movement of the pin $K^1$ with respect to the elevator arm $K^4$, so that the extended portion of the pin will always be located in a position to operate the lever $J^{26}$ when required. The elevator head is also formed with a rearwardly extending portion $K^8$ to which the other parallel arm $K^5$ is pivotally connected.

At the end remote from the elevator head $K^2$, the parallel arm $K^4$ is secured to a segment plate $K^9$, pivotally mounted on a bracket $K^{10}$ fixed to the machine frame, whereas the other parallel arm $K^5$ is pivotally mounted at the corresponding end to an arm $K^{11}$ extending upwardly from and formed integrally with the bracket $K^{10}$, these connections being such as to maintain the parallel relation of the arms throughout the swinging movement of the second elevator head between its upper and lower levels (Figs. 38 and 43).

The segment plate $K^9$ is formed in its front edge with a series of gear teeth $K^{12}$ meshing with a corresponding series of rack teeth $K^{13}$ formed on a piston rod $K^{14}$ arranged to reciprocate in a vertically disposed cylinder $K^{15}$ mounted on the fixed bracket $K^{10}$. The cylinder and piston mechanism is of the double-acting variety, being controlled from the same air valve $D^{62}$ which controls the cylinder and piston mechanism $D^{55}$ operating the first elevator. The cylinder $K^{15}$, at its upper end, is connected to the common valve $D^{62}$ by an air line $K^{16}$ and the other branch of the T-connection $D^{64}$ located between said valve $D^{62}$ and the upper end of the first elevator operating cylinder; whereas, at its lower end, it is connected to the valve $D^{62}$ by an air line $K^{17}$ in the other branch of the T-connection $D^{66}$ located between said valve and the lower end of the first elevator operating cylinder (see also Fig. 15). As in the case of the cylinder $D^{55}$, the cylinder $K^{15}$ normally will be charged with air pressure at its lower end and its upper end vented to the atmosphere, and under such conditions, the second elevator is maintained in its upper position at the distributing level. However, when the control valve $D^{62}$ is adjusted in the manner previously described by the arrival of the line delivery carriage in its leftmost position, the lower end of the cylinder $K^{15}$ is vented to the atmosphere and the upper end thereof charged with air pressure, with the result that the piston $K^{14}$ is caused to descend, moving the second elevator from its upper or distributing level down to the line transfer level, the power for the purpose being transmitted to the second elevator arms $K^4$ and $K^5$ through the interengaging gear teeth on the piston rod $K^{14}$ and the segment plate $K^9$. Later on, when the valve $D^{62}$ is operated by the arrival of the transfer carriage $J^1$ in its intermediate position (where, as will be recalled, it is momentarily brought to rest), the upper end of the cylinder $K^{15}$ is vented to the atmosphere and the lower end thereof charged with air pressure, with the result that the piston rod $K^{14}$ is caused to ascend and raise the second elevator to the distributing level. During the movement of the second elevator, the piston rod $K^{14}$ is held against the thrust of the segment plate by a half open bearing member $K^{18}$, presented by the fixed bracket $K^{10}$ and which engages the rod at the side thereof opposite said segment plate.

The movement of the second elevator between its upper and lower positions is very rapid and, for this reason, means are provided for cushioning it upon its arrival in both extreme positions. The cushioning means includes a double-acting dash pot consisting of a cylinder $K^{19}$, closed at both ends and having a piston $K^{20}$ which in length is about two thirds the length of the cylinder bore (Figs. 43 to 46). A horizontal passageway $K^{21}$, extending longitudinally through the piston, permits oil contained in the cylinder to flow from one end thereof to the other as the piston reciprocates back and forth. Midway of its length, the piston $K^{20}$ is provided with a valve comprising a cylindrical slide member $K^{22}$, vertically disposed and formed with a horizontal passageway $K^{23}$, which, when the slide member is in its uppermost position, registers completely with the passageway $K^{21}$ in the piston. The upper position of the slide member $K^{22}$ is determined by a headed screw $K^{24}$ threaded downwardly into the piston and located so that the head thereof engages a shoulder $K^{25}$ presented by the slide member, the latter being urged upwardly into engagement with the screw head by a compression spring $K^{26}$ seated in a recess formed in the slide member at its lower end and which reacts against the base of the recess wherein the slide member is contained. The piston $K^{20}$ is reciprocated by means of a lever $K^{27}$, fulcrumed adjacent its center on the cylinder supporting bracket $K^{10}$ and extending downwardly through an opening in the top of the cylinder to engage at its lower end in a vertical slot $K^{28}$ formed in the piston, the slot being of sufficient length to accommodate the arcuate path followed by the lower end of the lever as the piston is moved back and forth The vertical slot is flared at the top to provide clearance for the lever as the piston moves from one end of the cylinder to the other. A pin $K^{29}$, projecting laterally from the lever near its upper end, rides in an elongated slot $K^{30}$ formed near the front end of a fore-and-aft link $K^{31}$ which is pivotally connected at its rear end to an arm $K^{32}$ depending from and formed integrally with the segment plate $K^9$. At the center of the cylinder $K^{19}$, in a position overlying the vertical sliding valve member $K^{22}$, there is located a pair of plates $K^{33}$ and $K^{34}$ individually mounted on fixed spaced pivot pins and formed above their pivots with short arms $K^{35}$ interconnected by a tension spring $K^{36}$, which spring acts, in either extreme position of the piston, to hold the outer edges of the plates in contact with a pair of fixed stop pins $K^{37}$ located below the pivots (see Fig. 43).

According to this arrangement, the second elevator will move downwardly without restraint until it nears the line transfer level, when the front end of the slot $K^{30}$ in the link $K^{31}$ will engage the pin $K^{29}$ and rock the lever $K^{27}$ in a counterclockwise direction (as viewed in Fig. 43) to move the piston $K^{20}$ from the rear end of the cylinder to the front end thereof. As the piston moves, a lip $K^{38}$ formed at the top of the valve member $K^{22}$, and which normally stands above the lower edge of the adjacent plate $K^{33}$ when the piston is at the rear end of the cylinder, will engage said plate $K^{33}$ and turn it out of the way, but when the lip $K^{38}$ engages the lower edge of the other plate $K^{34}$, which is held against movement by its associated stop $K^{37}$, the valve member $K^{22}$ will be cammed downwardly, the lower edge of the plate $K^{34}$ being inclined for that purpose (Fig. 44). During the movement of the piston, the oil flows through the passageway $K^{21}$ from one end of the cylinder to the other but, as the valve member $K^{22}$ is cammed downwardly, that portion of the passageway $K^{23}$ therein, will be gradually moved out of full registry with the main passageway $K^{21}$ in the piston and thus increasingly retard the flow of oil, with the result that the movement of the second elevator is correspondingly retarded and the elevator allowed to come to rest in its lower or line transfer position gradually and without shock to the parts. When the piston $K^{20}$ reaches the end of said stroke, the lip $K^{38}$ on the valve member $K^{22}$ passes beyond the outer edge of the cam plate $K^{34}$ and allows said member to move up again under the action of its spring $K^{26}$, to open fully the passageway through the piston ready for its return stroke.

The dash pot device operates in a similar manner when the second elevator moves up to the distributing level. That is to say, the movement of the second elevator will be unrestrained until it nears the distributing level, when the rear end of the slot $K^{30}$ in the link $K^{31}$ will engage the pin $K^{29}$ and rock the lever $K^{27}$ in a clockwise direction to return the piston $K^{20}$ to its original rearward position. During the return movement of the piston, the previously active cam plate $K^{34}$ will be swung idly out of the way by the lip $K^{38}$, and the previously idle cam plate $K^{33}$ then brought into play to cam the valve member $K^{22}$ downwardly as before, it being noted that the lower edge of the plate $K^{33}$ is inclined in a direction opposite to that of the other plate $K^{34}$.

In order to insure that the second elevator will partake of its full range of movement and seat properly at the line transfer level, the slot $K^{30}$ in the link $K^{31}$ may be varied as to length, the means for the purpose including a slidable block $K^{39}$ which serves as an abutment for the pin $K^{29}$ at the outer end of the link $K^{31}$ and which can be adjusted with respect to the end of the link by a set screw $K^{40}$ passing through an integral portion of the link at its outer end and threaded into the block $K^{39}$. A locknut $K^{41}$ threaded on the set screw serves to maintain the proper adjustment.

It should also be added that, although the cylinder $K^{19}$ is open at the top for a portion of its length near the center to provide the necessary clearance for the operating lever $K^{27}$ and the cam plates $K^{33}$ and $K^{34}$, the oil cannot escape since the piston $K^{20}$ is enlarged at its opposite ends so as to make an oil tight fit with the cylinder walls. Two holes $K^{42}$, drilled one at each end of the cylinder in the top wall thereof, give access to the interior for replenishing the oil when necessary, the holes normally, however, being closed by cap screws $K^{43}$.

A tension spring $K^{44}$, connected at its lower end to an arm $K^{45}$ projecting forwardly from the front elevator arm $K^4$ and anchored at its upper end in the supporting frame, serves to counterbalance the weight of the second elevator parts.

The double-acting dash pot arrangement described above may also be used in connection with the first elevator to cushion the latter as it seats in the line receiving position and in the line transfer position.

*The distributor shifter and its operation*

The distributor mechanism includes, as usual, a distributor box M into which the matrices are pushed from the ribbed bar $K^3$ of the second elevator (Figs. 39 to 42). At its entrance end, it is equipped with a short ribbed bar M similar to that in the second elevator and with which the elevator bar $K^3$ registers when the elevator is at its upper or distributing level, the ribbed bar $M^1$ serving to guide the matrices into the distributor box. In the distributor box the matrices are supported and guided on a pair of rails (not shown) as they travel to the exit thereof, where they are fed one at a time to the customary distributor bar $M^2$ and moved therealong by the conveyor screws $M^3$ for distribution to the proper channels of the magazine. Likewise, as usual, there is provided a distributor shifter or pusher $M^4$ which transfers the matrices off the second elevator bar $K^3$ into the distributor box and maintains them under a follow-up pressure until all of them have been fed from the box. The instant machine differs from the commercial machine, however, in that the distributor shifter is operated by a double-acting cylinder and piston mechanism $M^5$ which, depending upon the manner in which the cylinder is charged, moves the distributor shifter to the left after one line of matrices has been distributed and to the right to push a new line of matrices into the distributor box for distribution.

As shown best in Figs. 40 and 41, the distributor shifter $M^4$ includes a slide portion $M^6$ formed with upwardly and downwardly projecting tongues $M^7$ guided in opposed vertically spaced grooves presented by a relatively long horizontal guiding member $M^8$ which supports the slide $M^6$ throughout its entire movement between its terminal positions. The shifter member $M^4$ further includes an arm $M^9$ depending from the slide $M^6$ and formed with an offset finger piece $M^{10}$, which latter conforms substantially to the shape of a matrix and is arranged to engage the endmost matrix hanging from the second elevator bar $K^3$.

The main portion of the slide $M^6$ is connected at the left end of a piston rod $M^{11}$ which reciprocates in the long horizontally disposed cylinder $M^5$ mounted on a fixed part of the machine (Figs. 39 and 40). The cylinder $M^5$ at its opposite ends is connected to a valve $M^{12}$ through pipe lines $M^{13}$ and $M^{14}$, the construction of the valve being such that depending upon its adjustment, one end or the other of the cylinder will be connected to a source of air pressure while the opposite end will be vented to the atmosphere. The valve $M^{12}$ is somewhat different from that associated with the other previously described double-acting pneumatic mechanism and is illustrated in detail in Fig. 47. It consists of a housing $M^{15}$ formed at one end with a passageway $M^{16}$, communicating with a pipe line $M^{17}$ leading to a source of air pressure, and formed at the opposite end with two passageways $M^{18}$ and $M^{19}$, the lower one $M^{18}$ communicating with the pipe line $M^{14}$ leading to the right end of the cylinder $M^5$, and the upper one $M^{19}$ communicating with the pipe line $M^{13}$ leading to the left end of said cylinder. Intermediate the two ends of the valve housing $M^{15}$, there is located a slide $M^{20}$ formed with three vertically spaced passageways $M^{21}$, $M^{22}$ and $M^{23}$, the upper one $M^{21}$ and the lower one $M^{22}$ communicating with the atmosphere, and the central one $M^{23}$ communicating with the passageway $M^{16}$ leading to the source of air pressure. When the slide $M^{20}$ is in its upper position, as shown in Fig. 47, the central passageway $M^{23}$ registers with the passageway $M^{19}$ connected to the pipe line $M^{13}$ leading to the left end of the cylinder $M^5$, whereas the lower passageway $M^{22}$ registers with the passageway $M^{18}$ connected with the pipe line $M^{14}$ leading to the right end of the cylinder. In other words, when the valve slide is adjusted to its upper position, as in Fig. 47, the cylinder $M^5$ will be charged at its left end and vented to the atmosphere at its right end. On the other hand, when the valve slide $M^{20}$ is in its lowermost position, the central passageway $M^{23}$ communicates with the passageway $M^{18}$ connected to the pipe line leading to the right end of the cylinder, whereas the upper passageway $M^{21}$ registers with the passageway $M^{19}$ connected with the pipe line leading to the left end of the cylinder. That is to say, under the second adjustment, the air conditions at the ends of the cylinder will be just the reverse of what they were before. The central passageway $M^{23}$ at its left end is enlarged so as to make connection with the high pressure pipe line $M^{17}$ under both conditions of valve adjustment.

The upper position of the valve slide $M^{20}$ is determined by a flange $M^{24}$ formed at the lower end of the slide and which engages the bottom face of the valve housing, whereas the lower position of adjustment is determined by a stop pin $M^{25}$ projecting laterally from an upwardly extending portion $M^{26}$ of the valve slide and which engages the top face of the valve housing.

The upwardly extending portion $M^{26}$ of the valve is pivotally connected at the right end of a horizontal arm $M^{27}$ constituting one arm of a four-arm lever $M^{28}$ and which extends toward the right from a fore-and-aft yoke piece likewise constituting part of said lever (Figs. 39, 40 and 41). The four-arm lever $M^{28}$ is fulcrummed at the opposite ends of its yoke portion on a hinge pin $M^{29}$ which, in turn, is supported at its opposite ends in spaced portions of a fixed bracket $M^{30}$. At the rear end of the yoke piece, the lever $M^{28}$ presents a second downwardly extending arm $M^{31}$, the lower end of which engages at the left of a rearwardly extending arm presented by a bell crank lever $M^{32}$. This lever $M^{32}$ is fulcrummed on a portion of the fixed bracket $M^{30}$ to swing in a horizontal plane and is formed with a second arm extending leftward to engage at the rear of a vertical pin $M^{33}$ projecting upwardly from the second elevator head.

When the second elevator is at the distributing level, the vertical pin $M^{33}$ thereon, through the medium of the bell crank lever $M^{32}$, locates the four-arm lever $M^{28}$ in a position such that the valve slide $M^{20}$ is adjusted to charge the cylinder $M^5$ at its left end and vent the right end thereof to the atmosphere. Assuming there are no matrices in the distributor box, all the parts, under the conditions described, will be located in their normal positions, the distributor shifter being in its extreme position at the right, which position is determined by a banking screw $m$ threaded through a portion of the bracket supporting the cylinder $M^5$ and against which the distributor shifter slide $M^6$ banks (Figs. 39, 40 and 41).

When the second elevator moves downwardly to the line receiving level, it frees the four-arm lever $M^{28}$, which thereupon is pulled in a clockwise direction (looking at the parts from the front), by a tension spring $M^{34}$, connected at one end to the depending arm $M^{31}$ thereof and anchored at its other end in a fixed part of the machine. As the lever $M^{28}$ is thus turned, the valve slide $M^{20}$ is moved downwardly to the position wherein the left end of the cylinder $M^5$ is vented to the atmosphere and the right end thereof charged, with the result that the distributor shifter pusher $M^4$ is moved leftward to the dotted line position shown in Fig. 40, where it stands clear of the second elevator head when the latter later moves upwardly with a line of matrices for distribution. The leftmost position of the distributor shifter is determined by a stop $M^{35}$ located near the left end of the guide $M^8$ and which is located in the path of a pin $M^{36}$ on the shifter slide. The stop $M^{35}$ is pivotally mounted at the top of the guide $M^8$ so that it can be swung up out of the way should it become necessary to move the distributor shifter beyond its leftmost position to facilitate the manual removal and replacement of matrices on the elevator bar in the event distributional difficulties arise. The stop $M^{35}$ is provided with a rearwardly extending pin $M^{37}$ adapted to rest on the top edge of the guide and thus locate the stop $M^{35}$ in a position wherein it presents a banking surface $M^{38}$ to arrest the slide when the pin $M^{36}$ engages it.

When the second elevator reaches the distributing level with a line of matrices for distribution, the pin $M^{33}$ thereon rocks the bell crank lever $M^{32}$, thereby turning the four-arm lever $M^{28}$ against the action of the spring $M^{34}$ to the normal position first referred to, i. e., that wherein the valve $M^{12}$ is adjusted to vent the right end of the cylinder $M^5$ to the atmosphere and charge the left end thereof with air pressure. As these conditions are established, the distributor shifter $M^{10}$ moves toward the right, pushing the matrices off the second elevator bar $K^3$ and into the distributor box M for distribution in the usual way.

At this point, it should be stated that the depending arm $M^{31}$ of the four-arm lever $M^{28}$ presents a banking screw $M^{39}$ where it engages the bell crank lever $M^{32}$, providing an adjustment to insure that the valve slide $M^{20}$ will be properly located when the second elevator is at the distributing level.

Additional safety devices

Because the second elevator and the distributor shifter are operated from independent power sources with no inter-dependent timing devices, certain safety devices have been provided to prevent collision between the parts during their operation. Thus, while the distributor shifter is in the act of pushing the matrices off the ribbed bar $K^3$, it would be quite possible for the second elevator operating mechanism to be conditioned for moving the second elevator down to the line transfer level. In order to delay such movement until the distributor shifter in its travel toward the right clears the second elevator there is provided a latch member $M^{40}$ overlying the second elevator head and formed with a nose portion $M^{41}$ adapted to engage the front edge thereof (Figs. 41 and 42). So long as the latch is active, it will prevent any movement of the second elevator downward from the distributing level. The latch member $M^{40}$ is pivotally mounted at its rear end on a pivot pin $M^{42}$ supported in the fixed bracket $M^{30}$, and near its front end, the latch member is yoked to an arm $M^{43}$ parallel to it and likewise mounted on the pivot pin $M^{42}$. The second arm is formed at the front with a laterally extending horizontal rail $M^{44}$, located at the front of the distributor box M and extending from one end thereof to the other (Figs. 40 and 42). In any position of the distributor shifter to the left of the distributor box, where it would interfere or be likely to interfere with the descent of the second elevator, the latch $M^{40}$ remains in its active position. However, as soon as the distributor shifter clears the second elevator in its movement toward the right, an anti-friction roller $M^{45}$, mounted on the depending arm $M^9$ of the distributor shifter, engages a bevelled surface $M^{46}$ at the left end of the rail $M^{44}$ and cams the latch member $M^{40}$ up out of the way, thus releasing the second elevator for downward movement. As the distributor shifter $M^4$ continues its movement toward the right, the anti-friction roller $M^{45}$ rides along the lower edge of the rail $M^{44}$, which is made long enough and so located as to maintain the latch member inactive in any position of the distributor shifter to the right of the second elevator head.

Under normal operating conditions, when the second elevator descends and the distributor shifter moves toward the left, the latch member $M^{40}$ drops by gravity into engagement with a fixed lug or stop $M^{47}$ underlying the right arm $M^{43}$ thereof (Fig. 42), said lug acting to hold the latch member in a position to be cammed up out of the way by the second elevator when the latter again ascends to the distributing level. To facilitate this camming action, the latch member $M^{40}$ is bevelled at its front end to cooperate with a surface $M^{48}$ at the top of the second elevator and which is inclined forwardly and upwardly (Fig. 41). The latch member slides up the inclined surface as the second elevator nears its topmost position, dropping down into its active position in engagement with the front edge of the elevator as the latter comes to rest at the distributing level.

A second safety device acts to delay the movement of the distributor shifter toward the left until the second elevator has had time to move downwardly out of its way. This mechanism (see Figs. 39, 40 and 41) includes a pawl $M^{49}$, formed at its upper end with a nose portion $M^{50}$ adapted in its normal position to overlie the upper edge of a third arm $M^{51}$ of the four-arm lever $M^{28}$ (which lever, as will be recalled, adjusts the air valve $M^{12}$ controlling the cylinder and piston mechanism operating the distributor shifter). The arm $M^{51}$ is formed at the front end of the lever yoke portion and extends toward the left from the fulcrum. The pawl $M^{49}$ engages the arm at its left end. The pawl $M^{49}$ is yoked to a forwardly extending arm $M^{52}$ spaced laterally from it, the pawl and arm forming a unit pivotally mounted on a transverse pivot pin $M^{53}$ mounted in a bracket secured to and extending forwardly from the distributor guide $M^6$. A spring $M^{54}$, pulling downwardly on the pawl unit, acts to hold it in its active position to prevent the four-arm lever from adjusting the valve $M^{12}$ to charge the cylinder $M^5$ at its right end. Thus, while the initial movement of the second elevator head downward from the distributing level will release the four-arm lever for operation insofar as the lever $M^{32}$ and the pin $M^{33}$ are concerned, the operation of the lever cannot take place until the second elevator has moved to the dotted line position shown in Fig. 41, wherein it will be located out of the path of the distributor shifter so as not to interfere with the movement thereof. When the second elevator arrives in the dotted line position shown, an inclined surface $M^{55}$, formed at the bottom of a slot in the second elevator head, engages the forwardly extending arm $M^{52}$ at its front end and cams the pawl $M^{49}$ out of the way, thereby releasing the four-arm lever $M^{28}$ for operation.

When the four-arm lever is thus released by the pawl $M^{49}$, another safety device, presently to be described, may be active to prevent its full valve adjusting movement. It will, however, turn slightly to present itself in front of the nose portion $M^{50}$ on the pawl so as to prevent the latter from returning to its active position until the four-arm lever is fully restored. Of course, when the other safety device mentioned is inactive (or, if active, later on when it becomes inactive), the four-arm lever $M^{28}$ will undergo its full range of movement, thereby adjusting the valve $M^{12}$ in a manner so as to charge the cylinder $M^5$ for moving the distributor shifter toward the left.

So long as the four-arm lever $M^{28}$ is adjusted to charge the cylinder $M^5$ at the right, the arm $M^{51}$ thereof will stand in front of the nose portion $M^{50}$ of the pawl $M^{49}$, thereby preventing the latter from swinging forwardly and allowing the forwardly extending arm $M^{52}$ of the pawl unit to drop below the upper surface of the elevator head as the latter again moves upwardly to the distributor level. In other words, were nothing provided to limit the forward movement of the pawl unit, the arm $M^{52}$ would turn so far that the return movement of the second elevator would be prevented altogether. Incidentally, the front end of the arm $M^{52}$ is formed so that it can readily be cammed upwardly by the elevator upon its ascent to the distributing level, the accompanying movement of the pawl $M^{49}$, however, being an idle one. Of course, when the second elevator seats at the distributing level, the four-arm lever $M^{28}$ will return to its original position permitting the nose portion $M^{50}$ of the pawl $M^{49}$ again to move to its active position, i. e., in engagement with the upper surface of the arm $M^{51}$.

The other safety device referred to in passing is designed to delay the leftward movement of the distributor shifter until the last matrix in the line has been distributed. Referring to Figs. 39, 40 and 41, it will be observed that there is a vertically disposed finger element or pawl $M^{56}$ pivotally mounted adjacent its center on a bracket secured at the right end of the distributor slide guide. Normally, that is, when the distributor shifter $M^4$ is in its rightmost position (which assumes that there are no undistributed matrices in the distributor box), a lug $M^{57}$ presented at the top of the distributor shifter slide $M^6$ engages a banking pin $M^{58}$ threaded through the pawl near the lower end and locates it (against gravity) in a position wherein its upper end is in registry with a notch $M^{59}$ formed in the lower edge of an overlying long rightwardly extending arm $M^{60}$ constituting the fourth arm of the four-arm lever $M^{28}$, the notch being located near the right end of the arm. Under such conditions, the operation of the four-arm lever $M^{28}$ is permitted upon its release for operation by the descending movement of the second elevator and by the movement of the pawl $M^{49}$ to its inactive position, since the pawl $M^{56}$ will present no obstacle to the movement of the lever, merely entering the notch $M^{59}$ as the lever $M^{28}$ is rocked to adjust the valve $M^{12}$ (Figs. 39 and 40). However, in the event there remains in the distributor box M one or more undistributed matrices, the pawl $M^{56}$ will be located by gravity in its active position and engage the lower edge of the lever arm $M^{60}$ beyond or at the right of the notch $M^{59}$, so as thus to prevent the operation of the four-arm lever $M^{28}$ even though it has been released by the pawl $M^{49}$. The active position of the pawl $M^{56}$ is determined by a stop $M^{61}$ which is engaged by the right edge of the pawl above its pivotal mounting. However, as soon as the last matrix passes from the distributor box, the pawl $M^{56}$ will be engaged by the lug $M^{57}$ on the distributor slide $M^6$ and rocked into registry with the notch $M^{59}$, thereby freeing the four-arm lever $M^{28}$ for its valve adjusting movement. Attention is directed to the fact that there is sufficient clearance between the upper end of the pawl $M^{56}$ and the lower edge of the lever arm $M^{60}$ beyond the notch $M^{59}$, to permit the leftwardly extending arm $M^{51}$ of the four-arm lever to move upwardly in front of the nose portion of the pawl $M^{49}$ and thus impede the return of the latter to its active position, once it has been released as has previously been described. The banking pin $M^{58}$ at the lower end of the pawl $M^{56}$ is adjustable to insure the entry of the pawl into the notch $M^{59}$ when the distributor shifter is in its rightmost position.

The last safety measure to be described includes a device for delaying the full return of the second elevator to the distributing level until the distributor shifter is in its leftmost position ready to transfer the matrices off the second elevator bar into the distributor box. As best shown in Figs. 39, 40 and 41, the device comprises a stop $M^{62}$ consisting of two laterally spaced arms, integrally connected by a yoke element, and pivotally mounted on a transverse pivot pin $M^{63}$ passing through both said arms and also through the two spaced elements of the bracket which supports the pawl unit $M^{49}$. The arm at the right is located adjacent the forwardly extending arm $M^{52}$ of the pawl unit and is in alignment with the notch presenting the inclined surface $M^{55}$ with which the arm $M^{52}$ cooperates. The spring $M^{54}$, which rocks the pawl $M^{49}$ to its active position, is connected at its lower end to the stop $M^{62}$ aft of its pivotal mounting and tends normally to hold the stop in a position with its front end standing below the top surface of the second elevator head. No interference is presented by the stop to the downward movement of the second elevator since, as the elevator travels past the stop, the inclined surface $M^{55}$ in the registering notch engages the stop at its front end and idly cams it out of the way. However, the stop immediately snaps back to its normal position under the action of the spring $M^{54}$ so that the front end thereof will stand in the path of the second elevator and arrest its return to the distributing level so long as the distributor shifter is in any position other than at the extreme left. In other words, after the second elevator has descended to the line transfer level, it cannot again seat at the distributing level with a new line until the distributor shifter has had time to push all the matrices of the preceding line out of the distributor box and to move to its leftmost position ready to push the new line off the second elevator bar. It will be noted from Fig. 41 that the second elevator head, at the rear edge of the inclined surface $M^{55}$, is formed with a second surface $M^{64}$ inclined in the opposite direction and which is arranged to abut squarely against the end of the stop $M^{62}$ so that there will be no tendency for the second elevator to turn the stop to an inoperative position.

As has been stated, the stop $M^{62}$ remains active until the distributor shifter arrives in its leftmost position, that is, the dotted line position shown in Fig. 40. Upon its arrival in said position, however, a lug $M^{65}$, projecting forwardly from the depending arm $M^9$ of the distributor shifter and which is formed with a bevelled surface for the purpose, engages the stop $M^{62}$ at its rear end, camming it in a direction to lift the front end thereof out of the path of the second elevator, thus permitting the latter to continue its upward movement to the distributing level, when, of course, the distributor shifter will operate to push the matrices off the distributor bar $K^3$ and into the distributor box.

The pneumatic system and its operation

The pneumatic system is such that, once the operator has inaugurated the delivery of a line from the assembler to the first elevator, all of the various functions of the machine are performed automatically, each individual pneumatically operated part cooperating to initiate the succeeding operation to be performed, so that there is continuity throughout the operation of the machine from the time the line is composed to the time the matrices and spacebands are returned to their respective magazines.

With the general constructional details already explained, it is thought that a clear picture of the pneumatic system will be obtained from a study of the diagrammatic views of Figs. 48 to 50. When the operator has completed the composition of a line of matrices and spacebands, he inaugurates the delivery of the line to the first elevator by depressing momentarily the light touch finger key $B^{38}$. Two operations result from the manual depression of the finger key: First, the left-hand finger $B^1$ is moved toward the right to a position wherein it will directly overlie the line resistant. Second, the right-hand finger $B^2$, which normally is biased to move rightward by the cylinder and piston mechanism $B^{18}$, is released for a slight movement toward the right. Both of these operations are controlled from the common valve $B^{33}$ which is adjusted by the slide $B^{35}$ as the operator depresses the finger key. The first operation is brought about by the charging of the cylinder $B^{30}$ which, through its associated lever $B^{20}$, positions the left-hand finger in the manner stated. The second operation is effected by the charging of the cylinder $B^{45}$ which, through the bell crank lever $B^{44}$, renders the interponent $B^{42}$ inactive, the interponent, as will be recalled, normally spacing the right-hand finger slightly to the left of its normal rightmost position. While the operation of the common valve $B^{33}$ acts simultaneously to charge both the cylinders $B^{30}$ and $B^{45}$, a restraining influence is imposed upon the lever $B^{44}$ by the lever $B^{48}$, requiring a higher pressure to be built up in the cylinder $B^{45}$ before it will act to render the interponent $B^{42}$ inactive, so as thus to enable the left-hand finger to assume its position above the line resistant before the next operation (initiated by the slight movement of the right-hand finger toward the right) is permitted.

The next operation in sequence is the lowering of the two fingers $B^1$ and $B^2$ to embrace the opposite ends of the composed line, the descent of the left-hand finger serving to depress the line resistant which, in its depressed position, automatically swings out of the way to permit the composed line to be delivered leftward to the first elevator. The descent of the fingers $B^1$ and $B^2$, which are suspended from the long bail bar $B^{17}$, is effected by a downward rocking movement of the three-arm lever $B^{55}$ actuated by the cylinder and piston mechanism $B^{59}$. The mechanism $B^{59}$ is controlled from the valve $B^{62}$ which, through the medium of the horizontal slide $B^{66}$, actuated by the line delivery carriage slide $B^3$ as it imparts the slight rightward movement to the right-hand finger, is adjusted to charge the cylinder $B^{59}$ at its rear end and vent it to the atmosphere at its front end. The result is that the three-arm lever $B^{55}$ is rocked in a direction to depress the bail $B^{17}$ and lower the fingers into engagement with the opposite ends of the composed line.

The double-acting cylinder and piston mechanism $B^{18}$ operating the line delivery carriage, is controlled from the valve $B^{82}$ which normally is adjusted to charge the cylinder at its left end, thus urging the line delivery carriage slide $B^3$ toward the right. It is because of this normal setting of the valve $B^{82}$ that the carriage slide will partake of its initial movement toward the right to properly position the right-hand finger when the interponent $B^{42}$ is rendered inactive. However, when the fingers of the line delivery carriage reach their lower or line embracing position, a finger $B^{76}$ at the lower end of the three-arm lever $B^{55}$ will adjust the valve $B^{82}$ to reverse the charge in the cylinder $B^{18}$, i. e., to charge the cylinder $B^{18}$ at its right end instead of at its left end, with the result that the line delivery carriage as a whole is moved toward the left, carrying the line with it into the first elevator.

In the meantime, the valve $B^{33}$ (which was instrumental in charging the cylinders $B^{30}$ and $B^{45}$ to position the left-hand finger $B^1$ above the line resistant and to render the interponent $B^{42}$ inactive) is restored to its normal position of adjustment, being restored to such position by the lever $B^{44}$ as the latter completes its initial movement to render the interponent $B^{42}$ inactive. When the valve $B^{33}$ is thus restored to its initial adjustment, the cylinders $B^{30}$ and $B^{45}$ will be conditioned to permit the devices controlled thereby to be restored to their normal positions as the line delivery carriage is moved toward the left with the composed line.

When the line delivery carriage has located the composed line in the first elevator, i. e., upon the completion of its leftward movement, it controls mechanism whereby four operations are performed: First, it restores the slide $B^{66}$ to its initial position by moving the same a slight distance toward the left, the slide $B^{66}$ in turn adjusting the valve $B^{62}$ to reverse the charge in the cylinder $B^{59}$, which thereupon operates the lever $B^{55}$ to raise the fingers $B^1$ and $B^2$ clear of the composed line; and, as the fingers reach their upper position, the other finger $B^{77}$ at the bottom of the lever $B^{55}$ adjusts the valve $B^{82}$ to reverse the charge in the cylinder $B^{18}$. In other words, the cylinder $B^{18}$ is now charged at its left end, instead of at the right end, with the result that the line delivery carriage is restored to its normal position ready for the next line. The other three operations include the raising of the first elevator to bring the composed line to the casting level, the lowering of the second elevator from the distributing level down to the upper transfer level, and the raising of the right-hand jaw to its line clamping position, as previously described.

As will be recalled, the first elevator and the second elevator are actuated by the cylinder and piston devices $D^{55}$ and $K^{15}$, respectively, both of which are normally charged with air pressure at their lower ends under the control of the common valve $D^{62}$. Upon the arrival of the line delivery carriage in its leftmost position, it moves the slide $D^{72}$ through a limited distance toward the left and rocks the lever $D^{70}$ in a direction to cause its integrally connected arm $D^{68}$ to adjust the valve $D^{62}$ to a position wherein the first elevator cylinder $D^{55}$ and the second elevator cylinder $K^{15}$ are both charged at the top and vented to the atmosphere at the bottom. The result is that the first elevator is moved upwardly to locate the composed line at the casting level and the second elevator moved downwardly to the upper transfer level.

The cylinder and piston mechanism $F^{10}$ for the right-hand jaw is controlled by the valve $F^{13}$ which is adjusted normally to charge the cylinder at the top so that the jaw will be located in its lowermost position. However, as the slide $D^{72}$ is moved leftward by the line delivery carriage, the valve $F^{13}$ is adjusted to charge the cylinder at its lower end and vent it to the atmosphere at its upper end. The intermediate connections for this purpose, as will be recalled, include the lever $F^{20}$, the link $F^{33}$, the lever $F^{35}$ and the swivel member $F^{30}$, all of which are interconnected to perform the function just mentioned. When the cylinder $F^{10}$ is charged at the bottom, the jaw $F^1$ is moved upwardly to its line clamping position and as it approaches that position (by means of the cooperating arms mounted, one on the jaw slide $F^3$, and the other at the top of the shaft $F^{35}$), the shaft $F^{35}$ is rotated and, through the arm $F^{36}$ at its lower end, operates the clutch which inaugurates the casting cycle.

The jaw $F^1$ remains in its raised or line clamping position until the slug has been cast, at which time the cam $F^{37}$ acts, through the swivel member $F^{30}$, to adjust the valve $F^{13}$ to its initial setting, according to which the cylinder $F^{10}$ is vented at the bottom and charged at the top, with the result that the right-hand jaw is caused to descend to its normal or lower position. As the swivel plate $F^{30}$ operates to restore the valve $F^{13}$ to its original setting, it also acts to restore the slide $D^{72}$ rightward to its normal position. Such adjustment of the slide $D^{72}$, however, has no effect upon the setting of the common valve $D^{62}$ controlling the first and second elevators.

Although the first elevator is arrested after an initial slight upward movement to locate the line at the casting level, the cylinder $D^{55}$ remains charged at the top, so that, when the first elevator is released after the slug casting operation, it will move upwardly to the upper transfer level.

The cylinder and piston mechanism $J^{10}$ for the upper transfer carriage $J^1$ is controlled from the valve $J^{11}$ which is normally set to charge the cylinder at its right end, thus maintaining the transfer carriage in its extreme leftward position with the finger J standing to the left of the composed line when the latter is raised to the upper transfer level by the first elevator. The transfer carriage is also positively held in its leftmost position by the two latches or pawls $J^{16}$ and $J^{20}$, the pawl $J^{16}$ being the one rendered inactive by the first elevator, and the pawl $J^{20}$ the one rendered inactive by the second elevator, as said elevators respectively arrive at the transfer level.

Normally, the second elevator will arrive at the transfer level in advance of the first elevator and, as it nears the bottom of its travel, the pin $K^1$ thereon rocks the lever $J^{26}$ which, in turn, through the small bell crank lever $J^{31}$, rocks the three-arm plate $J^{33}$ to the position wherein the valve $J^{11}$ is adjusted to vent the cylinder $J^{10}$ at its right end and charge the same at its left end. Assuming now that both latch members $J^{16}$ and $J^{20}$ are rendered inactive by the arrival of the respective elevators at the transfer level, the transfer carriage $J^1$ is moved toward the right, the finger $J^2$ pushing the composed line before it out of the first elevator, the matrices in the line being pushed on to the ribbed bar $K^3$ of the second elevator.

At the time the valve $D^{62}$ (controlling the operation of the first and second elevators) was set by the lever $D^{70}$ to charge the cylinders $D^{55}$ and $K^{15}$ at the top, said lever, through the intermediate link $J^{41}$ and the short lever $J^{40}$ also acted to position the slide $J^{37}$ in its leftmost position. It will also be recalled that, when the second elevator arrived at the transfer level, said slide was rocked to a position wherein a shoulder $J^{45}$ thereon was interposed in the path of the transfer slide $J^1$. Now, when the slide $J^1$ arrives in its intermediate position (when the matrices have been pushed onto the ribbed bar $K^3$), the transfer slide engages the shoulder $J^{45}$ and pushes the slide $J^{37}$ to its rightmost position, thus adjusting the plate $J^{33}$ for a neutral setting of the valve $J^{11}$. In other words, air is cut off from both ends of the cylinder $J^{10}$ with the result that the transfer slide, for the time being, remains stationary. The rightward movement of the slide $J^{37}$, through its connections with the lever $D^{70}$, also acts to restore the valve $D^{62}$ to its original setting and charge the cylinders $D^{55}$ and $K^{15}$ at the bottom, causing the first elevator to be moved downwardly to its lowermost or line receiving position and the second elevator to be moved upwardly to the distributing level.

As the second elevator starts its upward movement, the pin $K^1$ thereon again rocks the lever $J^{26}$ (which was also restored to an intermediate or neutral setting along with the valve $J^{11}$) to a position wherein the valve $J^{11}$ is set to charge the cylinder $J^{10}$ at its left end. Thereupon, the transfer slide continues its movement toward the right, pushing the space bands before it so that they may be grasped by the spaceband pawl and returned to the spaceband magazine. As the transfer slide reaches its extreme position at the right, it rocks the lever $J^{57}$ which, as will be recalled, actuates the supplementary valve $J^{52}$ to charge the supplementary cylinder and piston device, the piston of which is raised thereby to rotate the plate $J^{33}$ back to its original position in which the valve $J^{11}$ permits the flow of air to the right end of the cylinder $J^{10}$. As a result, the transfer slide is returned to its original left-most position. The supplementary valve and cylinder devices are restored to their initial settings by means within themselves.

The double-acting cylinder and piston device $M^5$ for the distributor shifter is controlled from the valve $M^{12}$ which is normally set to charge the cylinder $M^5$ at its left end and vent it at its right end, so that the distributor shifter will be urged toward the right. The corresponding normal position for the second elevator is at the distributing level where, through the medium of the small bell crank lever $M^{32}$ and the four-arm lever $M^{28}$, the valve $M^{12}$ is adjusted to charge the cylinder $M^5$ in the manner stated. Upon the descent of the second elevator, however, the four-arm lever is freed, whereupon it is rocked by the tension spring $M^{34}$ in a direction to adjust the valve $M^{12}$ to charge the cylinder $M^5$ at its right end and vent it at the left, with the result that the distributor shifter is moved from the solid line position shown in Fig. 50 to the dotted line position shown therein, in which latter position it will stand at the left ready, when the second elevator again arrives at the distributing level, to push the line of matrices off the ribbed bar $K^3$ into the distributor box M. When the second elevator does arrive at the distributor level, it rocks the four-arm lever back to its original setting and adjusts the valve $M^{12}$ to charge the cylinder $M^5$ at the left and vent it at the right, thus moving the distributor shifter toward the right for the purpose just stated.

While there are four safety or timing devices, acting to regulate the relative movements of the second elevator and the distributor shifter in order to eliminate the danger of collision between the parts, only two of them act through the pneumatic system, namely, the pawl $M^{49}$, which serves to delay the operation of the four-arm lever $M^{28}$ until the second elevator has moved forwardly clear of the path of the distributor shifter, and also the pawl $M^{56}$, which likewise serves to delay the operation of the four-arm lever $M^{28}$ until the last matrix in the line has been fed from the distributor box.

In the diagrammatic illustrations, thin lines indicate the pipe line connections between the various cylinder and piston devices and their respective control valves, arrows having been associated with certain of the lines to indicate the direction of air flow when the parts are in their normal positions.

Power drive

The power drive of the improved machine is best illustrated in Figs. 51, 52 and 53. It includes a high speed motor driven shaft Q located at the rear of the machine and geared to a clutch element $Q^1$ rotatably mounted near one end of a countershaft $Q^2$ which is journalled at its opposite ends in brackets fixed on the machine frame. At the end opposite the clutch, the countershaft is formed with an enlarged portion $Q^3$ presenting a worm $Q^4$ arranged to cooperate with a worm wheel $Q^5$ splined to a fore-and-aft shaft $Q^6$ constituting the cam shaft of the machine. Between the clutch and the enlarged portion of the countershaft, there are mounted a collar $Q^7$ pivotally supporting a series of dogs $Q^8$, a cone $Q^9$ cooperating with the dogs, and a compression spring $Q^{10}$ reacting between the cone and the enlarged portion of the shaft. When the spring $Q^{10}$ is free to act, it forces the cone in a direction to spread or rotate the dogs, which because of their shape, act to cam the clutch plates together (the clutch being of the multiple plate type) and thus effect a driving connection between the drive shaft Q and the counter shaft $Q^2$.

Normally, however, i. e., when the machine is at rest, the clutch is held disengaged by means including a lever $Q^{11}$ fulcrummed near its center and which is forked at its lower end, the forked portions presenting diametrically opposed pins $Q^{12}$ extending into an annular groove $Q^{13}$ formed in the cone. The means holding the clutch disengaged also includes a pin $Q^{14}$ projecting forwardly from the worm wheel $Q^5$ and so located therein that when the worm wheel is in the position shown in Fig. 53, it presses against the upper end of the lever $Q^{11}$, thereby holding the lever and consequently the cone $Q^9$, against the reaction of the spring $Q^{10}$, in a position to maintain the clutch disengaged.

The lever $Q^{11}$ is formed in two parts pivotally connected together for relative movement in a fore-and-aft direction only, the upper part $Q^{15}$, namely, the part which reacts against the pin $Q^{14}$, being arranged to engage at its upper edge in a groove $Q^{16}$ presented by a collar $Q^{17}$ fixed at the rear end of the fore-and-aft clutch control rod $G^2$. Now, when the clutch control rod is actuated forwardly by the upward movement of the right-hand jaw to start the machine cycle, it pulls the upper portion $Q^{15}$ of the lever $Q^{11}$ out of the path of the pin $Q^{14}$ thereby rendering the spring $Q^{10}$ free to act. The spring $Q^{10}$ effects the engagement of the clutch and inaugurates the machine cycle.

It will be recalled that the clutch control rod $G^2$ is returned to its normal position at once, with the result that the upper portion $Q^{15}$ of the lever $Q^{11}$ is restored into the path of the pin $Q^{14}$ on the worm wheel. Consequently, as the pin $Q^{14}$ arrives adjacent the lever, upon the completion of one revolution of the cam shaft $Q^6$, it cams the lever to a position wherein the clutch is disengaged, thus stopping the machine. Attention is directed to the fact that the upper edge of the lever portion $Q^{15}$ is sufficiently long to maintain its engagement in the notch $Q^{16}$ regardless of the angular position of the lever and also that said edge is curved to a radius that will prevent binding in the notch as the lever is turned from one position to another.

Mechanism is also provided for stopping the machine at any phase of the machine cycle. To this end, the collar $Q^{17}$ on the clutch control rod $G^2$ and the clutch lever $Q^{11}$ are formed respectively with projecting arms $Q^{18}$ and $Q^{19}$ connected together by means of a link $Q^{20}$. Near its front end, the clutch control rod $G^2$ is provided with a laterally extending arm $Q^{21}$ formed at its end with a slot $Q^{22}$ to receive a pin $Q^{23}$ extending rearwardly from a second arm $Q^{24}$ mounted at the rear end of a short fore-and-aft shaft $Q^{25}$ which extends to the front of the machine, the latter shaft being equipped at its front end with a handle $Q^{26}$ located so as to be within the convenient reach of the operator. To stop the machine, the operator turns the handle $Q^{26}$ in a counterclockwise direction with the result that the clutch is disengaged through the connections just described. A pawl (not shown) serves to maintain the adjusted position of the handle $Q^{26}$, the pawl being moved manually to an inoperative position to release the arm when it is desired to continue the machine cycle of operation.

The cam and timing elements

In order to understand the operation of those parts of the new machine forming the subject matter of the instant application, it seems desirable to show and describe in a general way the layout of the cams and timing elements which control the various organs of the complete machine.

The cam shaft mechanism has been illustrated somewhat diagrammatically in Fig. 51, the cams being labeled for ready reference, to indicate the functions they perform.

Partly for manufacturing expediency, and partly for simplicity in design, the cam shaft mechanism has been made in three units. One unit includes a gang of cams mounted on what may be termed the main cam shaft $Q^6$, i. e., the shaft on which the worm wheel $Q^5$ is mounted. A second gang of cams is mounted on a shaft $Q^{27}$ located directly below the main cam shaft and parallel with it. This shaft is supported at its ends in fixed parts of the machine and is driven from the main cam shaft through a gear train consisting of a pair of gears $Q^{28}$ and $Q^{29}$ mounted one on each shaft with an intermediate connecting pinion $Q^{30}$, the gear train being such that the lower shaft rotates once for each rotation of the main cam shaft and in the same direction.

The third cam unit includes a gang of cams mounted on a fore-and-aft shaft $Q^{31}$ journalled in the swinging vise frame. This shaft is driven from the cam shaft $Q^{27}$ at the same speed of rotation. The means for driving the cam shaft $Q^{31}$ includes a short fore-and-aft countershaft $Q^{32}$ formed at its rear end with a gear meshing with the gear $Q^{29}$ on the cam shaft $Q^{27}$ and formed at its front end with a similar gear meshing with a gear $Q^{33}$ rotatably mounted on a short bearing rod (not shown) presented by a fixed part of the machine and arranged coaxially with the cam shaft $Q^{31}$ in the vise frame. The driving connection between the gear $Q^{33}$ and the cam shaft $Q^{31}$ includes a pin $Q^{34}$ projecting forwardly from said gear and adapted when the vise frame is closed to engage in a notch $Q^{35}$ presented by a plate $Q^{36}$ formed at the rear end of said cam shaft. The arrangement is such that the driving connection is readily broken when the vise frame is swung open and readily established when the vise frame is closed. Furthermore, since closing the vise frame requires registry between the pin $Q^{34}$ and the notch $Q^{35}$, all three cam shafts will operate in proper timed relation.

A definite arrangement has been followed in allocating the cams to the different cam shafts. Thus, on the main shaft $Q^6$, which is somewhat heavier than the others, there have been mounted all those cams whose function it is to transmit power in the operation of the parts. On the shaft $Q^{27}$ underlying the main cam shaft, there are mounted those cams which operate air valves controlling different casting functions. On the shaft $Q^{31}$ supported in the vise frame, there are mounted the cams which control the various operations performed upon the matrix line preparatory to casting.

Copending application Serial No. 355,434 discloses and claims one portion of the casting mechanism of the new machine. It describes how the mold is supported in a holder at the front end of a fore-and-aft hollow rock shaft which is arranged to swing the mold, preparatory to casting, from a normal vertical slug ejecting position to a horizontal casting position and, after casting, back to its normal position to permit ejection of the slug to take place. During the upward swinging movement of the mold, the rock shaft is actuated directly by the "mold turning cam" on the main cam shaft. A pneumatic cylinder and piston device controlled from the "mold turning air valve cam" mounted on the lower cam shaft $Q^{27}$ effects the rotation of the rock shaft to restore the mold to normal position. When the mold is in its horizontal position, a forward movement of the rock shaft carries the mold into engagement with the matrix line for the casting operation, the rock shaft thereafter being moved rearwardly to permit the downward swinging movement of the mold to take place. The fore-and-aft movements of the rock shaft are effected through a lever connection actuated by two face cams presenting, between them, a cam slot or guideway $Q^{37}$ in which the lever tracks at its lower end. In Fig. 51, this duplex cam has been labeled the "Mold slide cam."

When the mold is restored to its normal or vertical position after casting has taken place, the slug is ejected. The ejector is pneumatically operated upon its active stroke, the pneumatic mechanism being controlled by the "ejector air valve cam" mounted on the lower cam shaft $Q^{27}$. The ejector movement, however, is controlled from the "ejector cam" on the main cam shaft, which cam, incidentally, positively restores the ejector to its normal position.

The "mold wiper cam" operates mechanism which drags a pair of wiper elements along the mold slot as the mold is swung up to casting position. The wiper elements act one adjacent the front face and the other adjacent the rear face of the mold, thus insuring that the mold faces are free of metal particles which might interfere with the lockup.

The metal pot and pump plunger devices are disclosed and claimed in part in copending application Serial No. 269,833. As set forth therein, the metal pot is mounted on rollers and is arranged to be moved forwardly to register its mouthpiece with the mold slot during the casting operation. The metal pot is moved forwardly and rearwardly through the medium of a toggle device actuated from the main cam shaft of the machine, the connections for the purpose including a lever, one end of which tracks in a guideway $Q^{38}$ presented between two face cams bearing the label "Pot slide cam" and which are fixed on the main shaft. The toggle arrangement provides ample lockup pressure for the casting operation.

The pump plunger is pneumatically operated, a vertically arranged double-acting cylinder and piston device being provided which, when charged at the top, causes the descent of the pump plunger and, when charged at the bottom, causes its ascent. The charging of the pneumatic mechanism is controlled by the "pot pump air valve cam" mounted on the lower cam shaft $Q^{27}$. The pump plunger reciprocates downwardly and upwardly in a cylindrical chamber formed within the metal pot and which communicates with the pot chamber itself through an aperture which is opened or uncovered, when the plunger is in its raised or normal position, to permit the metal within the cylinder to be replenished from the supply in the pot chamber. The cylinder and piston mechanism operating the pump plunger is charged at its upper end somewhat prior to the casting operation. When the mechanism is thus charged, it causes the piston to descend, under the control of the "pot piston advance cam" mounted on the main cam shaft, until the piston closes the aperture in the cylindrical chamber, thereby trapping the metal directly beneath it. Thereupon, the descent of the piston is momentarily arrested by a stop, although the pressure in the pneumatic mechanism continues to build up. At the instant in the machine cycle when actual casting is to take place, the "pot piston release cam" withdraws the stop, allowing the piston to complete its stroke under the head of pressure that has been built up in the meantime. Before the pot breaks away from the mold, the air charge in the pneumatic mechanism operating the piston is reversed, causing the piston to ascend to its normal position. Restoration of the stop device under the control of the "pot piston release cam" follows, thus placing the parts in readiness for the next casting operation.

Just prior to the lockup, a wiping device is reciprocated across the pot mouth to dislodge any metal particles that may have adhered thereto and which might interfere with the lockup. This wiping device is actuated from the "pot mouth wiper cam" on the main cam shaft.

After each slug casting operation, when the mold is in slug ejecting position, a blast of air is directed against the mold for cooling purposes. The air blast is controlled from the "mold cooling air valve cam" located on the lower cam shaft $Q^{27}$.

In order to appreciate the functions of the various cams on the cam shaft mounted in the vise frame, brief reference will be made to the manner in which the vise jaws and the justification mechanism are operated, although this subject matter is to be presented in a later filed application. In the present machine, the vise jaws can be set to cast any length of line desired within the limits of the full line dimensions and, in addition, are arranged for relative movement toward and away from each other for quadding with either jaw or for centering. The jaws are moved toward and away from each other by independent pneumatically operated double-acting cylinder and piston devices jointly controlled from the "vise jaw closing air valve cam."

The positioning of the jaws for a line of given length is effected by setting a pair of jaw stops, one stop for each jaw, and which are independently adjustable according to the length of line desired by means located at the front of the vise frame. For a regular machine operation, the left-hand jaw is positively held inwardly against its stop by a pawl device since, under normal conditions, i. e., when the machine is at rest, the jaw actuating pneumatic devices are charged to urge the jaws apart. No such restraining influence, however, is exerted upon the right-hand jaw since, after each casting operation, it must be free to return to its rightmost position enabling it to descend to clear the incoming line.

Assuming normal machine operation, immediately after the machine cycle has been inaugurated by the ascent of the right-hand jaw, "the vise jaw closing air valve cam" operates to reverse the charge in the pneumatic devices operating the jaws, with the result that the right-hand jaw is moved leftward until it is arrested by banking against its stop. The left-hand jaw remains stationary, however, since, as previously stated, it is positively held against its stop for regular machine operation.

While air pressure is used to actuate the jaws, it is not relied upon to provide the line clamping pressure during casting or during justification of the line. Hydraulic devices are provided for this purpose, there being one such device for each jaw. Each hydraulic device includes a cylinder and piston, the piston being coupled to its respective jaw for movement therewith and the cylinder being filled with oil or other suitable liquid regardless of the piston's position. There is provided, in association with each cylinder, a plunger operated by heavy spring pressure under the control of the "hydraulic plunger control cam." The configuration of that cam is such that immediately after the right-hand jaw banks against its stop, the heavy spring pressure becomes active to move the plungers to exert substantial pressure upon the liquid in the cylinders. The strength of the springs is such that an ample clamping pressure is exerted against the ends of the line for every purpose.

Justification is effected by a bar which is moved up vertically to engage the spacebands and expand the line to the extent permitted by the location of the vise jaws. The justification bar is operated by a pneumatic cylinder and piston device controlled from the "just. air valve cam." The control of the pneumatic device by the justification air valve cam is effected through a valve set to a neutral position when the justification bar is in its lowermost position. Immediately after the clamping pressure is exerted on the line, however, the pneumatic device operating the justification bar is charged at its lower end causing the justification bar to ascend. The air in passing to the justification cylinder and piston device passes through a reducing valve set to operate at a reduced pressure during first justification.

After first justification has been accomplished, vertical alignment of the matrices takes place. During vertical alignment, the clamping pressure is removed from the line by relieving the pressure on the liquid in the hydraulic lockup devices. This pressure, it will be recalled, was exerted through the medium of heavy springs, so heavy indeed that, rather than rely upon the relatively light hydraulic plunger control cam to relieve the pressure, a separate pneumatically operated booster cylinder and piston mechanism is provided for the purpose, the charging of which is controlled from a "booster cyl. air valve cam." The booster cylinder is rendered operative both at the time the clamping pressure on the line is removed to permit vertical alignment and also later on, after casting, when the clamping pressure is removed to permit the line to ascend to the upper transfer level for distribution.

While vertical alignment is taking place, the booster cylinder air valve cam cuts off the air to the booster cylinder and when alignment is completed, the clamping pressure on the line is restored as the hydraulic plunger control cam permits the heavy spring pressure to act through the hydraulic lockup devices. Upon the restoration of the clamping pressure second justification takes place. It might be stated here that between first and second justification, the justification bar remains in the position to which it ascended during first justification, although no pressure is exerted by it on the spacebands. This is accomplished merely by adjusting the valve which supplies air to the pneumatic device operating the justification bar to a neutral setting. Also between first and second justification, the "just. reducing valve cam" adjusts the reducing valve to permit second justification to be effected at a much higher pressure than first justification.

At the convenient stage in the machine cycle, the justification air valve cam operates the valve controlling the pneumatic device operating justification bar to restore the latter to its normal position, the valve being immediately set thereafter to a neutral position ready for operation in the next machine cycle. The justification reducing valve cam also adjusts the reducing valve to its original position so that first justification in the next machine cycle will be carried out at the reduced pressure.

Immediately after casting, the hydraulic plunger control cam acts to remove the line clamping pressure, of course with the assistance of the booster device as previously stated. The vise jaw closing air valve cam, after completion of the casting operation, also acts to reverse the air charges in the pneumatic device operating the jaws. The result is that the right-hand jaw is moved to its extreme rightmost position where it can descend to its normal lower inoperative position. The left-hand jaw, however, remains stationary despite the reversal of the air charge in the pneumatic mechanism which operates it because of the pawl which positively holds it against its stop.

The "R. H. jaw air valve cam" is the one which operates the valve controlling the descent of the right-hand jaw after casting and which has been referred to in detail earlier in the specification.

It will now be clear how the terminal control system, which times the operation of the pneumatic devices that effect the travel of the composed matrix line through the machine from the point of assembly to the point of distribution, cooperates with the cam shaft mechanism and its timing elements to enable all of the organs of the machine to perform their respective functions.

Thus, one portion of the terminal control system operates within itself, upon the manual depression of the finger key B³⁸, to transfer the composed line to the first elevator and then to return the line delivery carriage back to its normal position ready for the transfer of the subsequent line. Among the functions controlled by that portion of the terminal control system is the inauguration of the casting cycle which proceeds under the control of timing cams of the cam shaft mechanism. And among the functions controlled by the timing cams during the casting cycle is the tripping of the first elevator, which thereupon causes the terminal control system to take over insofar as concerns the travel of the matrix line after the casting operation. In a word, this interdependency between the two timing systems, namely, the initiation of the operation of the cam shaft control system by one portion of the terminal control system and the subsequent initiation under the control of the cam shaft of another portion of the terminal control system, insures the operation in proper sequence of all the movable organs throughout the machine.

*Conclusion*

It is believed that the operations of the various mechanisms have been sufficiently described under the different headings and that, therefore, any further effort in that direction would be superfluous. While many of the mechanisms would doubtless have utility in other environments or in association with other mechanisms apart from pneumatic operation, and while pneumatic operation could be employed to operate the different mechanisms independently and apart from the interlocking or step-by-step control, all of the mechanisms with the pneumatic features have actually been designed to cooperate with one another in the peculiar way already described in carrying out the basic principles of the present invention, which, as before indicated, contemplates an entirely new type of machine and one differing radically from the present day machines.

In the accompanying drawings, the invention has been shown merely by way of example and in preferred form, but obviously many variations and modifications may be made therein and in its mode of operation which will still be comprised within its spirit. It is to be understood, therefore, that the invention is not limited to any specific form or embodiment, except insofar as such limitations are specified in the appended claims.

Having thus described my invention, what I claim is:

1. In or for a typographical composing machine, a line delivery carriage including a horizontally movable slide mounted in a fixed horizontal guideway, a pair of guides independently mounted on said slide and a vertically movable line engaging finger in each of said guides.

2. In a typographical composing machine, the combination with a line delivery carriage including a horizontally movable slide mounted in a fixed horizontal guideway, a pair of guides independently mounted on said slide and a vertically movable line engaging finger in each of said guides, of means for effecting such movements of the slide and fingers.

3. In or for a typographical composing machine, a line delivery carriage including a horizontally movable slide equipped with a pair of vertically disposed independently mounted guides, and a line engaging finger slidably mounted in each of said guides.

4. In or for a typographical composing machine, a line delivery carriage including a horizontally movable slide equipped with a pair of vertically disposed guides, and a pair of line engaging fingers slidably and resiliently mounted in said guides.

5. In or for a typographical composing machine, a line delivery carriage including a horizontally movable slide equipped with vertically disposed right-hand and left-hand guides, a vertically movable line engaging finger slidably arranged in each guide, and spring means in each guide bearing against the finger to assist in guiding it as well as to permit it to yield linewise during its vertical movement.

6. In a typographical composing and casting machine, the combination of a line delivery carriage operable to move the composed line from the assembling to the casting organ, said carriage including a slide horizontally movable in a fixed guideway and equipped with a pair of independently mounted guides accommodating each a vertically movable line engaging finger, and means for moving the fingers into engagement with the composed line when it is in the assembling organ and out of engagement therewith when it is in the casting organ.

7. In a typographical composing machine, the combination of a line delivery carriage including a slide horizontally movable in a fixed guideway and equipped with a pair of independently mounted guides accommodating each a vertically movable line engaging finger, means for moving said carriage from its line receiving position to its line delivery position and return, and means for lowering the fingers to engage the composed line prior to the delivery movement of the carriage and for raising them out of engagement therewith prior to the return movement of said carriage.

8. In a typographical composing machine, the combination of a line delivery carriage including a horizontally movable slide equipped with a pair of vertically movable line engaging fingers, a bail member mounted independently of the slide and to which the fingers are connected, and means for rocking the bail member to effect the vertical movements of the line engaging fingers.

9. In a typographical composing machine, the combination of a line delivery carriage including a horizontally movable slide equiped with a pair of vertically movable line engaging fingers, a bail member mounted independently of the slide and to which the fingers are connected, and means for rocking the bail member to effect the vertical movements of the line engaging fingers, said fingers being arranged for horizontal sliding movement along said bail member.

10. In or for a typographical composing machine, a line delivery carriage including a slide horizontally movable in a fixed guideway, and a pair of independently mounted guides accommodating each a vertically movable line engaging finger adjustable one toward the other to accommodate lines of different lengths.

11. In or for a typographical composing machine, a line delivery carriage including a horizontally movable slide equipped with a pair of vertically disposed guides, and a pair of line engaging fingers slidably mounted in said guides, one of said guides being mounted for movement toward the other to adapt the fingers to lines of different lengths.

12. In a typographical composing machine, the combination of a line delivery carriage including a horizontally movable slide equipped with left-hand and right-hand guides, and a pair of line engaging fingers slidably mounted in said guides with means for moving the left-hand guide toward the right-hand guide to locate its associated finger according to the length of the composed line.

13. In a typographical composing machine, the combination of a line delivery carriage equipped with a pair of line engaging fingers, the left-hand finger being movable relatively to the right-hand finger to accommodate lines of different lengths, a stop settable in accordance with the length of the composed line, and means for moving the left-hand finger from a normal position of rest to a line engaging position as determined by said stop.

14. In a typographical composing machine, the combination of a line delivery carriage equipped with a pair of vertically movable line engaging fingers, a stop settable in accordance with the length of the composed line, means for moving the left-hand finger from a normal position of rest to a line engaging position as determined by said stop, and means for moving both fingers downwardly into engagement with the line after said left-hand finger has been thus located.

15. In a typographical composing machine, the combination of a line delivery carriage equipped with a left-hand finger and a right-hand finger for engaging the leading and terminal ends of the line respectively, the right-hand finger normally being located out of registry with the terminal end of the line, and means for moving said right-hand finger into such registry prior to its engagement therewith.

16. In a typographical composing machine, the combination of a line delivery carriage equipped with a left-hand finger and a right-hand finger both movable downwardly into engagement with the leading and terminal ends of the composed line respectively, the right-hand finger normally being located out of registry with the terminal end of the line, and means for moving said right-hand finger into such registry prior to the downward movement of the two fingers.

17. In a typographical composing and casting machine, the combination of a line resistant for supporting the leading end of the line as it is being composed, and a line delivery carriage for moving the composed line endwise from the assembling to the casting organ, said carriage being equipped with a line engaging finger operative to shift the line resistant out of the delivery path of the line.

18. In a typographical composing and casting machine, the combination of a line delivery carriage equipped with a pair of line engaging fingers movable to transfer the line endwise from the assembling to the casting organ, a line resistant for supporting the leading end of the line as it is being composed, and means for moving the carriage fingers downwardly into engagement with the opposite ends of the line prior to the delivery movement of the carriage, the left-hand finger acting during such downward movement to shift the line resistant out of the delivery path of the line.

19. In a typographical composing and casting machine wherein the composed line is transferred endwise from the assembling to the casting organ, the combination of a line resistant mounted on a vertical pivot rod and adapted to support the leading end of the line as it is being composed, means acting prior to the transfer of the composed line to slide the line resistant along the pivot rod to a position enabling it to be swung on the pivot rod out of the delivery path of the line, means for holding the line resistant in its inoperative position until after the composed line has been moved out of the assembling organ, and means for then returning the line resistant to its operative position.

20. In a typographical composing and casting machine, the combination of a fixed assembler wherein matrices are composed in line, a line delivery carriage normally located above the assembler and equipped with a pair of fingers movable downwardly to engage the line in the assembler at its opposite ends, said carriage being movable to transfer the composed line endwise from the assembler to the casting organ, a line resistant for supporting the line at its leading end as it is being composed, means for moving the carriage fingers downwardly into engaging relation with the line, the left-hand finger at the leading end of the line acting, as it is moved downwardly, to depress the line resistant out of the delivery path of the line, means for holding the line resistant in its depressed position until after the composed line has been moved out of the assembler, and means for then restoring the line resistant to its active position.

21. In a typographical composing and casting machine, the combination of a fixed assembler wherein the matrices are composed in line, a line resistant for supporting the leading end of the line as it is being composed, a line delivery carriage for moving the line endwise from the assembler to the casting organ, said carriage being equipped with a pair of fingers movable downwardly into engagement with the opposite ends of the line, a stop settable by the line resistant in accordance with the length of the composed line, means for moving the left-hand finger from a normal position of rest to a position coinciding with the leading end of the line as determined by said stop, and means for moving the two fingers downwardly to engage the opposite ends of the line, the left-hand finger at the leading end of the line acting during its downward movement to depress the line resistant out of the delivery path of the line.

22. In a typographical composing and casting machine having a fixed assembler wherein the matrices are composed in line, the combination of a line delivery carriage operable to move the composed line endwise from the assembler to the casting organ and equipped with a pair of fingers movable downwardly to engage the opposite ends of the composed line in the assembler, an assembler slide adapted to be advanced into the assembler as the line is being composed, and a vertically movable line resistant mounted at the leading end of the slide and arranged to be moved out of the way of the line by the downward movement of the left-hand finger at the leading end of the line.

23. In a typographical composing and casting machine having a fixed assembler wherein the matrices are composed in line, the combination of a line delivery carriage operable to move the composed line endwise from the assembler to the casting organ and equipped with a pair of fingers movable downwardly to engage the opposite ends of the composed line in the assembler, an assembler slide adapted to be advanced into the assembler as the line is being composed, a vertically movable line resistant mounted at the leading end of the slide and arranged to be moved out of the way of the line by the downward movement of the left-hand finger at the leading end of the line, and means for returning the line resistant to its active position after the line has been moved out of the assembler.

24. A combination according to claim 22 wherein the line resistant is mounted on the assembler slide for swinging as well as vertical movement, and means for swinging the line resistant out of the way of the line after it has been moved downwardly a limited distance.

25. A combination according to claim 22 wherein the line resistant is mounted for swinging as well as vertical movement on the assembler slide, and wherein spring means are provided for urging the line resistant to its normal position, said spring means being arranged to yield as the line resistant is depressed by the left-hand finger at the leading end of the line and to swing the resistant out of the way of the line when it is in a depressed position.

26. A combination according to claim 22 wherein the line resistant is mounted for swinging as well as vertical movement on a vertical pivot rod presented by the assembler slide, and wherein spring means are provided for urging the line resistant to its normal position, said spring means being arranged to yield as the line resistant is depressed by the left-hand finger at the leading end of the line and to swing the resistant out of the way of the line when it is in a depressed position.

27. In a typographical composing and casting machine having a fixed assembler wherein the matrices are composed in line, the combination of a line delivery carriage slidably mounted in a fixed horizontally disposed guideway and operable to move the composed line endwise from the assembler to the casting organ, said carriage being equipped with a pair of fingers movable downwardly to engage the opposite ends of the composed line in the assembler, an assembler slide adapted to be advanced from a normal position into the assembler as the line is being composed, means for holding the assembler slide against retrograde movement, a vertically movable line resistant mounted at the leading end of the assembler slide and arranged to be moved out of the way of the line by the downward movement of the left-hand finger at the leading end of the line, means for returning the assembler slide to its normal position, and means for returning the line resistant to its active position during the return movement of said slide.

28. In a typographical composing machine having an assembler wherein the matrices are composed in line, an assembler slide adapted to be advanced from a normal position endwise into the assembler as the line is composed, a brake for holding the assembler slide against retrograde movement, and means for returning the assembled slide to its normal position, the combination of a line delivery carriage movable horizontally to transfer the line out of the assembler, and means actuated by said horizontal transfer movement of the line delivery carriage for releasing said brake to permit the return of the assembler slide.

29. In a typographical composing machine having an assembler wherein the matrices are composed in line, an assembler slide adapted to be advanced from a normal position endwise into the assembler as the line is composed, a brake for holding the assembler slide against retrograde movement, and means for returning the assembler slide to its normal position, the combination of a line delivery carriage movable horizontally to transfer the line out of the assembler, means actuated by said horizontal transfer movement of the line delivery carriage for releasing said brake to permit the return of the assembler slide, and means to hold the brake released until the assembler slide has been returned.

30. In a typographical composing machine having an assembler wherein the matrices are composed in line, an assembler slide adapted to be advanced from a normal position endwise into the assembler as the line is composed, a brake for holding the assembler slide against retrograde movement, and means for returning the assembler slide to its normal position, the combination of a line delivery carriage for transferring the line out of the assembler, means actuated by the transfer movement of the line delivery carriage for releasing said brake to permit the return of the assembler slide, and a spring detent normally maintained in inoperative position and rendered operative automatically to hold the brake released until the assembler slide has been returned.

31. In a typographical composing machine having an assembler wherein the matrices are composed in line, an assembler slide adapted to be advanced from a normal position endwise into the assembler as the line is composed, a brake for holding the assembler slide against retrograde movement, and means for returning the assembler slide to its normal position, the combination of a line delivery carriage for transferring the line out of the assembler, means actuated by the transfer movement of the line delivery carriage for releasing said brake to permit the return of the assembler slide, a spring detent normally maintained in inoperative position and rendered operative automatically to hold the brake released until the assembler slide has been returned, and a pin on the assembler slide adapted to engage and return said detent to its inoperative position as the assembler slide approaches its normal position, whereby said brake is reapplied.

32. In a typographical composing machine having a fixed assembler, the combination of a line delivery carriage equipped with a pair of line engaging fingers movable downwardly to engage opposite ends of a composed line of matrices in the assembler and horizontally to shift the line endwise from the assembler, an assembler slide adapted to be advanced endwise from a normal position into the assembler as the line is composed, a spring actuated brake for holding the assembler slide against retrograde movement, a line resistant supporting the leading end of the line and adapted to be depressed by the downward movement of the corresponding line engaging finger, said resistant being mounted at the forward end of the assembler slide for movement vertically and, when depressed, for swinging movement rearwardly out of the delivery path of the line, a spring urging said resistant upwardly to its normal position, said spring being arranged to yield when the resistant is depressed and effect said rearward swinging movement, a lever, adapted to be rocked by the line delivery movement of the carriage, to condition said brake to release the assembler slide, permitting it to return to its normal position, and to condition a rocker arm for returning the line resistant forwardly so that it can be raised to its normal position by its associated spring, an automatic spring detent for locking the parts when thus conditioned, and a pin on the assembler slide for rendering said detent inoperative as said slide approaches its normal position, whereby the brake is reapplied and the resistant and lever restored to their original positions.

33. In a typographical composing machine, the combination of a line delivery carriage movable from a line receiving to a line delivery position and return, and an individual power unit for effecting the movement of the line delivery carriage in both directions.

34. In a typographical composing machine, the combination of a line delivery carriage movable from a line receiving to a line delivery position and equipped with a pair of vertically movable fingers normally located out of engagement with the line but adapted to be moved into engagement therewith prior to the movement of the carriage, and an individual power unit for effecting the line engagement movement of the fingers.

35. In a typographical composing machine, the combination of a line delivery carriage movable from a line receiving to a line delivery position, said carriage being equipped with a pair of fingers movable into engagement with the opposite ends of the line when the carriage is in its line receiving position and out of engagement with the line when the carriage is in its line delivery position, and an individual reversible power unit for effecting both such movements of the line engaging fingers.

36. In a typographical composing machine, the combination of a line delivery carriage movable from a line receiving to a line delivery position and return, said carriage being equipped with a pair of fingers movable into engagement with the opposite ends of the line when the carriage is in its line receiving position and out of engagement with the line when the carriage is in its line delivery position, a system including a reversible power unit individual to the carriage for moving it in both directions and a reversible power unit individual to the fingers for moving them into and out of engagement with the line, and timing means controlling the operation of the power devices for causing them to effect the different movements of the line delivery carriage and the line engaging fingers in proper sequence.

37. In a typographical composing machine, the combination of a line delivery carriage movable from a line receiving to a line delivery position and return, said carriage being equipped with a pair of fingers movable into engagement with the opposite ends of the line when the carriage is in its line receiving position and out of engagement with the line when the carriage is in its line delivery position, an operating system including a pair of reversible power units, one for moving the fingers into and out of engagement with the composed line and the other for moving the line delivery carriage in both directions, means for inaugurating the operation of the system, means operative as the line engaging fingers are moved into engagement with the line to cause the power unit associated with the line delivery carriage to move the carriage from its line receiving to its line delivery position, means operative when the line has been delivered to reverse the operation of the power unit associated with the line engaging fingers to move the fingers out of engagement with the line, and means operative as the line engaging fingers are moved out of engagement with the line to reverse the operation of the power unit associated with the line delivery carriage to restore the line delivery carriage to its normal position.

38. In or for a typographical composing and casting machine, a pneumatically operated line delivery carriage for transporting a line of matrices from the assembling to the casting organ.

39. In a typographical composing machine, the combination of a line delivery carriage movable from a line receiving to a line delivery position and return, and pneumatic means for effecting the movement of the line delivery carriage in both directions.

40. In a typographical composing machine, the combination of a line delivery carriage movable from a line receiving to a line delivery position and return, a pneumatic system including a valve controlled double-acting cylinder and piston mechanism for moving the line delivery carriage in both directions, means for inaugurating the operation of the pneumatic system, and means within the system itself for automatically adjusting the valve to charge the cylinder for movement of the carriage in one direction and upon the termination of such movement to adjust the valve to charge the cylinder for movement of the carriage in the opposite direction.

41. In a typographical composing machine, the combination of a line delivery carriage movable from a line receiving to a line delivery position and equipped with a pair of vertically movable fingers normally located out of engagement with the line but adapted to be moved into engagement therewith prior to the movement of the carriage, and pneumatic means for effecting the line engaging movement of the fingers.

42. In a typographical composing machine, the combination of a line delivery carriage movable from a line receiving to a line delivery position, said carriage being equipped with a pair of fingers movable into engagement with the opposite ends of the line when the carriage is in its line receiving position and out of engagement with the line when the carriage is in its line delivery position, and pneumatic means for effecting both such movements of the line engaging fingers.

43. In a typographical composing machine, the combination of a line delivery carriage movable from a line receiving to a line delivery position, said carriage being equipped with a pair of fingers movable into engagement with the opposite ends of the line when the carriage is in its line receiving position and out of engagement with the line when the carriage is in its line delivery position, a pneumatic system including a valve controlled double-acting cylinder and piston device for effecting both such movements of the line engaging fingers, means for inaugurating the operation of said system, and means within the system itself acting, after the operation thereof has been inaugurated, automatically to adjust the valve to charge the cylinder for the movement of the fingers into engagement with the line and, after the line has been delivered, to adjust the valve to charge the cylinder for the movement of the fingers out of engagement with the line.

44. In a typographical composing machine, the combination of a line delivery carriage movable from a line receiving to a line delivery position and return, said carriage being equipped with a pair of fingers movable into engagement with the opposite ends of the line when the carriage is in its line receiving position and out of engagement with the line when the carriage is in its line delivery position, a pneumatic system including devices for moving the carriage in both directions and for moving the fingers into and out of engagement with the line, and timing means for controlling the operation of the pneumatic devices to cause them to effect the different movements of the line delivery carriage and the line engaging fingers in proper sequence.

45. In a typographical composing machine, the combination of a line delivery carriage movable from a line receiving to a line delivery position and return, said carriage being equipped with a pair of fingers movable into engagement with the opposite ends of the line when the carriage is in its line receiving position and out of engagement with the line when the carriage is in its line delivery positon, a pneumatic system operating to effect the movement of the line delivery carriage in both directions and the movement of the fingers into and out of engagement with the line, and means within the system itself acting automatically to cause the different movements of the line delivery carriage and of the line engaging fingers to be performed in proper sequence.

46. In a typographical composing machine, the combination of a line delivery carriage movable from a line receiving to a line delivery position and return, said carriage being equipped with a pair of fingers movable into engagement with the opposite ends of the line when the carriage is in its line receiving position and out of engagement with the line when the carriage is in its line delivery position, a pneumatic system including a pair of valve controlled double-acting cylinder and piston devices, one for moving the fingers into and out of engagement with the composed line and the other for moving the line delivery carriage in both directions, means for inaugurating the operation of the pneumatic system, means operative as the line engaging fingers are moved into engagement with the line to adjust the valve associated with the cylinder and piston device operating the line delivery carriage to charge the same for the movement of the carriage from its line receiving to its line delivery position, means operative when the line has been delivered to adjust the valve associated with the cylinder and piston mechanism operating the line engaging fingers to charge the same for the movement of the fingers out of engagement with the line, and means operative as the line engaging fingers are moved out of engagement with the line to adjust the valve associated with the cylinder and piston mechanism operating the line delivery carriage to charge the same for the restoration of the line delivery carriage to its normal position.

47. A combination according to claim 46 wherein the valve associated with the cylinder and piston mechanism operating the line engaging fingers is initially adjusted to charge the cylinder for the movement of the fingers into engagement with the line by an initial slight movement of the line delivery carriage in the return direction.

48. A combination according to claim 46 wherein the cylinder and piston device for operating the line delivery carriage is normally charged to move the carriage in the return direction, and wherein interponent means are provided for locating the carriage normally in a position spaced from its full return position, and wherein the means for inaugurating the operation of the pneumatic system includes devices for rendering the interponent means inoperative to permit the line delivery carriage to complete its return movement, said completed movement of the carriage acting to adjust the valve associated with the cylinder and piston mechanism operating the line engaging fingers to charge said cylinder for the movement of the fingers into engaging relation with the composed line.

49. In a typographical composing machine, the combination of a line delivery carriage equipped with a pair of line engaging fingers, and pneumatically operated means for moving the fingers relatively to each other to locate them in proper spaced relation to accommodate the composed line.

50. In a typographical composing machine, the combination of a line delivery carriage equipped with a pair of line engaging fingers, means including a pneumatic device adapted when charged to move the fingers relatively to each other to locate them in proper spaced relation to accommodate the composed line, a valve adjustable manually to charge the pneumatic device, and automatic means for adjusting the valve to vent the pneumatic device after the fingers have been set according to the length of the composed line.

51. In a typographical composing and casting machine, the combination of a line delivery carriage equipped with a pair of line engaging fingers, pneumatic means for moving the fingers relatively to each other to accommodate lines of different lengths, means for moving the line delivery carriage from the assembling to the casting organ and return, pneumatic means for inaugurating the movement of the line delivery carriage, and a common manually adjustable valve for controlling the operation of both said pneumatic means.

52. A combination according to claim 51 wherein means are provided for delaying the operation of the pneumatic means for inaugurating the movement of the line delivery carriage until after the fingers have been adjusted in accordance with the length of the composed line.

53. A combination according to claim 51 wherein the common valve is automatically adjusted back to its normal setting as the pneumatic means for inaugurating the movement of the crriage completes its intended function.

54. In a typographical composing machine, the combination of a line delivery carriage equipped with a pair of guides, a pair of fingers slidably mounted in the guides for movement into engagement with the opposite ends of the line, a pneumatic device for moving the left-hand guide to locate its associated finger according to the length of the composed line, a normally inoperative pawl adapted upon the operation of the pneumatic device to couple it to the guide, and means for charging the pneumatic device to effect the finger locating movement of said guide.

55. In a typographical composing machine, the combination of a line delivery carriage equipped with a pair of guides, a pair of fingers slidably mounted in the guides for movement into engagement with the opposite ends of the line, a pneumatic device for moving the left-hand guide to locate its associated finger according to the length of the composed line, a normally inoperative pawl adapted upon the operation of the pneumatic device to couple it to the guide, means for charging the pneumatic device to effect the finger locating movement of said guide, and means for venting the pneumatic device after the finger has been located, the carriage during its line delivery movement acting to restore the parts to their normal positions.

56. In a typographical composing and casting machine, the combination of a line resistant for supporting the leading end of the line as it is being composed, means for moving the composed line endwise from the assembling to the casting organ, and pneumatically operated means operative to shift the line resistant out of the delivery path of the line.

57. In a typographical composing and casting machine, the combination of a line resistant for supporting the leadng end of the line as it is being composed, a line delivery carriage for moving the composed line endwise from the assembling to the casting organ, said carriage being equipped with a line engaging finger, and pneumatically operated means for moving the finger to shift the line resistant out of the delivery path of the line.

58. In a typographical composing machine, the combination of a line delivery carriage movable from a line receiving to a line delivery position and return, said carriage being equipped with a pair of fingers adjustable relatively to each other to accommodate lines of different lengths and movable into engagement with the opposite ends of the line when the carriage is in its line receiving position and out of engagement with the line when the carriage is in its line delivery position, a pneumatic system including devices for relatively adjusting the fingers, for moving the fingers into and out of engagement with the line, for moving the carriage in both directions and for inaugurating the movement of the line delivery carriage, and timing means for controlling the operation of the pneumatic devices to cause them to effect the relative adjustment of the fingers, the inauguration of carriage movement and the different movements of the carriage and the line engaging fingers in proper sequence.

59. In a typographical composing machine, the combination of a line delivery carriage movable from a line receiving to a line delivery position and return, said carriage being equipped with a pair of fingers adjustable relatively to each other to accommodate lines of different lengths and movable into engagement with the opposite ends of the line when the carriage is in its line receiving position and out of engagement with the line when the carriage is in its line delivery position, a pneumatic system operating to effect the relative adjustment of the fingers, their movement into and out of engagement with the line, the movement of the line delivery carriage in both directions and the inauguration of carriage movement, and means within the system itself acting automatically, once its operation is initiated, to cause the various functions performed thereby to be carried out in proper sequence.

60. In a typographical composing and casting machine, the combination of a line delivery carriage operable to move the composed line from the assembling to the casting organ, a line clamping jaw normally standing in an inactive position clear of the path of movement of the line, and means actuated independently of the carriage but controlled by the line delivery movement thereof for moving said jaw into active position.

61. In a typographical composing and casting machine, the combination of a line delivery carriage operable to move the composed line from the assembling to the casting organ, a line clamping jaw normally standing in an inactfve position below the path of movement of the line, and means controlled by the line delivery movement of the carriage for raising said jaw vertically into active position.

62. In a typographical composing and casting machine, the combination of a line delivery carriage operable to move the composed line from the assembling to the casting organ, a line clamping jaw normally standing in an inactive position clear of the path of movement of the line, means controlled by the line delivery movement of the carriage for moving said jaw into active position, and means actuated by such movement of the jaw for inaugurating the casting cycle of the machine.

63. In a typographical composing and casting machine, the combination of a line delivery carriage operable to move the composed line from the assembling to the casting organ, a right-hand line clamping jaw normally standing below the path of movement of the line, means for raising the right-hand jaw into active position, and means actuated by the carriage as it completes its line line delivery movement for controlling the operation of the jaw raising means.

64. In a typographical composing and casting machine, the combination of a line delivery carriage operable to move the composed line from the assembling to the casting organ, a right-hand line clamping jaw normally standing below the path of movement of the line, a pawl for holding said jaw in such inactive position, means for raising said jaw into active position, and means actuated by the carriage as it completes its line delivery movement for releasing said pawl and for controlling the operation of said jaw raising means.

65. In a typographical composing and casting machine, the combination of a line delivery carriage operable to move the composed line from the assembling to the casting organ, a right-hand line clamping jaw normally standing below the path of movement of the line, means for raising the right-hand jaw into active position, means actuated by the carriage as it completes its line delivery movement for controlling the operation of the jaw raising means, and a clutch control actuated by the upward movement of the right-hand jaw for inaugurating the casting cycle of the machine.

66. A combination according to claim 60 which includes a safety device acting when the normally inactive jaw is in its active position to arrest the line delivery carriage in advance of such active position.

67. A combination according to claim 62 wherein in addition to the means actuated by the movement of the jaw for inaugurating the casting cycle of the machine, other manually operable means are provided for the same purpose, and wherein a safety device is employed for preventing the manual inauguration of the casting cycle whenever the normally inactive jaw is in any position other than its active position.

68. In a typographical casting machine, the combination of a pair of line clamping jaws, one of said jaws being movable into and out of line clamping position, and an individual power unit for moving said jaw in at least one direction.

69. In a typographical composing and casting machine, the combination of a line delivery carriage operable to move the composed line from the assembling to the casting organ, a line clamping jaw normally standing in an inoperative position during the delivery of the line, an individual power unit for moving said jaw into operative position, and means controlled by the line delivery movement of the carriage for effecting the operation of said power unit to move said jaw into operative position.

70. In a typographical composing and casting machine, the combination of a line delivery carriage operable to move the composed line from the assembling to the casting organ, a line clamping jaw normally standing in an inoperative position during the delivery of the line, an individual reversible power unit for moving said jaw into and out of operative position, means controlled by the line delivery movement of the carriage for effecting the operation of said power unit to move said jaw into operative position, and time controlled means for reversing the operation of said power unit to return the jaw to its inoperative position after casting.

71. In a typographical composing and casting machine, the combination of a line delivery carriage operable to move the composed line from the assembling to the casting organ, a line clamping jaw normally standing in an inoperative position during the delivery of the line, an individual reversible power unit for moving said jaw into operative position prior to the casting operation and out of operative position subsequent to the casting operation, and automatic means controlling the operation of the power unit to effect such movements of the jaw.

72. In a typographical casting machine, the combination of a pair of line clamping jaws, one of said jaws being movable into and out of line clamping position, and pneumatically operated means for moving said jaw at least in one direction.

73. In a typographical composing and casting machine, the combination of a line delivery carriage operable to move the composed line from the assembling to the casting organ, a line clamping jaw normally standing in an inoperative position during the delivery of the line, pneumatic means for moving said jaw into operative position, and means controlled by the line delivery movement of the carriage for effecting the operation of said pneumatic means to move said jaw into operative position.

74. In a typographical composing and casting machine, the combination of a line delivery carriage operable to move the composed line from the assembling to the casting organ, a line clamping jaw normally standing in an inoperative position during the delivery of the line, pneumatic means for moving said jaw into operative position, means controlled by the line delivery movement of the carriage for effecting the operation of said pneumatic means to move said jaw into operative position, and time controlled means for effecting the operation of said pneumatic means to return the jaw to its inoperative position after casting.

75. In a typographical casting machine, the combination of a line supporter, a pair of clamping jaws to engage the line when in the supporter, one of said jaws normally being located in an inactive position to permit the endwise insertion of the line in the supporter, and pneumatic means acting automatically as the line is inserted in the supporter to move said jaw into active or line clamping position.

76. In a typographical composing and casting machine, the combination of a line delivery carriage operable to move the composed line from the assembling to the casting organ, a line clamping jaw normally standing in an inactive position clear of the path of movement of the line, means including a valve controlled double-acting cylinder and piston mechanism for moving the jaw into and out of active position, means actuated by the carriage as it completes its line delivery movement for setting the valve to charge the cylinder for the movement of the jaw into active position, and means acting automatically after the casting operation to set the valve to charge the cylinder for the movement of the jaw into inactive position.

77. In a typographical composing and casting machine, the combination of a line delivery carriage operable to move the composed line from the assembling to the casting organ, a line clamping jaw normally standing in an inactive position clear of the path of movement of the line, means including a valve controlled double-acting cylinder and piston device for moving the jaw into and out of active position, means acting as the jaw moves into active position for inaugurating the casting cycle of the machine, means actuated by the carriage as it completes its line delivery movement for setting the valve to charge the cylinder for the movement of the jaw into active position, and means acting at the proper stage in the machine cycle and after the casting operation to adjust the valve to charge the cylinder for the movement of the jaw into inactive position.

78. In a typographical casting machine, the combination of a line holder associated with the mold and comprising relatively movable sections, means for effecting the relative movement of said sections to bring the matrix characters into proper alignment and means for insuring the horizontal alignment of the mold cavity with the aligned matrices.

79. In a typographical casting machine, the combination of a line holder adapted to support the matrices at different casting levels and comprising relatively movable sections, and means for effecting the relative movement of said sections to bring the matrix characters into proper alignment regardless of their support at different casting levels.

80. In a typographical casting machine, the combination of a line holder associated with the mold and including a member presenting a horizontal surface and a matric aligning rail vertically movable with respect to said member and also presenting a horizontal surface, said surfaces being adapted one to overlie and the other to underlie the lower ears of the matrices, spring means for urging said rail in a direction to effect the matrix alignment when the holder is in casting position, and means for moving said rail in the opposite direction against the action of said spring means when the holder is in line receiving position.

81. In or for a typographical casting machine, a line holder associated with the mold and having a vertically movable horizontal rail adapted to underlie and a horizontal surface adapted to overlie the lower ears of the matrices, said rail and surface normally being spaced to provide clearance for the matrices as the composed line is moved into the holder.

82. In or for a typographical casting machine, a line holder associated with the mold and having a vertically movable horizontal rail adapted to underlie and a horizontal surface adapted to overlie the lower ears of the matrices, said rail and surface normally being spaced to provide clearance for the matrix ears as the composed line is moved into the holder, and spring means for moving said rail upwardly to eliminate such clearance before casting.

83. In a typographical casting machine, a line holder associated with the mold and having a vertically movable horizontal rail adapted to underlie and a horizontal surface adapted to overlie the lower ears of the matrices, and spring means acting through the underlying rail and the overlying surface to bring the matrix characters into proper alignment, in combination with means for depressing the rail against the action of the spring means to provide sufficient clearance between it and the overlying surface to permit a line of matrices to be moved into and out of the holder.

84. In a typographical casting machine, a line holder associated with the mold and having a vertically movable horizontal rail adapted to underlie and a horizontal surface adapted to overlie the lower ears of the matrices, and spring means acting through the underlying rail and the overlying surface to bring the matrix characters into proper alignment, in combination with means for adjusting the rail against the reaction of the spring means to a position wherein the spring means is ineffective to exert the aligning pressure, and means for effecting said adjustment of the rail when the holder is both in its line receiving and line transfer position.

85. A combination according to claim 84, wherein automatic means are provided for rendering the spring means, through which alignment is effected, active when the holder is in casting position.

86. In or for a typographical casting machine, a line holder associated with the mold and having a fixed body member, a vertically movable but non-retractible horizontal matrix aligning rail underlying the body member, and a vertically movable but retractible horizontal matrix supporting rail intermediate the body member and the aligning rail, said body member and matrix supporting rail presenting respectively an overlying and an underlying surface vertically spaced to accommodate the lower ears of matrices supported at the upper level in the holder, and said matrix supporting rail and matrix aligning rail presenting respectively an overlying surface and an underlying surface vertically spaced to accommodate the lower ears of matrices supported at the lower level in the holder, and spring means acting through the different overlying and underlying surfaces to bring the matrix characters into proper alignment regardless of the level at which they are supported.

87. A line holder according to claim 86 in combination with means for depressing the non-retractible rail against the action of the spring means and wherein the holder further includes means for locating the retractible rail in spaced relation with the fixed body member and with the non-retractible rail when the latter is depressed, to provide sufficient clearance between each pair of cooperating overlying and underlying surfaces to permit a line of matrices to be moved into the holder regardless of the level at which the matrices are supported.

88. A line holder according to claim 86, which is movable from a line receiving to a line transfer position, in combination with means for adjusting the matrix aligning and matrix supporting rails to positions wherein the spring means is rendered inactive whereby to suppress the aligning pressure both at the line receiving and at the line transfer positions.

89. A line holder according to claim 86, which is movable from a line receiving to a line transfer position, in combination with means for adjusting the matrix aligning and matrix supporting rails to positions wherein the spring means is rendered inactive whereby to suppress its aligning pressure both at the line receiving and at the line transfer position, and means for retracting the matrix supporting rail to permit the matrices supported thereby to drop to the lower level after the aligning pressure has been released in the transfer position of the holder.

90. In a typographical casting machine, the combination of a vertically movable line holder associated with the mold, means for locating the holder at the casting level independently of the mold, means within the holder for shifting the matrices vertically relatively to one another to bring the matrix characters into proper alignment and means for insuring the horizontal alignment of the mold cavity with the aligned matrices.

91. In a typographical casting machine, the combination of a line holder associated with the mold and movable in one direction from line receiving to line transfer position, means for effecting such movement of the line holder, and means for arresting the holder in an intermediate casting position.

92. In a typographical casting machine, the combination of a line holder associated with the mold and movable in one direction from line receiving to line transfer position, means for effecting such movement of the line holder, means for arresting the holder in an intermediate casting position, and means for disabling the arresting means after casting.

93. In a typographical casting machine, the combination of a line holder associated with the mold and movable in one direction from line receiving to line transfer position, means for effecting such movement of the line holder, and means for arresting the holder in an intermediate casting position at one level or another as desired.

94. In a typographical casting machine, the combination of a line holder associated with the mold and movable in one direction from line receiving to line transfer position, means for effecting such movement of the line holder, and means adapted to be set selectively for arresting the holder in an intermediate casting position at one level or another as desired.

95. In a typographical casting machine, the combination of a line holder associated with the mold and movable in one direction from line receiving to line transfer position, means for effecting such movement of the line holder, a plurality of stops adapted to be set selectively for arresting the holder in an intermediate casting position at one level or another as desired, and a device common to said stops for disabling the active stop after casting.

96. In a typographical casting machine, the combination of a line holder associated with the mold and movable from one position to another, and an individual power unit for effecting such movement of the holder.

97. In a typographical casting machine, the combination of a line holder associated with the mold and movable from line receiving to line transfer position and return, an individual reversible power unit for effecting such movements of the holder, means for rendering the power unit operative to effect the movement of the holder in one direction, and means to reverse the operation of the power unit whereby the holder is moved in the opposite direction.

98. In a typographical casting machine, the combination of a line holder associated with the mold and movable in one direction from line receiving to casting position and then to line transfer position and in the opposite direction back to line receiving position, an individual reversible power unit for effecting such movements of the holder, said power unit being operative after the holder leaves its line receiving position continuously to urge the holder toward its line transfer position, means for temporarily arresting the holder in its casting position in opposition to the action of the power unit, and means for reversing the operation of the power unit after the line has been transferred from the holder to return the latter to its line receiving position.

99. In a typographical casting machine, the combination of a line holder associated with the mold and movable in one direction from line receiving to casting position and then to line transfer position, means for temporarily arresting the holder in its casting position, a line clamping jaw movable to operative position before casting and to inoperative position after casting, and means actuated by the latter movement of the jaw to render the holder arresting means inoperative.

100. In a typographical casting machine, the combination of a line holder associated with the mold and movable vertically from a lower line receiving position to an intermediate casting position and then to an upper line transfer position, a pawl operative to arrest the holder in said intermediate casting position, a line clamping jaw movable to operative position before casting and to inoperative position after casting, and means for rocking the pawl to an inoperative position so as to permit the ascent of the holder to its upper line transfer position.

101. In a typographical composing and casting machine, the combination of a line delivery carriage for transferring the composed line from the assembler, a holder to present said line to the mold and normally occupying a line receiving position, and a safety device cooperating directly with the line delivery carriage and controlled by the line holder for preventing the transfer of the line thereto when it is out of its normal position.

102. In a typographical composing and casting machine, the combination of a line delivery carriage for transferring the composed line of matrices from the assembler, a holder to prevent said line to the mold and normally occupying a line receiving position, and a safety device cooperating directly with the line delivery carriage and controlled by the line holder for arresting the carriage in its transfer movement when the holder is out of its normal position.

103. In a typographical casting machine, the combination of a line holder associated with the mold and movable from line receiving position to casting position, and pneumatically operated means for effecting such movement of the holder.

104. In a typographical casting machine, the combination of a line holder associated with the mold and movable from line receiving to casting and then to line transfer position, and pneumatically operated means for effecting such movements of the holder.

105. In a typographical casting machine, the combination of a line holder associated with the mold and movable from line receiving to casting and then to line transfer position and thereafter back to line receiving position, and pneumatically operated means for effecting such movements of the holder.

106. In a typographical casting machine, the combination of a line holder associated with the mold and movable from line receiving to line transfer position, pneumatically operated means for effecting such movement of the holder, and means for arresting the holder in an intermediate casting position.

107. In a typographical casting machine, the combination of a line holder associated with the mold, pneumatically operated means for moving the holder from line receiving to casting and then to line transfer position, and automatic devices controlling the operation of said pneumatically operated means.

108. In a typographical casting machine, the combination of a line holder associated with the mold, pneumatically operated means for moving the holder from its line receiving to its line transfer position and return, means for transferring the line from the holder, and devices actuated by said transfer means for automatically controlling said pneumatically operated means to effect the return movement of the holder after the line has been removed therefrom.

109. In a typographical composing and casting machine, the combination of a line holder associated with the mold, pneumatically operated means for moving the holder from its line receiving to its line transfer position and return, means for delivering a composed line to the holder at the line receiving position, means for removing the line from the holder at the line transfer position, devices actuated by said line delivery means, upon the delivery of the line to the holder, for automatically controlling said pneumatically operated means to effect the movement of the holder from its line receiving position, and devices actuated by said line removing means upon the removal of the line from the holder for automatically controlling said pneumatically operated means to effect the return movement of the holder.

110. In a typographical casting machine, the combination of a vertically movable line holder associated with the mold, pneumatically operated means for moving the holder from its lower line receiving position to its upper line transfer position and back to its line receiving position, means for delivering a composed line to the holder at the line receiving position, means for temporarily arresting the holder in its ascent in an intermediate casting position, means for removing the line from the holder at the line transfer position, devices actuated by the line delivery means, upon the delivery of the line to the holder, for automatically controlling said pneumatically operated means to effect the ascent of the holder, means acting automatically after casting to render the arresting means inoperative so as to permit the continued ascent of the holder, and devices actuated by the line removing means, upon the removal of the line from the holder, for automatically controlling the pneumatically operated means to effect the descent of the holder.

111. A combination according to claim 110, including a line clamping jaw movable to operative position before casting and to inoperative position after casting and including also a timing shaft, and wherein the automatic means for rendering the holder arresting means inoperative is actuated by the movement of the line clamping jaw to inoperative position or by said timing shaft.

112. In a typographical casting machine, the combination of a line holder associated with the mold, a valve controlled, pneumatically operated, double-acting cylinder and piston mechanism for moving the holder from line receiving to line transfer position and return, means for setting the valve to effect the movement of the holder from its line receiving position, and automatic devices acting, after the removal of the line from the holder, to set the valve to effect the return movement of the holder.

113. In a typographical casting machine, the combination of a line holder associated with the mold, a valve controlled, pneumatically operated, double-acting cylinder and piston mechanism for moving the holder from line receiving to line transfer position and return, automatic devices acting, upon the reception of a line in the holder, for setting the valve to effect the movement of the holder from its line receiving position, and automatic devices acting, after the removal of the line from the holder, for setting the valve to effect the return movement of the holder.

114. In a typographical casting machine, the combination of a vertically movable line holder associated with the mold, a valve controlled, pneumatically operated, double-acting cylinder and piston mechanism for moving the holder from its lower line receiving position to its upper line transfer position and return, automatic devices acting, upon the reception of a line in the holder, to set the valve to effect the ascent of the holder from its line receiving position, means for temporarily arresting the holder in its ascent in an intermediate casting position, means acting automatically after casting to render said arresting means in operative and thus to permit the continued ascent of the holder, and automatic devices acting, upon the removal of the line from the holder, to set the valve to effect the return movement of the holder.

115. In a typographical composing and casting machine, the combination of a vertically movable line holder associated with the mold, a valve controlled, pneumatically operated, double-acting cylinder and piston mechanism for moving the holder from its lower line receiving position to its upper line transfer position and return, means for delivering a composed line to the holder when it is in its lower position, means for temporarily arresting the holder in its ascent in an intermediate casting position, means for removing the line from the holder when it is in its upper position, automatic devices actuated by the line delivery means, upon the delivery of the line to the holder, to set the valve to effect the ascent of the holder, means acting automatically after casting to render said arresting means inoperative and thus to permit the continued ascent of the holder, and automatic devices actuated by the line removing means, upon the removal of the line from the holder, to set the valve to effect the descent of the holder.

116. In a typographical casting machine, the combination of a supporting frame pivotally adjustable into and out of operative position, a line holder reciprocable on the supporting frame, and a cylinder and piston device for effecting such reciprocable movement of the holder, the piston of said device being co-axial with the pivot of the supporting frame.

117. In a typographical casting machine, the combination of a supporting frame pivotally adjustable on a hollow pivot post into and out of operative position, a line holder reciprocable on the supporting frame, and a cylinder and piston device for effecting the reciprocable movement of the holder, said piston having a piston rod slidably arranged in the hollow pivot post.

118. A typographical casting machine equipped with a swinging vise frame and a swinging line transporter supporting frame, said frames being mounted for independent swinging movement.

119. A typographical casting machine equipped with a swinging vise frame and a swinging line transporter supporting frame, said frames being mounted for independent swinging movement and having co-axial pivots to permit of a unitary swinging movement.

120. In a typographical casting and distributing machine equipped with a line holder for transporting the composed line of matrices and spacebands from casting to transfer position, a channel into which the line is transferred from the line holder, a second elevator for transporting the matrices after the line transfer to the distributing organ, and a spaceband grabber for returning the spacebands after the line transfer to the storage magazine, the combination of a transfer device movable to transfer the composed line from the first elevator into the transfer channel, and a rack and pinion device connecting the spaceband grabber for operation by the line transfer device.

121. A combination according to claim 120 wherein the spaceband grabber and the transfer device move toward each other through different distances to the spaceband collecting position, and wherein the rack and pinion connecting device is arranged to accommodate the differences in magnitude of such movements.

122. In a typographical casting and distributing machine equipped with a line holder for transporting the composed line from casting to transfer position, the combination of a transfer device movable from a normal position to remove the line from the holder and return, actuating mechanism operative to move the transfer device in one direction to effect the transfer of the line, and means operated automatically by such line transfer movement for conditioning said actuating mechanism to move the transfer device in the reverse direction.

123. In a typographical casting and distributing machine equipped with a line holder for transporting the composed line from casting to transfer position, and a second elevator movable from the distributing position to said line transfer position and return, the combination of a transfer device movable to transfer the matrices of the line from the line holder to the second elevator, actuating mechanism for the transfer device, and means operated by the movement of the second elevator toward the line transfer position for conditioning said actuating mechanism for operation.

124. A combination according to claim 123, including instrumentalities for preventing the operation of the transfer device actuating mechanism until both the line holder and the second elevator arrive at the line transfer position.

125. In a typographical casting and distributing machine equipped with a line holder for transporting the composed line from casting to transfer position, and a second elevator movable from the distributing position to said line transfer position and return, the combination of a transfer device movable from a normal position to transfer the matrices of the line from the line holder to the second elevator and return, actuating mechanism for the transfer device, means operative as the second elevator moves toward the line transfer position for conditioning said actuating mechanism to effect the active stroke of the transfer device, and automatic means for conditioning the actuating mechanism to effect the return stroke of the transfer device.

126. In a typographical casting and distributing machine equipped with a line holder for transporting the composed line from casting to transfer position, and a second elevator movable from the distributing position to said line transfer position and return, the combination of a transfer device movable from a normal position to an intermediate position to transfer the matrices of the line from the line holder to the second elevator and then to a terminal position for the collection of the spacebands, actuating mechanism for the transfer device, means for arresting the transfer device at said intermediate position to permit the movement of the second elevator to the distributing position, and means operative automatically as the second elevator moves away from the line transfer position to condition the actuating mechanism to move the transfer device on to its terminal position.

127. In a typographical casting and distributing machine equipped with a line holder for transporting the composed line from casting to transfer position, and a second elevator movable from the distributing position to said line transfer position and return, the combination of a transfer device movable from a normal position to an intermediate position to transfer the matrices of the line from the line holder to the second elevator and then to a terminal position for the collection of the spacebands, actuating mechanism for the transfer device, means for arresting the transfer device at said intermediate position to permit the movement of the second elevator to the distributing position, and means operative as the second elevator moves toward the line transfer position, and again as it moves away from said line transfer position, to condition the actuating mechanism first to initiate the active stroke of the transfer device and then to complete the active stroke thereof after its arrest in the intermediate position.

128. In a typographical casting and distributing machine equipped with a line holder for transporting the composed line from casting to transfer position, and a second elevator movable from the distributing position to said line transfer position and return, the combination of a transfer device movable from a normal position to an intermediate position to transfer the matrices of the line from the line holder to the second elevator and then to a terminal position for the collection of the spacebands, actuating mechanism for the transfer device, means for arresting the transfer device at said intermediate position to permit the movement of the second elevator to the distributing position, and means operative as the second elevator moves toward the line transfer position, and again as it moves away from said line transfer position, to condition the actuating mechanism first to initiate the active stroke of the transfer device and then to complete the active stroke thereof after its arrest in the intermediate position, and timing means for delaying the operation of the actuating mechanism for the transfer device until the line holder and the second elevator have both seated at the transfer level.

129. In a typographical casting and distributing machine equipped with a line holder for transporting the composed line from casting to transfer position, and a second elevator movable from the distributing position to said line transfer position and return, the combination of a transfer device movable from a normal position to an intermediate position to transfer the matrices of the line from the line holder to the second elevator and then to a terminal position for the collection of the spacebands, actuating mechanism for the transfer device, means for arresting the transfer device at said intermediate position to permit the movement of the second elevator to its distributing position, and means operative as the second elevator moves toward the line transfer position, and again as it moves away from said line transfer position, to condition the actuating mechanism first to initiate the active stroke of the transfer device and then to complete the active stroke thereof after its arrest in the intermediate position, and automatic means for conditioning the actuating mechanism to restore the transfer device to its normal position.

130. In a typographical casting and distributing machine equipped with a line holder for transporting the composed line from casting to transfer position, the combination of a transfer device movable to remove the line from the holder, and an individual power unit for effecting such movement of the transfer device.

131. In a typographical casting and distributing machine equipped with a line holder for transporting the composed line from casting to transfer position, the combination of a transfer device movable from a normal position to remove the line from the holder and return, and an individual reversible power unit for effecting such movements of the transfer device.

132. In a typographical casting and distributing machine equipped with a line holder for transporting a composed line from casting to transfer position, the combination of a transfer device movable to remove the line from the holder, and pneumatically operated means for effecting such movement of the transfer device.

133. In a typographical casting and distributing machine equipped with a line holder for transporting a composed line from casting to transfer position, the combination of a transfer device movable from a normal position to remove the line from the holder and return, and pneumatically operated means for effecting the movement of said transfer device in both directions.

134. In a typographical casting and distributing machine equipped with a line holder for transporting a composed line from casting to transfer position, and a second elevator movable to transport the matrices after the line transfer to the distributing organ, the combination of a transfer device movable from a normal position to transfer matrices from the holder to the second elevator and return, a valve controlled double-acting cylinder and piston mechanism for actuating the transfer device, means for adjusting the valve to charge the cylinder for the line transfer movement of the transfer device, and means for adjusting the valve to charge the cylinder for the return movement of the transfer device.

135. A combination according to claim 134 including timing devices for delaying the operation of the transfer device until both the line holder and the second elevator are at the transfer level.

136. In a typographical casting and distributing machine equipped with a line holder for transporting a composed line from casting to transfer position, and a second elevator movable to transport the matrices after the line transfer to the distributing organ, the combination of a transfer device movable from a normal position to an intermediate position to transfer matrices from the holder to the second elevator and then to a terminal position for the collection of the spacebands, a valve controlled double-acting cylinder and piston mechanism for actuating the transfer device, means for adjusting the valve to charge the cylinder for the line transfer movement of the transfer device, and means for adjusting the valve to a neutral position for arresting the transfer device in said intermediate position to permit movement of the second elevator to the distributing organ, said valve being automatically readjusted for the continued movement of the transfer device to its terminal position.

137. A combination according to claim 136, wherein the adjustment of the valve to effect the first and second stages of movement of the transfer device are inaugurated by movements of the second elevator toward and from the line transfer position, respectively.

138. A combination according to claim 136, wherein the neutral adjustment of the valve is effected automatically by the movement of the transfer device.

139. A combination according to claim 134, wherein the adjustment of the valve to bring about the return movement of the transfer device is effected automatically by the movement of the transfer device in its original direction.

140. A combination according to claim 134, wherein there is provided supplementary means operated automatically as the transfer device terminates its movement in one direction to adjust the valve to effect movement of the transfer device in the reverse direction.

141. In a typographical distributing machine, the combination of a line transporter movable from a line receiving position to a line distributing position, means for transferring a line thereto, and means controlled by the movement of the line transfer means for moving the transporter from its line receiving position to its line distributing position.

142. In a typographical distributing machine, the combination of a line transporter movable from a line distributing position to a line receiving position and return, actuating means therefor, means for transferring a line to the transporter in its line receiving position, means for inaugurating the movement of the transporter toward its line receiving position, and means controlled by the movement of the line transfer means for inaugurating the return movement of the line transporter to its line distributing position.

143. In a typographical casting and distributing machine equipped with a holder for supporting a line during casting, the combination of mechanism for delivering a line to the holder, a line transporter movable from a line distributing position to a line receiving position and return, actuating means for the transporter, means for transferring the line from the holder to the transporter in its line receiving position, means controlled by the line delivery mechanism for inaugurating the movement of the transporter toward its line receiving position, and means controlled by the movement of the line transfer means for inaugurating the movement of the line transporter to its line distributing position.

144. In a typographical machine, the combination of a line transporter movable between line receiving and line delivery positions, and double acting braking means for slowing up the movement of the transporter as it approaches both of said positions.

145. A combination according to claim 144 wherein the braking means includes a cylinder containing a liquid and a piston provided with a passageway through which the liquid passes from either end of the cylinder to the opposite end according to the direction of transporter movement, and means controlled by the movements of the transporter for retarding the flow of liquid through the passageway as the transporter approaches its terminal positions.

146. In a typographical distributing machine, the combination of a second elevator movable between line receiving and line distributing positions, and an individual power unit for moving said elevator.

147. In a typographical distributing machine, the combination of a second elevator movable from a line distributing position to a line receiving position and return, and an individual reversible power unit for moving the elevator in both directions.

148. In a typographical casting and distributing machine equipped with a first elevator and a second elevator, the combination of mechanism for delivering a line to the first elevator, an individual power unit for moving the second elevator, and means controlled by the line delivery mechanism for inaugurating the operation of the power unit to move the second elevator toward its line receiving position.

149. In a typographical casting and distributing machine equipped with a first elevator and a second elevator, the combination of mechanism for delivering a line to the first elevator, an individual reversible power unit for moving the second elevator in opposite directions, means for transferring a line from the first elevator to the second elevator, means controlled by the line delivery mechanism for inaugurating the operation of the power unit to move the second elevator toward its line receiving position, and means controlled by the line transfer means for reversing the power unit to move the second elevator toward its line distributing position.

150. In a typographical distributing machine, the combination of a second elevator movable between line distributing and line receiving positions, and pneumatically operated means for moving said elevator.

151. In a typographical distributing machine, the combination of a second elevator movable from line distributing position to line receiving position and return, and pneumatically operated means for moving said elevator in both directions.

152. In a typographical distributing machine, the combination of a second elevator movable from a line receiving position to a line distributing position, valve-controlled pneumatically-operated means for effecting such movement of the second elevator, and means operating automatially as the line is received by the second elevator to adjust the valve to initiate such elevator movement.

153. In a typographical casting and distributing machine equipped with a first elevator and a second elevator, the combination of mechanism for delivering a line to the first elevator, valve-controlled pneumatically-operated means for moving the second elevator from its line distributing position to its line receiving position, means for transferring a line from the first elevator to the second elevator, and means operating automatically as a line is delivered to the first elevator to adjust the valve to effect such movement of the second elevator.

154. In a typographical casting and distributing machine equipped with a first elevator and a second elevator, the combination of mechanism for delivering a line to the first elevator, a valve-controlled pneumatically-operated double-acting cylinder and piston mechanism for moving the second elevator in opposite directions, means for transferring a line from the first elevator to the second elevator, means operating automatically as a line is delivered to the first elevator to adjust the valve to effect movement of the second elevator from its line distributing to its line receiving position, and means operating automatically as the line is received by the second elevator to adjust the valve to effect movement thereof from its line receiving to its line distributing position.

155. In a typographical distributing machine, a line transporter for conveying a line of matrices from a lower line receiving position near the front of the machine to an upper line distributing position near the back of the machine, said transporter including a head presenting means for supporting the matrices during the transporter movement, and articulated connections defining a parallelogram for swinging the transporter head in a fore-and-aft plane from one position to another and for maintaining the matrices vertical throughout such swinging movement.

156. In a typographical distributing machine equipped with an elevator movable to transport a contained line to the distributor box, the combination of a distributor shifter movable to transfer the line from the elevator to the distributor box, and actuating mechanism controlled by the movement of the elevator for effecting the movement of the distributor shifter.

157. In a typographical distributing machine equipped with an elevator movable from a distributing position to a line receiving position and return, the combination of a distributor shifter movable in one direction to a position ready for the transfer of the line from the elevator in its distributing position and in the reverse direction to effect the transfer, and actuating mechanism controlled by the movement of the elevator toward line receiving position for effecting the movement of the distributor shifter to ready position.

158. In a typographical distributing machine equipped with an elevator movable from a distributing position to a line receiving position and return, the combination of a distributor shifter movable in one direction to a position ready for the transfer of the line from the elevator in its distributing position and in the reverse direction to effect the transfer, and actuating mechanism controlled by the movement of the elevator in the return direction for effecting the line transfer movement of the distributor shifter.

159. In a typographical distributing machine equipped with an elevator movable from a distributing position to a line receiving position and return, the combination of a distributor shifter movable in one direction to a position ready for the transfer of the line from the elevator in its distributing position and in the reverse direction to effect the transfer, and actuating mechanism controlled by the movement of the elevator toward line receiving position for effecting the movement of the distributor shifter to ready position and by the return movement of the elevator for effecting the line transfer movement of the distributor shifter.

160. In a typographical distributing machine equipped with an elevator movable to transport a contained line to the distributing organ of the machine and a distributor shifter movable to transfer the line from the elevator to the distributing organ, the combination of independent actuating mechanisms for the elevator and the distributor shifter, and means to control the movements of the elevator and the distributor shifter in proper timed relation.

161. In a typographical distributing machine equipped with an elevator movable from a normal distributing position to a line receiving position and return, and a distributor shifter movable in a path intersecting the path of movement of the elevator, in one direction to a position ready for the transfer of the line from the elevator in its distributing position and in the reverse direction to effect said line transfer, the combination of actuating mechanism controlled by the movement of the elevator toward line receiving position for effecting the movement of the distributor shifter to ready position, and means for delaying such movement of the elevator until the distributor shifter, in its line transfer movement, has cleared the path of movement of the elevator.

162. In a typographical distributing machine equipped with an elevator movable from a normal distributing position to a line receiving position and return, and a distributor shifter movable in a path intersecting the path of movement of the elevator, in one direction to a position ready for the transfer of the line from the elevator in its distributing position and in the reverse direction to effect said line transfer, the combination of actuating mechanism controlled by the movement of the elevator toward distributing position for effecting the line transfer movement of the distributor shifter, and means for arresting the movement of the elevator toward distributing position until the distributor shifter, in its movement to ready position, has cleared the path of movement of the elevator.

163. In a typographical distributing machine equipped with an elevator movable from a normal distributing position to a line receiving position and return, and a distributor shifter movable in a path intersecting the path of movement of the elevator, in one direction to a position ready for the transfer of the line from the elevator in its distributing position and in the reverse direction to effect said line transfer, the combination of actuating mechanism controlled by the movement of the elevator toward line receiving position for effecting the movement of the distributor shifter to ready position, and means for delaying the operation of said actuating mechanism until the elevator has cleared the path of movement of the distributor shifter.

164. In a typographical distributing machine equipped with a distributor box, an elevator movable from a normal position in registry with said box to a line receiving position and return, and a distributor shifter movable in a path intersecting the path of movement of the elevator, in one direction to a position ready for the transfer of the line from the elevator to the distributor box and in the reverse direction to effect said line transfer as well as to advance the matrices of the line through the distributor box from one end to the other, the combination of actuating mechanism controlled by the movement of the elevator toward line receiving position for effecting the movement of the distributor shifter to ready position, and means for delaying the operation of said actuating mechanism until the distributor box is clear of matrices.

165. In a typographical distributing machine equipped with a distributor box, an elevator movable from a normal position in registry with said box to a line receiving position and return, and a distributor shifter movable in a path intersecting the path of movement of the elevator, in one direction to a position ready for the transfer of the line from the elevator to the distributor box and in the reverse direction to effect said line transfer as well as to advance the matrices of the line through the distributor box from one end to the other, the combination of actuating mechanism controlled by the movements of the elevator from and to its normal position for effecting the movements of the distributor shifter in both directions, and devices acting automatically to delay the movement of the elevator out of and into normal position until the distributor shifter has cleared the path of movement thereof in its movement from and toward ready position, respectively, and to delay the operation of the distributor shifter actuating mechanism until the elevator in moving from normal position clears the path of movement of the distributor shifter and until the distributor box is clear of matrices.

166. In a typographical distributing machine, the combination of a distributor shifter movable in one direction to a position ready to transfer a line for distribution and in the opposite direction to effect said line transfer, and an individual reversible power unit for effecting such movements of the distributor shifter.

167. In a typographical distributing machine equipped with an elevator movable from and to a normal distributing position, the combination of a distributor shifter movable in one direction to a position ready to transfer a line from the elevator for distribution and in the opposite direction to effect said line transfer, an individual reversible power unit for effecting such movements of the distributor shifter, and means operated by the movements of the elevator for controlling the operation of the power unit.

168. In or for a typographical distributing machine, a pneumatically operated distributor shifter for transferring a line for distribution.

169. In a typographical distributing machine, the combination of a distributor shifter movable in one direction to a position ready to transfer a line for distribution and in the opposite direction to effect said line transfer, and pneumatically operated means for effecting such movements of the distributor shifter.

170. In a typographical distributing machine equipped with an elevator movable from and to a normal distributing position, the combination of a distributor shifter movable in one direction to a position ready to transfer a line from the elevator for distribution and in the opposite direction to effect said line transfer, and pneumatically operated means controlled by the elevator for operating the distributor shifter.

171. In a typographical distributing machine equipped with an elevator movable from and to a normal distributing position, the combination of a distributor shifter movable in one direction to a position ready to transfer a line from the elevator for distribution and in the opposite direction to effect said line transfer, a valve-controlled pneumatically-operated double-acting cylinder and piston mechanism, and means acting as the elevator moves from normal position to adjust the valve for movement of the distributor shifter to ready position and acting as the elevator returns to normal position to adjust the valve for movement of the distributor shifter to transfer the line.

172. A combination according to claim 171, wherein the path of movement of the elevator and the distributor shifter intersect and wherein means are provided for delaying the adjustment of the valve for movement of the distributor shifter to ready position until the elevator in moving from normal position clears the path of movement of the distributor shifter.

173. A combination according to claim 171 including a distributor box through which the matrices of the line are advanced by the distributor shifter after transfer from the elevator, and wherein means are provided for delaying the adjustment of the valve for movement of the distributor shifter to ready position until all the matrices have passed from the distributor box.

174. In a typographical machine, a plurality of individual power units for actuating different movable organs thereof, in combination with timing means controlling the operation of said power units to cause the functions performed by said machine organs to be carried out in a given sequence.

175. In a typographical machine, a plurality of pneumatically operated machine organs for performing various functions of the machine, in combination with timing means for causing said functions to be carried out in a given sequence.

176. In a typographical casting machine, a plurality of individual power units for operating different movable machine organs in a given sequence during the casting cycle, in combination with timing means controlling the operation of said power units to insure said sequence of operation.

177. In a typographical casting machine, a plurality of pneumatically operated machine organs operated in a given sequence during the casting cycle, in combination with timing means for insuring said sequence of operation.

178. In a typographical composing, casting and distributing machine, a plurality of individual power units operating a corresponding plurality of line transporters adapted when operated in a given sequence to convey a composed line of matrices from composing to casting position and from casting to distributing position, in combination with timing means controlling the operation of said power units to insure said sequence of operation.

179. In a typographical composing, casting and distributing machine, a plurality of pneumatically operated line transporters adapted when operated in a given sequence to convey a composed line of matrices from composing to casting position and from casting to distributing position, in combination with timing means for insuring said sequence of operation.

180. In a typographical composing, casting and distributing machine, the combination of a plurality of machine organs including a line delivery carriage movable from a line receiving to a line delivery position and return, a first elevator movable from a line receiving position to a casting position and then to an upper line transfer position and return, a right-hand line clamping jaw normally standing below the delivery path of the line and movable to an operative line clamping position and return, a second elevator movable from a line distributing position to a line receiving position and return, an upper transfer carriage movable from a normal position to transfer a line from the first elevator to the second elevator and return, a distributor shifter movable in one direction to a position ready for the transfer of a line from the second elevator in its distributing position and in the return direction to effect such transfer, actuating mechanism for said machine organs, devices controlled by the movement of the line delivery carriage for initiating the movement of the first elevator from line receiving to casting position, the movement of the right-hand jaw from normal position to line clamping position, and the movement of the second elevator from distributing position to line receiving position, means operative after casting to permit movement of the first elevator to its upper line transfer position and to initiate the return movement of the right-hand jaw, means controlled by the movement of the second elevator to its line receiving position to initiate the line transfer movement of the upper transfer carriage, means controlled by the movement of the upper transfer carriage to initiate the return movements of the first and second elevators, and means controlled by the movement of the second elevator out of and into its line distributing position to initiate respectively the movements of the distributor shifter to and from its ready position.

181. In a typographical composing, casting and distributing machine, the combination of a plurality of machine organs including a line delivery carriage movable from a line receiving to a line delivery position and return, a first elevator movable from a line receiving position to a casting position and then to an upper line transfer position and return, a second elevator movable from a line distributing position to a line receiving position and return, an upper transfer carriage movable from a normal position to transfer a line from the first elevator to the second elevator and return, a distributor shifter movable in one direction to a position ready for the transfer of a line from the second elevator in its distributing position and in the return direction to effect such transfer, actuating mechanism for said machine organs, devices controlled by the movement of the line delivery carriage for initiating the movement of the first elevator from line receiving to casting position and the movement of the second elevator to line receiving position, means operative after casting to permit movement of the first elevator to upper line transfer position, means controlled by the movement of the second elevator to line receiving position to initiate the transfer movement of the upper transfer carriage, means controlled by the movement of the upper transfer carriage to initiate the return movements of the first and second elevators, and means controlled by the movement of the second elevator out of and into its line distributing position to initiate respectively the movements of the distributor shifter to and from its ready position.

182. In a typographical composing, casting and distributing machine, the combination of a plurality of machine organs including a line delivery carriage movable from a line receiving to a line delivery position and return, a first elevator movable from a line receiving position to a casting position and then to an upper line transfer position and return, a right-hand clamping jaw normally standing below the delivery of the line and movable to an operative line clamping position and return, a second elevator movable from a line distributing position to a line receiving position and return, an upper transfer carriage movable from a normal position to transfer a line from the first elevator to the second elevator and return, actuating mechanism for said machine organs, devices controlled by the movement of the line delivery carriage for initiating the movement of the first elevator from line receiving to casting position, the movement of the right-hand jaw to operative position and the movement of the second elevator to line receiving position, means operative after casting to permit movement of the first elevator to upper line transfer position and for initiating the return movement of the right-hand jaw, means controlled by the movement of the second elevator to line receiving position for initiating the line transfer movement of the upper transfer carriage, and means controlled by the movement of the upper transfer carriage for initiating the return movements of the first and second elevators.

183. In a typographical composing, casting and distributing machine, the combination of a plurality of machine organs including a first elevator movable from a line receiving position to a casting position and then to an upper line transfer position and return, a right-hand jaw movable from an inoperative position to an operative line clamping position and return, a second elevator movable from a line distributing position to a line receiving position and return, an upper transfer carriage movable from a normal position to transfer a line from the first elevator to the second elevator and return, a distributor shifter movable in one direction to a position ready for the transfer of a line from the second elevator in its distributing position and in the return direction to effect such transfer, actuating mechanism for said machine organs, devices for controlling the movement of the first elevator from line receiving to casting position, the movement of the right-hand jaw to operative position and the movement of the second elevator to line receiving position, means operative after casting to permit movement of the first elevator to upper line transfer position and for initiating the return movement of the right-hand jaw, means controlled by the movement of the second elevator to line receiving position for initiating the line transfer movement of the upper transfer carriage, means controlled by the movement of the upper transfer carriage for initiating the return movements of the first and second elevators, and means controlled by the movement of the second elevator out of and into its line distributing position for initiating respectively the movements of the distributor shifter to and from its ready position.

184. In a typographical composing, casting and distributing machine, the combination of a plurality of machine organs including a first elevator movable from a line receiving position to a casting position and then to an upper line transfer position and return, a second elevator movable from a line distributing position to a line receiving position and return, an upper transfer carriage movable from a normal position to transfer a line from the first elevator to the second elevator and return, a distributor shifter movable in one direction to a position ready for the transfer of a line from the second elevator in its distributing position and in the return direction to effect such transfer, actuating mechanism for said machine organs, devices for controlling the movement of the first elevator from line receiving to casting position and the movement of the second elevator to line receiving position, means operative after casting to permit movement of the first elevator to upper line transfer position, means controlled by the movement of the second elevator to line receiving position for initiating the line transfer movement of the upper transfer carriage, means controlled by the movement of the upper transfer carriage for initiating the return movements of the first and second elevators, and means controlled by the movement of the second elevator out of and into its line distributing position for initiating respectively the movements of the distributor shifter to and from its ready position.

185. In a typographical composing, casting and distributing machine, the combination of a plurality of machine organs including a first elevator movable from a line receiving position to a casting position and then to an upper line transfer position and return, a right-hand jaw movable from an inoperative position to an operative line clamping position and return, a second elevator movable from a line distributing position to a line receiving position and return, an upper transfer carriage movable from a normal position to transfer a line from the first elevator to the second elevator and return, actuating mechanism for said machine organs, devices for controlling the movement of the first elevator from line receiving to casting position, the movement of the right-hand jaw to operative position and the movement of the second elevator to line receiving position, means operative after casting to permit movement of the first elevator to upper line transfer position and for initiating the return movement of the righthand jaw, means controlled by the movement of the second elevator to line receiving position for initiating the line transfer movement of the upper transfer carriage, and means controlled by the movement of the upper transfer carriage for initiating the return movements of the first and second elevators.

186. In a typographical composing, casting and distributing machine, the combination of a line delivery carriage movable to transfer a composed line to the casting organ of the machine, a second elevator movable from line distributing to line receiving position and return, a distributor shifter movable in one direction to a position ready for the transfer of a line from the second elevator in its distributing position and in the reverse direction to effect such transfer, means controlled by the line transfer movement of the line delivery carriage for causing the second elevator to move from its line distributing position to its line receiving position, and means controlled by the movement of the second elevator out of and into its line distributing position for effecting respectively the movements of the distributor shifter to and from its ready position.

187. In a typographical casting and distributing machine, the combination of a first elevator movable from line receiving to line casting position, then to an upper line transfer position and return, a second elevator movable from a line distributing to a line receiving position and return, mechanism for transferring the line from the first elevator to the second elevator, means controlled by the movement of the second elevator toward line receiving position for effecting the operation of the line transfer mechanism, and means controlled by the line transfer mechanism for effecting the return movements of both the first and the second elevators.

188. In a typographical slug casting machine equipped with a transporter in which a composed line of matrices is carried to and from casting position and with a line clamping jaw movable while in engagement with the last composed matrix in the line to effect a quadding operation, the combination therewith of matrix retaining means normally located in an inoperative position when the transporter is in line receiving position and movable to engage the last composed matrix in the line when the transporter moves to casting position, said matrix retaining means being movable linewise during a quadding operation so as to maintain its engagement with the line in the quadded position thereof.

189. In a typographical slug casting machine equipped with a transporter in which a composed line of matrices is carried to and from casting position, and with a line clamping jaw movable while in engagement with the last composed matrix in the line to effect a quadding operation, the combination therewith of matrix retaining means including a pivotally mounted element normally located in an inoperative position when the transporter is in line receiving position and adapted to swing into engagement with the last composed matrix in the line when the line transporter moves to casting position and also into the path of said line clamping jaw, whereby said matrix retaining means is moved linewise by said jaw during a quadding operation so as to maintain its engagement with the line in the quadded position thereof.

190. In or for a slug casting machine, a cam shaft driving mechanism including a main drive shaft, a countershaft, a worm wheel on the cam shaft arranged to be driven from a worm on the countershaft, a clutch for effecting a driving connection between the drive shaft and the countershaft, means for causing the engagement of the clutch to inaugurate the casting cycle, and means actuated from the worm wheel for causing the disengagement of the clutch automatically at the completion of the casting cycle.

191. A typographical casting machine equipped with a line clamping mechanism supported in a vise frame and a line transporter for cooperating with the line clamping mechanism, said line transporter being arranged for a vertical movement in a frame overlying the vise frame and which is pivotally mounted for swinging movement independently of said vise frame.

192. In a typographical machine, a plurality of individual power units for actuating different movable organs thereof, in combination with timing means controlling the operation of said power units to cause the functions performed by said machine organs to be carried out in a given sequence, said timing means including terminal control devices acting automatically, as a machine organ completes one function, to initiate the machine organ movement performing the function next in sequence.

193. In a typographical machine, a plurality of individual power units for actuating different movable organs thereof, in combination with timing means controlling the operation of said power units to cause the functions performed by said machine organs to be carried out in a given sequence, said timing means including a one revolution shaft provided with timing cam mechanism controlling the movements of certain of said machine organs.

194. In a typographical machine, a plurality of individual power units for actuating different movable organs thereof, in combination with timing means controlling the operation of said power units to cause the functions performed by said machine organs to be carried out in a given sequence, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism.

195. In a typographical machine, a plurality of individual power units for actuating different movable organs thereof, in combination with timing means controlling the operation of said power units to cause the functions performed by said machine organs to be carried out in a given sequence, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism, the rotation of the timing cam shaft being inaugurated by a terminal control device adjusted by the movement of one of said machine organs, and the movement of at least one of said machine organs by which a terminal control device is adjusted being inaugurated under the control of the timing cam mechanism.

196. In a typographical machine, a plurality of pneumatically operated machine organs for performing various functions of the machine, in combination with timing means for causing said functions to be carried out in a given sequence, said timing means including terminal control devices acting automatically, as a machine organ completes one function, to initiate the machine organ movement performing the function next in sequence.

197. In a typographical machine, a plurality of pneumatically operated machine organs for performing various functions of the machine, in combination with timing means for causing said functions to be carried out in a given sequence, said timing means including a one revolution shaft provided with timing cam mechanism controlling the movements of certain of said machine organs.

198. In a typographical machine, a plurality of pneumatically operated machine organs for performing various functions of the machine, in combination with timing means for causing said functions to be carried out in a given sequence, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism.

199. In a typographical machine, a plurality of pneumatically operated machine organs for performing various functions of the machine, in combination with timing means for causing said functions to be carried out in a given sequence, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism, the rotation of the timing cam shaft being inaugurated by a terminal control device adjusted by the movement of one of said machine organs, and the movement of at least one of said machine organs by which a terminal control device is adjusted being inaugurated under the control of the timing cam mechanism.

200. In a typographical casting machine, a plurality of individual power units for operating different movable machine organs in a given sequence during the casting cycle, in combination with timing means controlling the operation of said power units to insure said sequence of operation, said timing means including terminal control devices acting automatically, as a machine organ completes one function, to initiate the machine organ movement performing the function next in sequence.

201. In a typographical casting machine, a plurality of individual power units for operating different movable machine organs in a given sequence during the casting cycle, in combination with timing means controlling the operation of said power units to insure said sequence of operation, said timing means including a one revolution shaft provided with timing cam mechanism controlling the movements of certain of said machine organs.

202. In a typographical casting machine, a plurality of individual power units for operating different movable machine organs in a given sequence during the casting cycle, in combination with timing means controlling the operation of said power units to insure said sequence of operation, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism.

203. In a typographical casting machine, a plurality of individual power units for operating different movable machine organs in a given sequence during the casting cycle, in combination with timing means controlling the operation of said power units to insure said sequence of operation, said timing means including terminal control devices and a one revolution shaft provided with timing cam mechanism, part of the sequential functions being performed by machine organ movement initiated by a terminal control device adjusted automatically by the movement of another machine organ, and the remainder being performed under the control of the timing cam mechanism, the rotation of the timing cam shaft being inaugurated by a terminal control device adjusted by the movement of one of said machine organs, and the movement of at least one of said machine organs by which a terminal control device is adjusted being inaugurated under the control of the timing cam mechanism.

204. In a typographical casting machine, the combination of a line holder associated with the mold, means operative independently of the mold for effecting the proper alignment of the matrix characters and means for insuring the horizontal alignment of the mold cavity with the aligned matrices.

205. In a typographical casting machine, the combination of a vertically movable line holder associated with the mold, means for locating the holder at the casting level independently of the mold, means operable independently of the mold for shifting the matrices vertically relatively to one another to bring the matrix characters into proper alignment and means for insuring the horizontal alignment of the mold cavity with the aligned matrices.

206. In a typographical distributing machine, a line transporter for conveying a line of matrices from a lower line receiving position to an upper line distributing position, said transporter including a head presenting means for supporting the matrices during the transporter movement, and articulated connections defining a parallelogram for swinging the transporter head from one position to another and for maintaining the matrices vertical throughout such swinging movement.

JAMES C. PLASTARAS.